(12) United States Patent  (10) Patent No.: US 7,574,935 B2
Rohs et al.  (45) Date of Patent: Aug. 18, 2009

(54) TRANSMISSION

(75) Inventors: Ulrich Rohs, Roonstr. 11, 52351 Düren (DE); Christoph Dräger, Inden (DE); Werner Brandwitte, Langerwehe (DE)

(73) Assignee: Ulrich Rohs, Düren (DE)

( * ) Notice: Subject to any disclaimer, the term of this patent is extended or adjusted under 35 U.S.C. 154(b) by 247 days.

(21) Appl. No.: 10/529,605

(22) PCT Filed: Sep. 29, 2003

(86) PCT No.: PCT/DE03/03242

§ 371 (c)(1), (2), (4) Date: Feb. 14, 2006

(87) PCT Pub. No.: WO2004/031620

PCT Pub. Date: Apr. 15, 2004

(65) Prior Publication Data

US 2007/0004556 A1    Jan. 4, 2007

(30) Foreign Application Priority Data

| Sep. 30, 2002 | (DE) | ................ | 102 45 897 |
| Oct. 7, 2002 | (DE) | ................ | 102 46 655 |
| Jan. 30, 2003 | (DE) | ................ | 103 03 891 |
| Jan. 30, 2003 | (DE) | ................ | 103 03 896 |
| Jan. 31, 2003 | (DE) | ................ | 103 04 094 |
| May 20, 2003 | (DE) | ................ | 103 23 109 |

(51) Int. Cl.
*F16H 3/22* (2006.01)
*F16H 63/00* (2006.01)
*F16H 15/16* (2006.01)

(52) U.S. Cl. ................ 74/349; 474/83; 476/52

(58) Field of Classification Search ................ 475/193, 475/194, 209, 210, 211, 214, 215, 216, 217, 475/218; 74/348, 349; 474/61–63, 83; 476/51–53
See application file for complete search history.

(56) References Cited

U.S. PATENT DOCUMENTS

| 299,231 | A | * | 5/1884 | Laird | ................ | 476/52 |
| 1,637,664 | A | * | 8/1927 | Stoeckicht | ................ | 476/53 |
| 1,709,346 | A |  | 4/1929 | Garrard |  |  |

(Continued)

FOREIGN PATENT DOCUMENTS

DE       745 147      2/1944

(Continued)

OTHER PUBLICATIONS

Michael Kammler, Wirkungsgradoptimierte Variator-Auslegung eines Wälzgetriebe-CVT in Bauart Kegel-Ring-Getriebe , Aachen: Mainz, 2001 (with English translation of relevant portions).

*Primary Examiner*—Roger Pang
(74) *Attorney, Agent, or Firm*—Collard & Roe, P.C.

(57) ABSTRACT

In a transmission having two revolving transmission elements, each of which has at least one running surface for a revolving coupling element, at least one running surface having at least two running paths for the coupling element having different running radii and the two transmission elements being braced, while incorporating the coupling element, via a bracing device which presses the two transmission elements against the coupling element with a variable pressure, the bracing device comprises a pressure device connected in series with a spring element.

20 Claims, 34 Drawing Sheets

U.S. PATENT DOCUMENTS

| | | | |
|---|---|---|---|
| 1,868,676 A * | 7/1932 | Stoeckicht | 476/48 |
| 2,545,152 A * | 3/1951 | Haidegger | 475/215 |
| 2,660,897 A | 12/1953 | Niedhart et al. | |
| 2,743,621 A | 5/1956 | Beier | |
| 3,048,046 A | 8/1962 | Cosby | |
| 3,347,106 A | 10/1967 | Flichy | |
| 3,347,107 A | 10/1967 | Flichy | |
| 3,375,733 A | 4/1968 | Browning | |
| RE27,211 E | 11/1971 | Rounds | |
| 4,136,581 A | 1/1979 | Winter et al. | |
| 4,238,976 A | 12/1980 | Kemper | |
| 4,382,188 A | 5/1983 | Cronin | |
| 4,449,415 A | 5/1984 | Groenhof | |
| 4,559,841 A * | 12/1985 | Chambers | 475/166 |
| 4,577,523 A | 3/1986 | Groenhof | |
| 4,644,821 A | 2/1987 | Sumiyoshi et al. | |
| 4,955,852 A | 9/1990 | Morisawa | |
| 5,069,078 A * | 12/1991 | Fairbanks | 74/216.3 |
| 5,073,157 A * | 12/1991 | Herscovici | 475/211 |
| 5,112,283 A * | 5/1992 | Miyata et al. | 475/211 |
| 5,213,011 A * | 5/1993 | Nobumoto et al. | 477/41 |
| 5,700,196 A | 12/1997 | Banemann et al. | |
| 5,924,953 A | 7/1999 | Rohs | |
| 5,984,820 A * | 11/1999 | Wedeniwski | 475/193 |
| 6,056,661 A | 5/2000 | Schmidt | |
| 6,093,131 A * | 7/2000 | Rohs | 476/53 |
| 6,139,465 A * | 10/2000 | Holliday | 476/52 |
| 6,241,635 B1 | 6/2001 | Schmid et al. | |
| 6,277,048 B1 * | 8/2001 | Rohs | 476/53 |
| 6,379,275 B1 | 4/2002 | Serkh | |
| 6,503,166 B1 | 1/2003 | Van Druten et al. | |
| 6,506,136 B2 * | 1/2003 | Schmid et al. | 474/18 |
| 6,623,399 B2 | 9/2003 | Fey et al. | |
| 6,875,152 B2 | 4/2005 | Iwatuki et al. | |
| 6,908,406 B2 * | 6/2005 | Overbay et al. | 474/83 |
| 7,048,667 B2 * | 5/2006 | DeVincent et al. | 475/214 |
| 7,077,777 B2 * | 7/2006 | Miyata et al. | 475/208 |
| 7,097,583 B2 * | 8/2006 | Lauinger et al. | 475/214 |
| 7,232,396 B2 | 6/2007 | Reisch et al. | |
| 2006/0194667 A1 | 8/2006 | Rohs et al. | |
| 2006/0217227 A1 | 9/2006 | Rohs et al. | |
| 2007/0004556 A1 | 1/2007 | Rohs et al. | |

FOREIGN PATENT DOCUMENTS

| | | |
|---|---|---|
| DE | 23 36 337 A1 | 1/1975 |
| DE | 38 35 052 A1 | 5/1989 |
| DE | 42 04 200 | 8/1993 |
| DE | 196 07 812 A1 | 9/1996 |
| DE | 197 17 290 A1 | 10/1998 |
| DE | 199 09 347 A1 | 9/1999 |
| EP | 0 878 641 A | 11/1998 |
| EP | 09 80 993 A2 | 2/2000 |
| EP | 1 136 724 | 9/2001 |
| FR | 6 15 659 | 1/1927 |
| FR | 2 741 128 | 5/1997 |
| FR | 27 96 693 A1 | 1/2001 |
| GB | 343 225 A | 2/1931 |
| GB | 1 499 019 | 1/1978 |
| GB | 1 525 402 | 9/1978 |
| JP | 401105057 A * | 4/1989 |
| JP | 2000-291759 | 10/2000 |
| JP | 2003 0 28 257 A | 1/2003 |

* cited by examiner

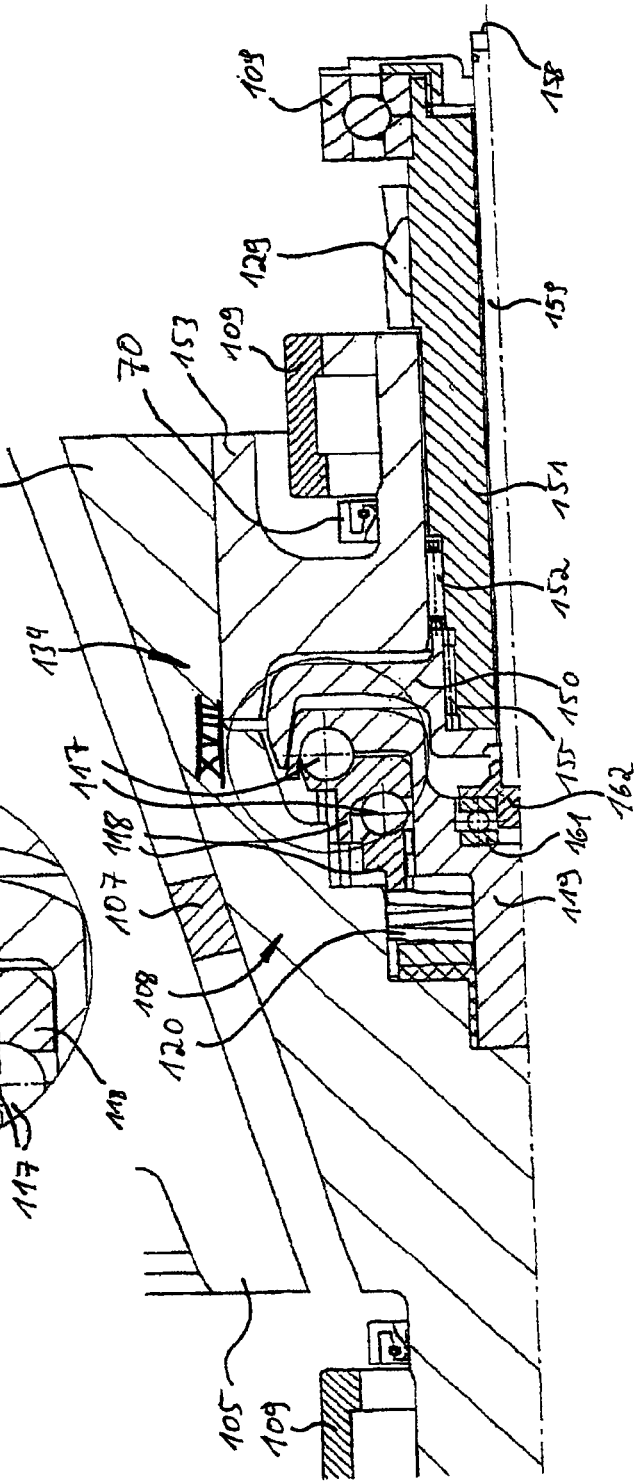

TRANSMISSION

CROSS REFERENCE TO RELATED APPLICATIONS

Applicants claim priority under 35 U.S.C. §119 of German Application Nos. 102 45 897.9, 102 46 655.6, 103 03 891.4, 103 03 896.5, 103 04 094.3, 103 23 109.9 filed Sep. 30, 2002, Oct. 7, 2002, Jan. 30, 2003, Jan. 30, 2003, Jan. 31, 2003 and May 20, 2003, respectively. Applicants also claim priority under 35 U.S.C. §365 of PCT/DE2003/003242 filed Sep. 29, 2003. The international application under PCT article 21 (2) was not published in English.

The present invention relates to a transmission, particularly having two revolving transmission elements, each of which has at least one running surface for a revolving coupling element, which couples the two revolving transmission elements. At least one of the running surfaces of the two revolving transmission elements preferably has at least two running paths for the coupling element having different running radii in this case, so that in this way a continuously and/or nearly continuously variable transmission may be implemented. In an arrangement of this type, the two transmission elements may be braced, while including the coupling element, via a bracing device which presses the two transmission elements against the coupling element with a variable pressure. In this way, variable and therefore adjustable pressures, which act between the revolving transmission elements and the coupling element, may be implemented.

Arrangements of this type are known, for example, from EP 0 878 641 A1 and from EP 0 980 993 A2. Both of these two publications relate to conical friction ring transmissions, in which two cones having opposing conical angles are mounted so that they revolve in such a way that a constant gap remains between them, in which a ring revolves enclosing one of the cones as a coupling element. The two publications disclose both hydrostatic and/or hydrodynamic pressure devices and mechanical pressure devices, using which at least one cone may be displaced in such a way that the gap width is reduced. In this way, the coupling element may be pressed against both running surfaces of the cone, so that in this way the pressure may implement sufficient force transmission. While for the hydrostatic and/or hydrodynamic achievements of the object, a variation may be implemented without anything further by varying the hydraulic ratios, and/or the hydrostatic or hydrodynamic ratios, the mechanical achievements of the object provide approach ramps, which are engaged with one another, of two assemblies which transmit torque, so that these two assemblies may twist toward one another as a function of the torque, through which the corresponding pressure device expands axially and/or has its axial dimension reduced as a function of torque. In this way, at higher torques a higher pressure may also be implemented without anything further, these forces being countered through suitable bracing bearings, such as taper roller bearings, so that finally a larger bracing force results for the coupling element and/or the friction ring.

It is the object of the present invention to provide a transmission having two revolving transmission elements, each of which has at least one running surface for a revolving coupling element, at least one running surface having at least two running surfaces for the coupling element having different running radii and the two transmission elements being braced, while incorporating the coupling element, via a bracing device which presses the two transmission elements against the coupling element with a variable pressure, in which the pressure may be applied more reliably and/or more reproducibly as a function of the torque, but also as a function of other operating parameters.

To achieve this object, the present invention suggests a transmission according to the species, in which the bracing device comprises a pressure device, which presses the running surface of one of the two transmission elements against the coupling element and also supports itself on a bracing bearing with a variable pressure, and a spring element, which is positioned to act in series with the pressure device.

In the present case, the bracing device thus comprises all of the assemblies of the transmission according to the present invention which ensure sufficient pressure and correspondingly are loaded with at least parts thereof, while the pressure device according to the present invention has the assemblies responsible for a variable pressure. By connecting the spring element and pressure device in series, at the same pressure, which may naturally, as a function of the spring constant of the spring element, may reach the same dimensions as in pressure devices according to the related art, the pressure device has significantly more movement play available, through which essentially uniform movement of the pressure device may be implemented. This particularly leads to increased reproducibility of the particular pressures. In addition, the present invention allows variation of the force-pressure and/or torque-pressure characteristic curves, by varying the slopes of paths for cranks, rolling bodies, or similar things, so that a tolerance equalization may be provided.

In a second achievement of the object, the spring element cumulatively and/or alternatively preferably transmits both the variable pressure and a torque between the running surface of the first transmission element and the bracing device and/or between the running surface of the first transmission element and the pressure device.

In this way, the pressure device may be relieved, at least partially, from the double load of transmitting torque both directly to the running surface of the first transmission element and/or to an assembly connected to this running surface and simultaneously having to shift in relation to this assembly. The above-mentioned object of applying the variable pressure as reproducibly as possible may also be fulfilled in this way. This embodiment is thus advantageous cumulatively with or alternatively to the achievement of the object described above for a transmission according to the species, EP 0 980 993 A2 merely representing a spring element, which is, however, connected in parallel to the pressure device and does not transmit a torque.

As a third achievement of the object, the present invention suggests a transmission according to the species, in which the bracing device comprises a pressure device having two pressure elements and at least one rolling element, which rolls on at least one rolling element path as a function of torque, which is implemented in such a way that a first pressure element is displaced in relation to the second pressure element in the direction of the pressure when the rolling element changes its position on the rolling element as a function of torque.

In this way, the displacement of the second pressure element because of torque may be ensured at relatively low friction, so that in this achievement of the object as well a high reproducibility of the pressure as a function of and/or because of torque is ensured.

In a preferred embodiment, a torque sensor may be provided on the drive and/or output side, the pressure of the pressure device being selected as a function of the torque determined. In this way, the pressure and therefore a contact force and/or friction force which occurs between the coupling element and one of the transmission elements may be adapted to the existing torque ratios. It is obvious that a sensor of this type may also be applied advantageously independently of the remaining features of the present transmission, particularly in a continuous transmission and/or a transmission which acts via friction or hydraulic interactions, particularly to adapt the pressure to the existing ratios and, for example, prevent slip with the smallest possible losses or, for example, select the transmission ratios suitably. Strain gauges and/or tension meters or torsion meters and/or similar measurement systems may be used as the sensor.

The latter arrangement described is particularly advantageous if the pressure device is activated externally, as is particularly the case for hydrostatic or hydrodynamic bearings. In addition, the pressure device may also, particularly if it is implemented mechanically, be activated internally as a function of torque, for example, by a torque which acts upon it. Particularly in an embodiment of this type, a pressure caused by a torque and/or a shift of components of the pressure device caused by a torque may be used to measure the torque. In this way, a torque measurement may be performed especially cost-effectively, since further costly torque sensors may be dispensed with. This arrangement is especially advantageous if the pressure device is provided in the driven transmission element of the transmission. It is obvious that this arrangement also provides cost-effective achievement of the object independently of the remaining features of the transmission.

In an pressure device, it may be advantageous, independently of the remaining features of the present invention, to provide a clutch element which alternately disengages these two transmission elements from a third transmission element by opening and/or engages them to this third transmission element by closing, so that the particular transmission path may be engaged alternately to an overall transmission. In an arrangement of this type, the forces necessary to close the clutch element are preferably applied by the pressure device. It is thus advantageous if the clutch element is positioned in the force path of the pressure.

In an arrangement of this type, it is sufficient to open a clutch to compensate for the pressure at a suitable point, so that the pressure no longer loads the corresponding clutch. In this way, the corresponding clutch opens and the two transmission elements are accordingly disengaged. Particularly if the pressure device is activated as a function of torque, this immediately results in the pressure being reduced since, because of the open clutch, a torque is no longer transmitted. In this way, the forces to be applied for opening are directly reduced to a significant extent. In addition, the reduction of the pressure also causes a reduction of the losses which may be caused by transmission elements which may possibly also be freewheeling. To close the clutch, the corresponding counterforce merely has to be reduced, so that the pressure device is again active. Therefore, no additional assemblies are necessary to close the clutch.

In an especially preferred embodiment variation, a gap may be provided between at least one of the revolving transmission elements and the coupling element during operation. Through a contactless operation of this type, a transmission of this type may be made extremely low-wear, even independently of the remaining features of the transmission according to the present invention, a suitable interaction mechanism being provided between the corresponding transmission elements and the coupling element for force and/or torque transmission. The coupling is preferably provided via a fluid and/or a liquid which remains in the gap despite a pressure and transmits the necessary forces and/or torques. In addition, other interaction mechanisms may be provided, such as electrostatic or magnetic arrangements.

A gap of this type is particularly suitable for conical friction ring transmissions, in which the gap and/or the liquid is located between the cone and the friction ring at least during operation. In this way, the ring may also be positioned for a desired transmission ratio without anything further. However, a gap of this type is also suitable for other continuously variable transmissions in which transmission elements interact with one another through friction.

In the present context, the concept of a "frictional interrelationship" between transmission elements describes an interrelationship in which torques are transmitted from one transmission element to the other transmission element, without a form fit existing between these transmission elements for this purpose. Typically, a certain slip exists in a frictional interrelationship, at least above relatively high limiting torques, a slip of this type frequently occurring non-destructively and the corresponding transmissions typically being operated below these limiting torques.

Alternatively and/or cumulatively to the gap described above, a liquid, particularly a silicone oil, which comprises methyl siloxanes, dimethyl diphenyl siloxanes, and/or methyl phenyl siloxanes having phenyl groups, may be used as the liquid with which at least one of the revolving transmission elements and/or a coupling element, such as a friction ring, is wetted. In particular, dimethyl polysiloxanes, which contain, for example, phenyl-alkyl groups or fluoroalkyl groups, may also be used. In this case, dimethyl siloxy groups may particularly alternate therein, individually or as siloxane blocks, with diphenyl siloxy groups.

Liquids of this type are generally known under the term "silicone oils", which are also—non-specifically—generally disclosed in EP 0 878 641 A1 as a liquid for wetting the revolving transmission elements of a continuously variable transmission.

Silicone oils have relatively slight lubrication properties, which has been shown to be disadvantageous in practical tests, particularly in interaction with rolling coupling elements, such as coupling rollers or friction rings, so that it is assumed that a liquid film breaks down during operation with known silicone oils. However, silicone oils are especially distinguished by a high temperature carrying capacity of their properties in comparison to other liquids.

The liquids suggested, comprising methyl siloxanes, dimethyl diphenyl siloxanes, and/or methyl phenyl siloxanes having phenyl groups, particularly if, for example, diphenyl siloxane blocks are incorporated into polymethyl siloxane, are distinguished by high compressibility in comparison to other liquids, which presumably prevents breakdown of the film. Thus, oils may be provided which have behavior advantageous for transmissions having rolling coupling elements in their temperature/viscosity and/or temperature/compressibility behavior, it having been found that for systems of this type, liquids of any type whose viscosity and/or compressibility changes with a temperature-dependent viscosity gradient and/or compressibility gradient which lies between the viscosity gradients and/or compressibility gradients of mineral oils and the viscosity gradients and/or compressibility gradients of dimethyl siloxanes, may very generally be used advantageously for transmissions. Using these properties, a liquid and/or an oil may lubricate the corresponding transmission enough so that operating temperatures which are too high are not reached. However, the lubrication is not so strong that sufficient coupling between the coupling element and the corresponding transmission element would be prevented. In addition, the compressibility window described produces sufficient stability of the fluid film enclosing the components even under pressure, without uniform distribution of the liquid being prevented.

In particular, liquids having polydimethyl siloxanes, polydimethyl diphenyl siloxanes, and/or polymethyl phenyl siloxanes having phenyl groups, and/or alkyl-substituted γ-trifluoropropyl-substituted polydimethyl siloxanes may be used. "Silicones" may also be used in which organic substituents, such as 10 to 25% phenyl groups or γ-trifluoropropyl groups or other alkyl groups, are contained as substituents in the polydimethyl siloxanes which are used.

In addition, cumulatively and/or alternatively, it is especially advantageous if the corresponding liquid is stabilized in regard to its temperature and, as much as possible, changes less in regard to its properties than mineral oils do. In this way, a long service life of the transmission may be ensured, since the corresponding fluid degenerates less. Furthermore, the physical properties of the fluid remain as constant as possible even in different operating states, such as under extremely high load or extremely high speeds or even, for example, during start procedures in winter.

In regard to the phenyl siloxane units in the polydimethyl siloxanes, and/or in regard to phenyl siloxane units in siloxanes in general, these may be used both in pairs and in blocks in order to achieve the desired results. In addition, the compressibility described above is especially advantageous in cooperation with a gap remaining between the coupling element and revolving transmission element, which is filled with the corresponding liquid and is stably bridged by liquid even at high pressures. In this case, the liquid is used for force transmission, so that the shear forces arising herein may connect the coupling element and the corresponding transmission element non-positively. In addition, the high compressibility ensures that this transmission is possible even at high and/or higher torques, at which only a small gap may implement sufficiently high shear forces and a liquid film which does not break down, the gap otherwise able to be maintained only by high pressures and a high resistance force of the liquid against pressures this high.

It is obvious that the above-mentioned considerations in regard to the gap and/or the liquid, whether relating to their temperature stability, their compressibility, and/or their viscosity, may be advantageous, even independently of the remaining features of the transmission according to the present invention, individually or together for a continuous transmission, particularly for a transmission having two transmission elements which roll on one another.

Particularly for transmission elements which are coupled per se via a friction lock or even via hydraulic, hydrostatic, or hydrodynamic, magnetic or other contactless interaction, and/or other non-positive interactions, it may be advantageous if, in a transmission which comprises two running paths of a transmission element for a coupling element, these running paths are provided with different surfaces in order to able to implement and/or adapt the interaction, for example, a surface pressure or something similar, in a suitable way. In this case, for example, grooves or projections of different widths and/or a varying surface texture and/or surface treatment may be provided along at least one of the revolving transmission elements. In this way, for example, a surface pressure may be adapted to different radii of the transmission element. It is obvious that a surface variation of this type is advantageous in running paths on a transmission element, even independently of the remaining features of the transmission according to the present invention.

For an embodiment of the interaction which is independent of the running paths, the surface of the coupling element may also be textured. In particular, the surface may have grooves or something similar in order to influence the shear and compression forces in a suitable way in the event of a hydraulic interaction. In addition, the coupling element may also have different surfaces for different transmission elements with which it is in contact.

In order to ensure good shear force distribution, particularly in interaction with a liquid which wets the running surface of the coupling element and/or the corresponding running surface of a corresponding transmission element, without the liquid film breaking down, the coupling element may have at least one running surface having a cross-section which deviates from a straight line, preferably having a convex and/or crowned cross-section. A continuous liquid film which transmits sufficient shear forces may thus be ensured even at high pressures. The selection of the cross-section is preferably tailored to the liquid in this case. Cumulatively and/or alternatively, the cross-section may deviate suitably from a straight line for a coupling element which is only held on one side by a holding device, particularly as described below, since a one-sided holding device of this type, although it leaves the coupling element a relatively large amount of freedom, may also interact with a coupling element, which is relatively unstable because of the running surface deviating from a straight line, in a stabilizing way, so that the overall system, particularly in the event of a running path change, may also be operated with a low expenditure of force.

It is obvious that a surface design of this type of the coupling element and/or the revolving transmission elements may also be used advantageously, independently of the remaining features of the transmission according to the present invention, to design the interaction between transmission element and coupling element.

As already known from EP 0 980 993 A2 and/or from EP 0 878 641 A1, the coupling element, particularly if it is implemented as a revolving friction ring, may change its running path under its own power as a function of a set adjustment angle. In this case, the angle of the coupling element is preferably set to regulate the particular running path. Since precisely this angle is critical in regard to an adjustment and/or in regard to the stability of a running path which has been selected, it is advantageous if a corresponding actuator for the angle of a holding device and/or the holding device itself is implemented without play through pre-tension, through a spring, for example. It is obvious that pre-tension of this type is advantageous even independently of the type of the angle adjustment of the coupling element, particularly even independently of the remaining features of the present transmission.

In particular, a forced adjustment of the coupling element may be provided, as is disclosed, for example, in DE 38 35 052 A1. Particularly in an arrangement of this type, it has been shown to be advantageous, independently of the remaining features of the transmission, if the coupling element is merely in contact with a holding device in the approach region and is guided accordingly. It has been shown that a guide of the coupling element in the departure region brings instability into the system, since—because of the positive control—in addition to the twisting of the coupling element, such as a friction ring, displacement of the coupling element is also caused, which destabilizes the overall system if it acts in the departure region. For this reason, it is suggested that the revolving coupling element merely be in contact with a holding device in the approach region, through which instability of this type may be avoided.

It is obvious that in the present context the term "friction ring" also includes coupling elements in which the friction ring does not interact frictionally directly, but rather is in contact with the corresponding transmission elements via an interaction differing from a positive connection.

In an arrangement of this type, a rotational degree of freedom around an axis perpendicular to a rotational plane of the revolving axis of the coupling element preferably remains between an actuator for the holding device, which may be implemented by a spindle or even by a rod assembly, for example, and the coupling element. In this way, the influence of an adjusting positive control may be minimized, so that the friction ring and/or the coupling element may assume its appropriate position almost automatically. In particular, the possibility exists in an arrangement of this type that the holding device may be implemented extremely cost-effectively, since—in a minimal embodiment—it merely has to have a rest aligned perpendicularly to the revolving plane of the coupling element which points toward the coupling element. In an alternative embodiment, the holding device may hold the coupling element essentially without play and a corresponding rotational degree of freedom, such as a joint, may be provided between the holding device in the actuator. Alternatively, it is also possible for the holding device to have sufficient play for the rotational degree of freedom of the coupling element.

Alternatively and/or cumulatively, a stationary holding device may be provided for the coupling element, through which the coupling element may be held as selected in a defined running path. Through a stationary holding device of this type, for example, a continuous operating state may be implemented which may include rapid acceleration or braking caused by the motor only for special situations, startup, for example.

In addition, a transmission having two revolving transmission elements is suggested, each of which has at least one running surface for a revolving coupling element, at least one of the running surfaces having at least two running paths for the coupling element having different running radii and actuating means being provided, via which the coupling element may be adjusted from one of the two running paths to the other of the two running paths and which includes an activatable actuator, the transmission being distinguished in that the actuating means includes a safety device which adjusts the coupling element into a safety running path in the event of breakdown of the activatable actuator.

Cumulatively and/or alternatively, it is suggested that the safety device adjust the coupling element, preferably into the safety running path, using a defined speed.

In addition, it is suggested cumulatively and/or alternatively thereto that the safety device comprise pre-tensioning of at least one further assembly of the actuating means.

Through the measures described, it is ensured that the transmission remains in controlled operating states even in the event of a system breakdown, particularly in the event of a breakdown of the controller. In this way, by pre-tensioning an assembly, such as an actuating bridge, a cage, or something similar, it may be ensured that if an adjustment force of the activatable actuator fails, this assembly reaches a desired position because of the pre-tensioning, so that the coupling element is adjusted in a suitable way. Particularly if the coupling element is adjusted into a safety running path, it is ensured that a vehicle and/or a drivetrain having the transmission remains functional and the coupling element does not leave the running surface because of the system error. Preferably, the safety running path is selected for a transmission ratio at which a motor may also perform start procedures. In this way it is ensured that a vehicle may still be moved up to a target point, such as a parking place, even if it is only slowly.

Otherwise, the vehicle would no longer be able to start in the event of a temporary stop. However, if the transmission has further transmission elements which regulate transmission ratios, such as a first gear, in addition to the revolving transmission elements and the coupling element, a running path having a transmission ratio which allows more rapid travel may be selected as the safety running path. Start procedures may then be assumed by this first gear, while the safety running path may be used for more rapid travel.

The coupling element is preferably adjusted into the safety running path at a defined speed, since in transmissions of this type arrangements are possible in which the coupling element may be adjusted over all of the possible running paths and/or over the entire running surface within a few rotations of the corresponding transmission element. In arrangements of this type, uncontrolled adjustment under unfavorable operating conditions would occur so rapidly that the driving motor would not be capable of adapting itself to the changed operating conditions. This may lead to immediate stoppage of the motor, its destruction, and/or to destruction of the transmission, through which a motor vehicle would suddenly become uncontrollable, for example. Through a defined adjustment speed, it is ensured that the operating conditions do not change in an uncontrolled way and particularly do not change too rapidly even during a system breakdown, of an electronic controller, for example, so that a motor may follow this change. A defined adjustment speed of this type may be ensured, for example, through a suitable pre-tension. A safety running path may be defined, for example, by a corresponding stop, which is possibly provided with a spring. Two spring devices may also be provided, one of which decisively controls at least the adjustment speed in one adjustment direction and the other of which decisively controls at least the adjustment speed in the other adjustment direction, so that the corresponding coupling element may be guided from any operating position into a safety running path without a hard stop through the interplay of these two fault arrangements.

Instead of a fixed stop and/or instead of a fixed but spring-loaded stop, the safety device may have an adjustable stop and/or an adjustable and spring-loaded stop, which is displaceable via an additional actuator. In this way, a directly unchangeably defined safety running path does not result. Rather, the running path may be preset by the additional actuator.

In addition, it is advantageous if the final positions of the coupling element are detected by a sensor, particularly electrically. In this way, special operating states, such as a defect of the transmission, may be detected rapidly and reliably. Preferably, the transmission additionally has at least one mechanical end stop in the approach region of the coupling element, against which the coupling element may run in the event of a running path change and which are positioned in such a way that they bring the revolving axis of the coupling element into a stationary position if the coupling element runs against one of the end stops. This achievement of the object is also based on the knowledge that stable ring guiding is performed most reliably in the approach region, so that in this regard the end stops may actively influence the adjustment angle of the coupling element and therefore its travel from one running path to the other in order to prevent total transmission damage in this way if the holding device breaks down, for example.

The features described above in regard to the holding device are also advantageous independently of the remaining features of the transmission, particularly for significantly reducing the number of assemblies and therefore the costs for the overall transmission. In particular, in a holding device of this type the holding device itself may be constructed significantly lighter, so that the necessary movement sequences may also be implemented more rapidly and/or using fewer motorized drives. In this regard, a force-adjusted holding device additionally has the advantage that the position of the coupling element may be determined directly on the basis of the position of the holding device, so that further sensors may be dispensed with.

In order to ensure, in a transmission having a continuously variable partial transmission, that problems in special driving situations, for example, during slow driving, in a reverse gear, and/or during constant steady load, are reduced, a transmission having a continuously variable partial transmission is suggested which is distinguished by two transmission paths connected in parallel, the continuously variable partial transmission being provided in a first of the two transmission paths.

An arrangement of this type allows special driving and/or load situations to be implemented by the second transmission path, while the first transmission path may provide advantages of the continuously variable transmission. In the present context, the term "parallel connection of two transmission paths" indicates that the two transmission paths have [word missing] between a shared input-side partial transmission, such as the drive shaft of a motor or a clutch disk or something similar, and a shared output-side partial transmission, such as the main differential of a motor vehicle. Between the shared input-side partial transmission and the shared output-side partial transmission, the two transmission paths may be operated simultaneously alternately, additively, and/or differentially, in order to thus meet different requirements. It is obvious that an arrangement of this type is advantageous even independently of the remaining features of the present invention.

It may thus be advantageous if a reverse gear, a first gear, and/or an overdrive is provided in the second of the two transmission paths. For these situations, continuously variable transmissions are only usable in a limited way and with a relatively large outlay and/or are subjected to large losses, particularly in overdrive, i.e., at high speeds and low torques.

If at least one freewheel is provided between the two transmission paths, these transmission paths may be guided together without complex switching outlay and/or without complex switching and regulatory technology.

Cumulatively and/or alternatively, in a transmission which comprises a continuously variable partial transmission, the latter may be positioned between two power dividers, such as a differential gear part or a planetary gear part, at least one input of the continuously variable partial transmission being mechanically connected to at least one output of an input-side power divider and at least one output of the continuously variable partial transmission being mechanically connected to at least one input of an output-side power divider. Through an arrangement of this type, a torque transmission may be implemented so it may be enlarged and/or the adjustment range of the continuously variable partial transmission may be enlarged, this occurring at the cost of the efficiency according to the current knowledge, since the two power dividers naturally lead to losses. However, an arrangement of this type allows a significant increase in the breadth of application for continuous transmissions. In addition, the torque which must be conducted through the continuously variable partial transmission itself may be reduced, through which the losses may be kept within limits with a suitable implementation, since a lower torque in the continuously variable transmission, particularly if it is a conical friction ring transmission, leads to lower losses there, which correspondingly may reduce the losses in the power dividers.

Cumulatively and/or alternatively, in a transmission which also comprises at least one forward gear and at least one reverse gear, independently of the presence of a continuous transmission, a differential gear may be provided which implements this forward gear and this reverse gear, at least one assembly of the differential gear part able to be fixed alternately with the housing and/or with another assembly of the differential gear part. In this way, a transmission having a forward gear and a reverse gear may be implemented very compactly, in which, for example, a differential assembly of the differential gear is used as the input. If the central assembly of the differential is then connected to the second differential assembly, one rotational direction may be implemented. In contrast, if the second differential assembly and/or the central assembly of the differential is connected to the housing and fixed in this way, the other assembly which is not fixed changes its rotational direction, through which the above mentioned gear reversal may be implemented. In this way, a transmission which has a forward gear and a reverse gear may be implemented especially compactly.

In addition, a transmission is cumulatively and/or alternatively suggested which comprises at least two transmission stages which may be switched alternately into the transmission path via a switching gear part, a first of the two transmission stages having a continuously variable partial transmission. An arrangement of this type first appears contrary to the system, since a continuous transmission is provided in order to be able to dispense with switches of any type. However, an arrangement of this type allows a continuous transmission to be used only when its advantages actually predominate. For example, relatively high torques frequently occur during startup, which significantly load a continuous transmission and/or require an excessively large design of the continuous transmission. It is thus advantageous to implement a first gear separately, for example, and only connect the continuously variable partial transmission after startup. In this case, the continuously variable partial transmission may particularly be dimensioned in such a way that before the switching procedure from one in to the other of the two transmission stages, the speed of the second transmission stage is adapted by the continuously variable transmission to the speed of the first transmission stage, so that the transition from the first transmission stage to the second transmission stage and/or even from the second transmission stage to the first transmission stage may occur continuously per se. In this way, the advantages of a continuous partial transmission may be exploited optimally, without having to accept disadvantages as may arise during startup, for example.

This is also true for states having essentially constant output and/or having essentially constant torques, in which a continuously variable partial transmission is not absolutely necessary per se, since speed changes may be implemented by speed changes of the motor. In operating states of this type, continuously variable partial transmissions typically have high losses—caused by slip, for example—which may be avoided by a connected transmission stage, the switching also able to be implemented here at operating points at which a stage change of this type is not or is only insignificantly noticeable to vehicle occupants. In particular, the continuously variable transmission may be brought into a suitable operating situation for this purpose. For example, engaging and/or disengaging a transmission stage of this type via a freewheel is also conceivable.

In addition, the transmission stage, which may be engaged in addition to the transmission stage comprising the continuously variable partial transmission, may comprise a differential gear element which is used, for example, to switch between forward and reverse gears and for a startup gear. Particularly in an embodiment of this type, it is advantageous if the assemblies of the differential gear element which are necessary for switching between forward and reverse gears are fixed via friction clutches, through which the most careful and uniform changeover possible may be implemented.

In a transmission having two transmission stages, which may be switched alternately into the transmission path via a switching gear part, a first of the two transmission stages comprising a continuously variable partial transmission, the switching gear part may couple the continuously variable partial transmission to a pump wheel of a Trilok converter, or another assembly which is connected directly to a motor output shaft, and the second transmission stage may be coupled to a turbine wheel of the Trilok converter, or another connectable motor output assembly. In this way, the motor output, particularly in normal operating states, may be conducted directly to the continuously variable partial transmission, while, particularly during startup procedures, high torques may be transmitted to the second transmission stage, so that it is unloaded in relation to the continuously variable partial transmission. This is particularly true in the interaction with the turbine wheel of a Trilok converter, in which a torque overload naturally occurs, which would otherwise significantly load the continuously variable partial transmission.

Particularly in combination with an electric motor, a continuously variable partial transmission having coaxially positioned drive and output is advantageous even independently of the remaining features of the transmission according to the present invention, since in an arrangement of this type, torques acting on the housing may be minimized in an especially compact way. Preferably, a differential gear part is provided in the coaxial output, which is in turn driven by an output of the continuous transmission. This arrangement is especially compact, since the output of the continuous transmission acts without further intermediate stages on a differential gear, which must be provided anyway, particularly in motor vehicles. In addition, gear wheels or other transmissions are typically required anyway in order to provide a coaxial drive and output, so that no additional components become necessary due to the differential gear part. The arrangements described above are suitable in connection with an electric motor drive in particular, it initially appearing contrary to the system to connect an electric motor to a continuously variable transmission, since the speed of an electric motor is nearly arbitrarily adjustable anyway. However, the continuously variable transmission allows an electric motor to be operated at speeds at which it has favorable torque/current intensity ratios. In this way, the overall efficiency of the corresponding drivetrain may be elevated and/or the amount of current necessary, particularly at low speeds, may be reduced.

A transmission according to the present invention, but also a different continuously variable transmission, may be mechanically connected at the drive or output side to a disengagement point, such as a startup clutch, a converter, a friction disk, a hydraulic clutch, and/or a synchronization. This arrangement, which is contrary to a continuously variable transmission per se, has the advantage that the continuous transmission and/or the drive may be cared for in startup procedures, so that the service life is extended. A startup clutch and/or disengagement point provided on the output side is especially advantageous, since in an arrangement of this type a stoppage adjustment is possible with the motor running. In addition, a startup clutch and/or disengagement point on the drive side allows connection of other transmission elements if they are necessary.

The output of the two partial transmissions preferably engages at a drive of the following transmission path and the partial transmissions are preferably guided together again in this way. The transmission is built especially compactly if this drive of the following transmission path is the main differential, i.e., the differential which connects and drives the two wheels of a driven motor vehicle axle. A compact construction of this type is reflected in a lower piece count, through which the costs may be reduced. In addition, a compact construction of this type results in a smaller overall volume, through which the total costs for the motor vehicle may be reduced further.

Depending on the concrete implementation, it may be advantageous if one of the two partial transmissions comprises a reverse gear, possibly having a first gear, while the second partial transmission has the continuously variable transmission, particularly a conical friction ring transmission. Particularly if the first of these partial transmissions dispenses with a separate first gear, this results in an especially compact construction having the above-mentioned advantages.

The two partial transmissions may preferably each be engaged and/or disengaged. This may particularly be performed by interrupting the particular partial transmission path via a clutch. In a first approximation, it plays no role for this purpose at which point this interruption is performed; it may be both on the drive side and on the output side, the transmission elements positioned beyond this disengagement being able to run on unloaded without anything further, so that the two partial transmission paths do not each have to be provided with two clutches. To avoid losses because of freewheeling transmission elements, however, multiple clutches may be provided in the partial transmission paths. However, the latter increases the number of components and the installation space necessary, which in turn has effects in regard to cost.

It is obvious that a construction of this type of a continuous transmission having a parallel partial transmission is advantageous even independently of the remaining features of the present invention. This is particularly true in connection with a conical friction ring transmission as the continuous transmission, since in this way the advantages of a rotational direction reversal caused by the conical friction ring transmission may be implemented very effectively in a compact way with the other partial transmission.

In regard to a compact construction, it is additionally suggested, in a continuously variable transmission, particularly in a conical friction ring transmission, that a clutch element, which is used for engaging and/or disengaging the transmission path comprising the continuously variable transmission, be provided inside one of the continuously variable transmission elements, for example, inside a cone, of the particular continuously variable transmission. In a continuously variable transmission, relatively large interaction surfaces must be provided on the essential transmission elements, so that a corresponding variability may be ensured. Through the arrangement of a clutch element of this type within the transmission elements, which comprise these large interaction surfaces, significant overall space may be saved, since the otherwise unused overall space inside these transmission elements may be used. It is obvious that an arrangement of this type of a clutch element shows the corresponding advantages in a continuously variable transmission even independently of the remaining features of the present invention.

Furthermore, cumulatively and/or alternatively, a continuously variable transmission, particularly a conical friction ring transmission, having a reverse gear provided behind the output in series with the remaining transmission, is suggested. An arrangement of this type has the advantage that the transmission may be operated using a constant rotational direction, which is advantageous for the continuously variable transmission in regards to its activation and/or in regard to the adjustment of the friction ring. In addition, this arrangement also allows the reverse gear to be varied continuously.

In regard to the arrangement of the reverse gear, the terms "in series", "in front", and/or "behind" relate to the flow of force in the drivetrain comprising a continuous transmission. Thus, according to the present invention, the reverse gear is to be provided in series on the side of the continuously variable transmission facing away from the motor in the drivetrain.

The reverse gear preferably includes an epicyclic gear having at least one revolving gear mount, which mounts at least one transmission element of the epicyclic gear and may be fixed alternately with a housing and/or with a revolving transmission element. Through an arrangement of this type, a reverse gear is provided which—as required—may be switched even during the rotation of the drive, i.e., even during the rotation of the conical friction ring drive and/or the continuously variable transmission, by alternately fixing the revolving transmission element correspondingly, fixing of this type able to be performed appropriately carefully through suitable clutches and/or synchronizations. A changeover capability of this type is particularly tailored to the requirements of a conical friction ring transmission, which may only have its transmission ratio varied in the rotating state.

The reverse gear may particularly comprise a planetary gear having planet wheels, sun wheel, and external wheel, of which a first transmission element is mechanically connected to the output of the continuously variable transmission and a second transmission element is mechanically connected to the output of the overall arrangement made of the continuously variable transmission and reverse gear, while the third transmission element may be fixed at least in regard to one degree of freedom in relation to a housing. A planetary gear has the advantageous property that when one of the transmission elements is fixed—external wheel, sun wheel, or planet wheels, the latter advantageously maintaining their intrinsic rotation capability—the particular other transmission elements may revolve further and interact with one another in accordance with the transmission ratios resulting therefrom. In particular, a corresponding fixing of a transmission element, particularly in regard to a degree of freedom, causes a substantial change of the relative speeds between the remaining two transmission elements, so that this change of the relative speed may be used to activate the reverse gear.

The latter may particularly be ensured if the planet wheels are the third transmission element. If the planet wheels per se are fixed in their rotational degree of freedom around the corresponding sun wheel in a planetary gear, a reverse in direction immediately occurs between the external wheel and the sun wheel, through which a corresponding reverse gear may be implemented, if the particular forward gear is implemented with planet wheels also running correspondingly, transmission ratios—if necessary—able to be selected in a suitable way through the planetary gear.

The overall arrangement, made of the continuously variable transmission and/or particularly of the conical friction ring transmission and reverse gear, is built especially compactly if the first transmission element is driven by a pinion revolving with the output cone of the conical friction ring transmission. An arrangement of this type ensures immediate and direct force and/or torque flow between the conical friction ring transmission and the reverse gear, so that the overall arrangement may be built extremely compactly and therefore extremely cost-effectively, particularly for modern motor vehicles.

In regard to the latter requirement, it may be cumulatively and/or alternatively advantageous if the second transmission element revolves connected to the revolving mount of a differential. In connection with the use in a motor vehicle in particular, the main differential may thus be advantageously used, so that the reverse gear is integrated immediately and directly into the differential, a compact construction resulting particularly in connection with a conical friction ring transmission, independently of the drive-side embodiment of the reverse gear.

Particularly in regard to normal operation, it is advantageous if the first and the second transmission elements may be fixed with one another. Depending on the concrete embodiment of the switching process in regard to the reverse gear, an adjustment of this type may also be advantageously used in other ways in order to fix a desired operating state of the planetary gear. Because the first and the second transmission elements may be fixed with one another, a direct force flow via the planetary gear is ensured, so that in this operating state the planetary gear operates essentially without loss and the overall arrangement operates with an extremely high efficiency, particularly in regard to a forward gear. The alternate fixing of the third transmission and the two first transmission elements is preferably coupled appropriately, so that the planetary gear revolves reliably in each of its states. It is especially advantageous in this regard if the first and second transmission elements are formed by the external wheel and sun wheel of the planetary gear, respectively, and the third transmission element is formed by the planet wheels, since in this way the necessary interaction between the transmission elements may be implemented very simply and compactly. This is particularly true if the second transmission element is connected directly to the revolving mount of the differential and/or is implemented in one piece therewith and/or the first transmission element is driven directly by a pinion running with the output cone. In an embodiment of this type, the overall arrangement, particularly in typical motor vehicle drives, each of which are implemented with equidirectional drives because of the high piece counts and variations in the complementary motor vehicle classes, leads to an extremely compact and therefore cost-effective transmission, which is even usable in extremely small vehicles.

Greatly varying types of fixing, such as friction-lock or form-fit connections, may be advantageously applied for fixing the revolving transmission mount and/or the planet wheels or the third transmission element in relation to the housing in regard to a degree of freedom, for example. Friction lock connections, which allow a smooth transition and which—depending on the concrete embodiment—even allow switching on the reverse gear during rotation, have been shown to be particularly advantageous. However, the latter is not advantageous for every application because of the relatively high forces and friction losses, so that a startup clutch between the motor and the conical friction ring transmission may be advantageous in cases of this type in particular. Depending on the concrete application, clutches, slanted brakes, synchronizations, and similar arrangements may be suitable for the fixing, as are generally typical in connection with well-known transmissions.

It is obvious that an arrangement of this type of a reverse gear is also advantageous cumulatively with and/or alternatively to the features of the present invention in order to provide a transmission with the corresponding advantages described above. The degree of compactness and therefore the number of assemblies used and/or the cost reduction resulting therefrom and/or the rotational direction of the motor are particularly in the foreground in this case.

In order to provide a continuously variable transmission which may also transmit higher torques reliably and with low losses, it is suggested that a transmission of this type be provided, cumulatively and/or alternatively to the above-mentioned features, with at least two continuously variable partial transmissions which are positioned in parallel in a transmission path, the two continuously variable partial transmissions being switched via summation gear at an input and/or output element.

The use of a summation gear, also called a superposition gear, has the advantage that identical speeds and/or exactly fixed speeds for one of the transmission elements of the partial transmissions, as are necessary in the related art, are not required. Rather, both partial transmissions provide their own, speed-dependent contribution to the resulting speed of the summation gear. The arrangement according to the present invention thus allows both partial transmissions to be activated and also regulated separately, and therefore uses the advantages which result from disassembly of a continuously variable transmission into two continuously variable partial transmission, such as dividing the torque onto the two partial transmissions, without having to accept the disadvantages which result from a forced speed, such as friction losses or increased regulating cost, because of this.

The switching of the two partial transmissions via the summation gear, which is asymmetrical and therefore free per se, therefore causes advantages in an unexpected way in regard to the transmission conception and/or usage, particularly in regard to the efficiency and in regard to the requirements on the controller, which is not possible in the event of symmetry, as is required by the coupling of the planet wheels of a planetary gear.

Typical representatives of a summation gear according to the present invention are, for example, planetary gears, in which two of the three gear components (planet wheels, sun wheel, external wheel) are connected to the two partial transmissions and the third gear component is used as the output and/or drive, the planet wheels being used together as a gear components, and/or a differential, in which the two partial transmissions are each connected to one of the differentiating elements of the differential.

The two continuously variable partial transmissions may have a shared transmission element on their side facing away from the summation gear. This may be, for example, a shared input shaft or a shared output shaft. This may also particularly be a direct transmission element of the two continuously variable transmissions, which is used together by both partial transmissions. For this purpose in conical friction ring transmissions, for example, one of the cones suggests itself as the shared transmission element. Through an embodiment of this type, a transmission of this type is built relatively compactly and cost-effectively, since the total number of the elements of the corresponding transmission may be minimized through the double use.

In the present context, the term "the side facing away from the summation gear" refers to a direction in the transmission path which is defined by the force flow through the transmission and does not absolutely have to correspond with the geometric and/or spatial relationships.

Manifold continuously variable transmissions have a main transmission plane, in which the essential assemblies, such as input and output shaft, input and output cones, or similar rotationally-symmetric bodies, are positioned and define a transmission plane in this way. A transmission according to the present invention is built especially compactly if the two main transmission planes of the two partial transmissions are positioned parallel to one another. An especially flat construction may be achieved if the two partial transmission planes are identical. A transmission according to the present invention embodied in this way is constructed extremely flat and is additionally capable of countering even relatively large torques. Among other things, a transmission of this type is thus particularly suitable for small trucks having diesel engines, since it is especially well designed in regard to its overall space for attachment under a loading surface, for example, and in addition may counter the high torques of modern diesel engines without anything further.

In addition, a further adjustable partial transmission, such as a switching gear and/or a reverse gear, may be provided between at least one of the continuously variable partial transmissions and the summation gear. Through an arrangement of this type, transmissions having a very broad drive behavior, particularly with the possibility of continuous forward and reverse drive, may be implemented. In particular, it is possible to feed back a transmission of this type, even with the drive running, in such a way that the output stops without torque.

Even if the present invention significantly increases the efficiency of the overall transmission in relation to transmissions according to the related art, continuously variable transmissions, particularly under relatively constant operating conditions, such as after a startup procedure or on a highway or freeway, display relatively high losses. In order to avoid losses of this type, particularly under operating conditions in which a continuously variable transmission is not absolutely necessary, it is advantageous if at least one of the continuously variable transmissions may be bypassed. In this way, for example, under the above-mentioned operating conditions, the continuously variable partial transmission having its relatively high losses may be bypassed, so that under these operating conditions the efficiency is increased. It is obvious that the use of two continuously variable transmissions of this type is advantageous even independently of the remaining features of the present invention.

Further advantages, goals, and properties of the present invention will be explained on the basis of the following description of the attached drawing, in which exemplary transmissions are illustrated. In the drawing:

FIG. 17 shows the arrangement in FIGS. 15 and 16 with the cone clutch opened;

FIG. 18 shows the detail enlargement XVIII in FIG. 17;

FIG. 27a shows a schematic section through a coupling element and/or friction ring FIGS. 27b through e show different surface designs in detail enlargements of the detail A in FIG. 27a;

FIG. 28 shows the actuating bridge of the transmission in FIG. 1 in a schematic top view;

Figure 1:
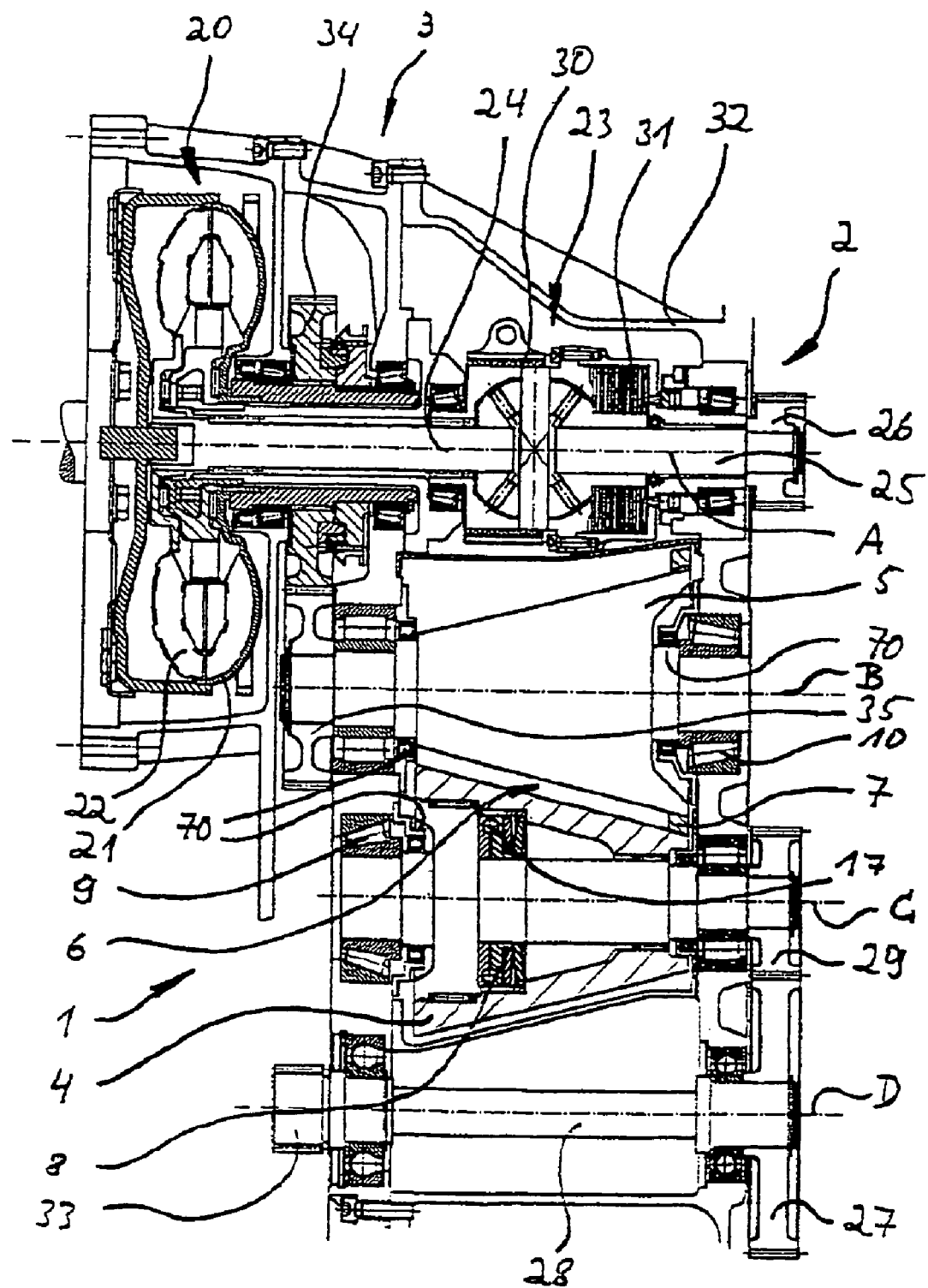
FIG. 1 shows a first transmission in section along the line I-A-B-C-D-I in FIG. 2.
Figure 29:
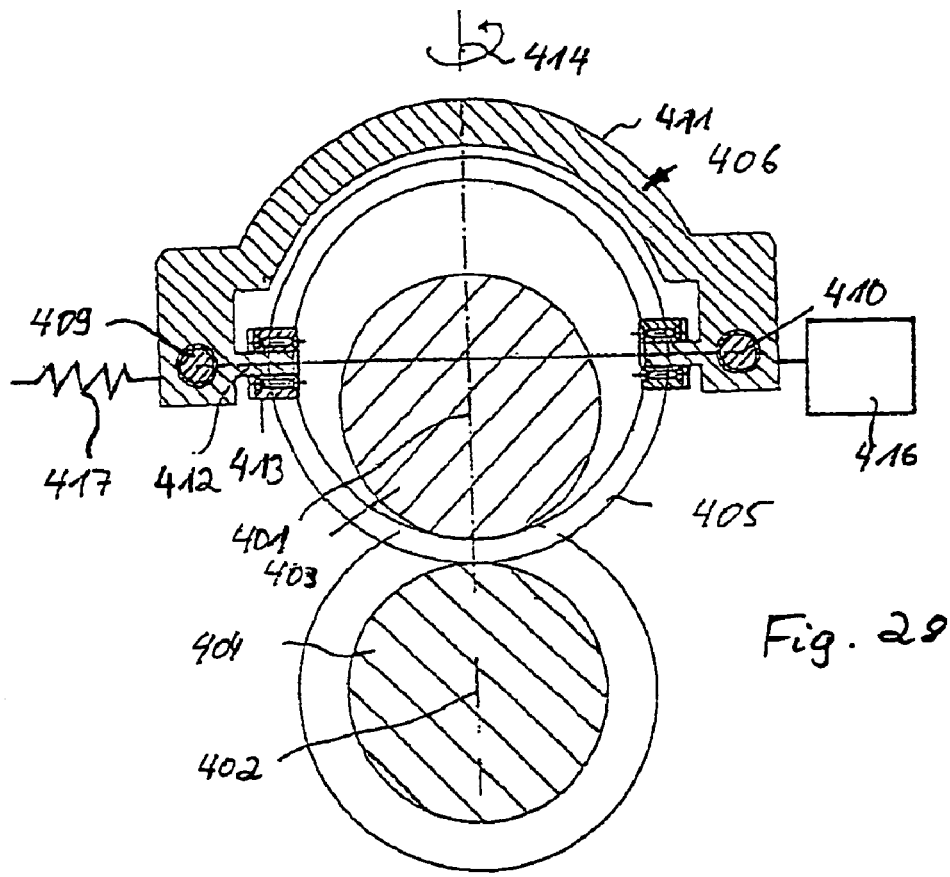
Figure 29:
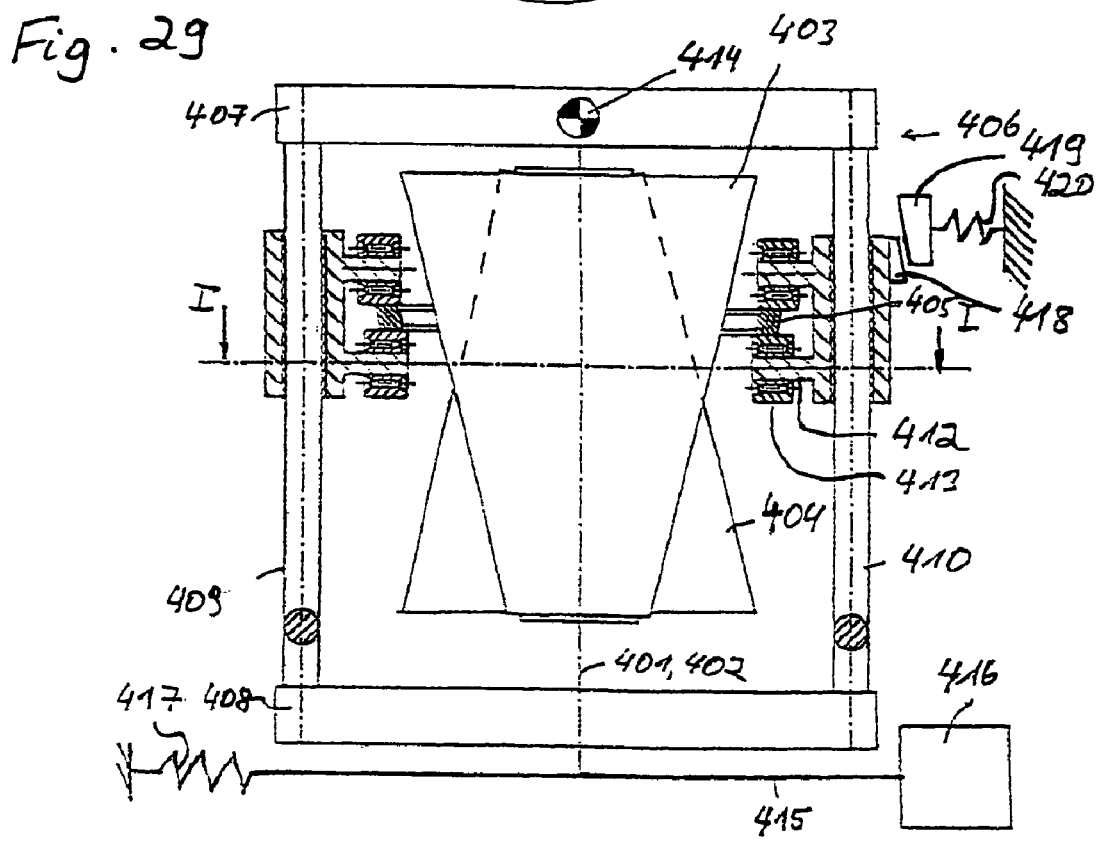
Figure 30:
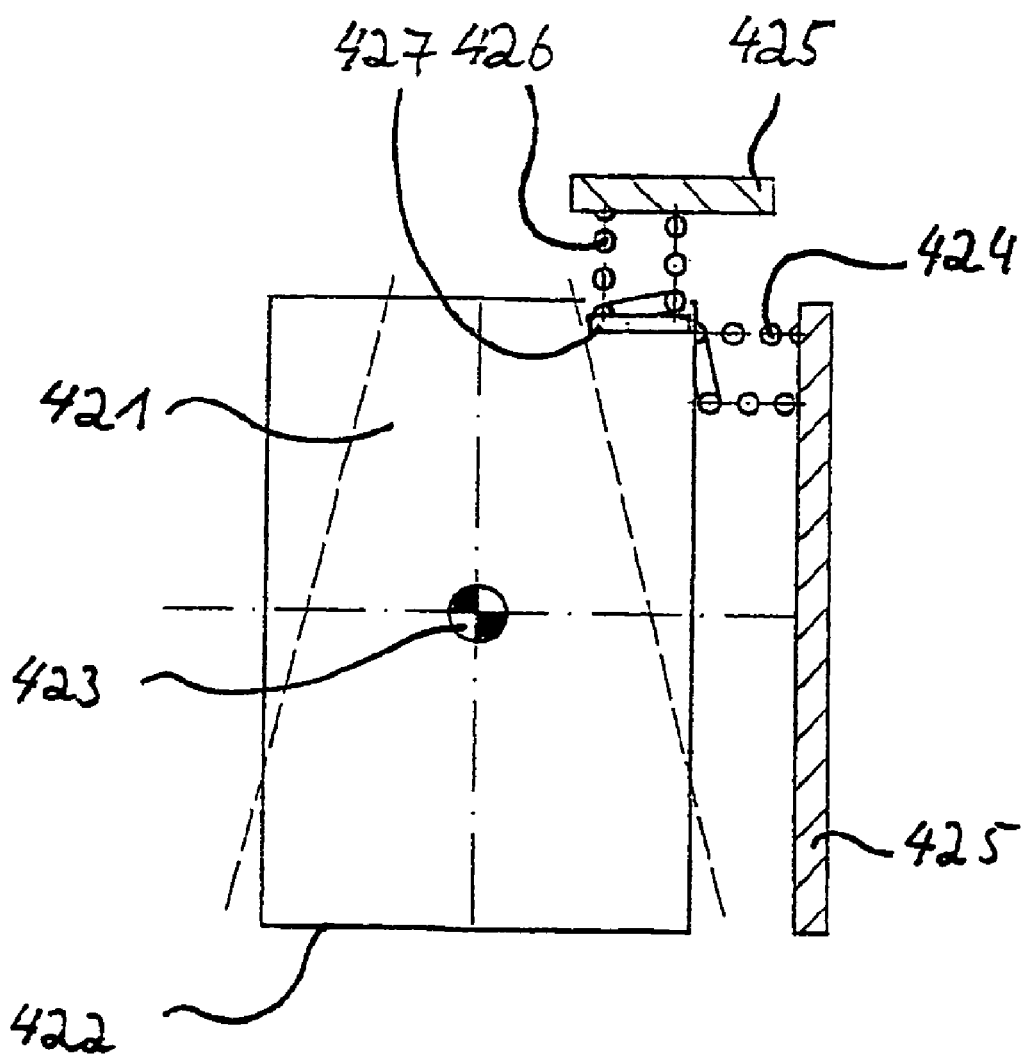
Figure 31:
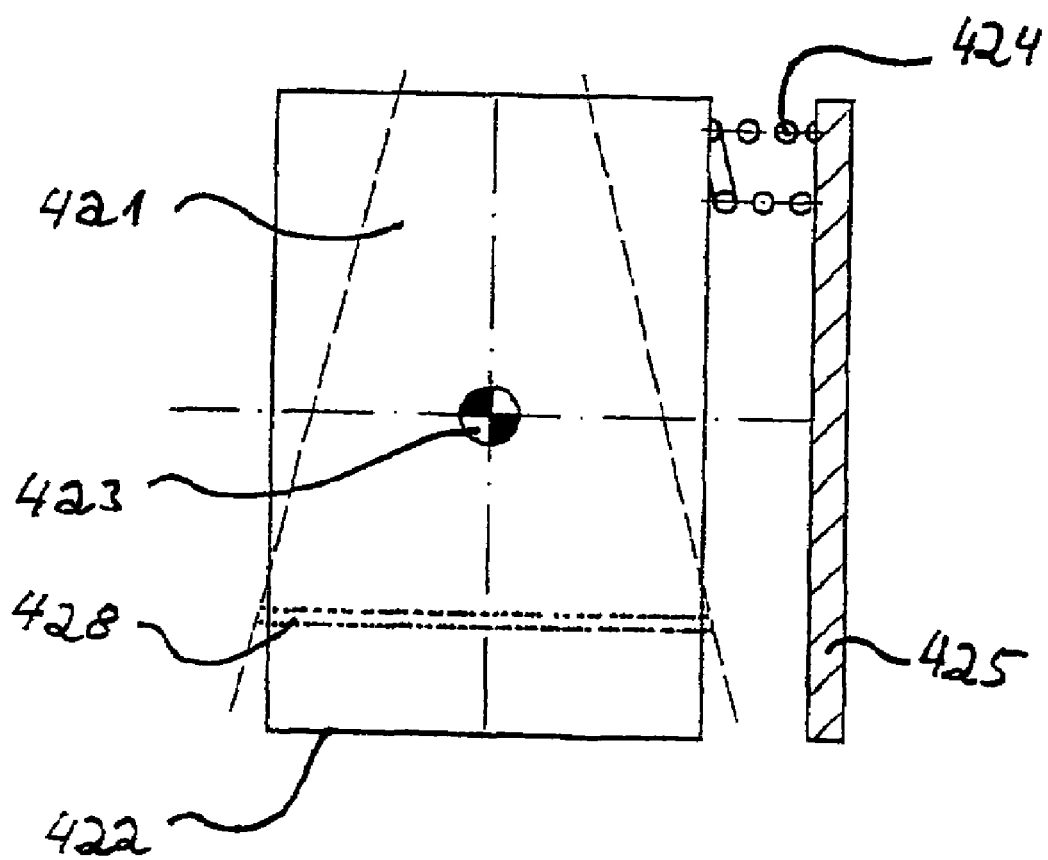

FIG. 29 schematically shows pre-tensioning of the actuating bridge in FIGS. 1 and 28;

FIG. 30 schematically shows an end stop for the holding device in FIGS. 28 and 29; and FIG. 31 shows an alternative embodiment for the holding device shown in FIGS. 28 to 30.

Figure 32:
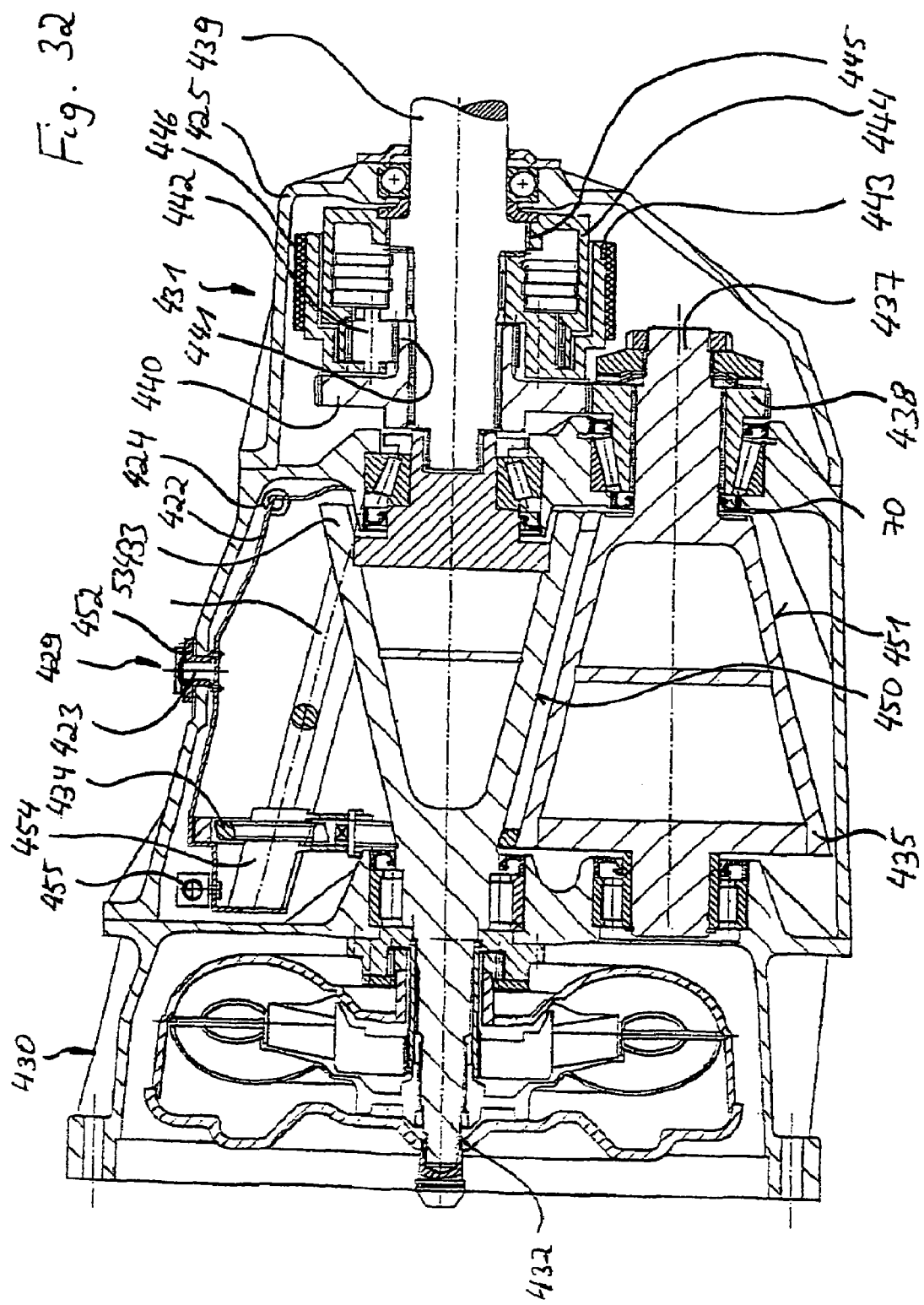
Figure 33:
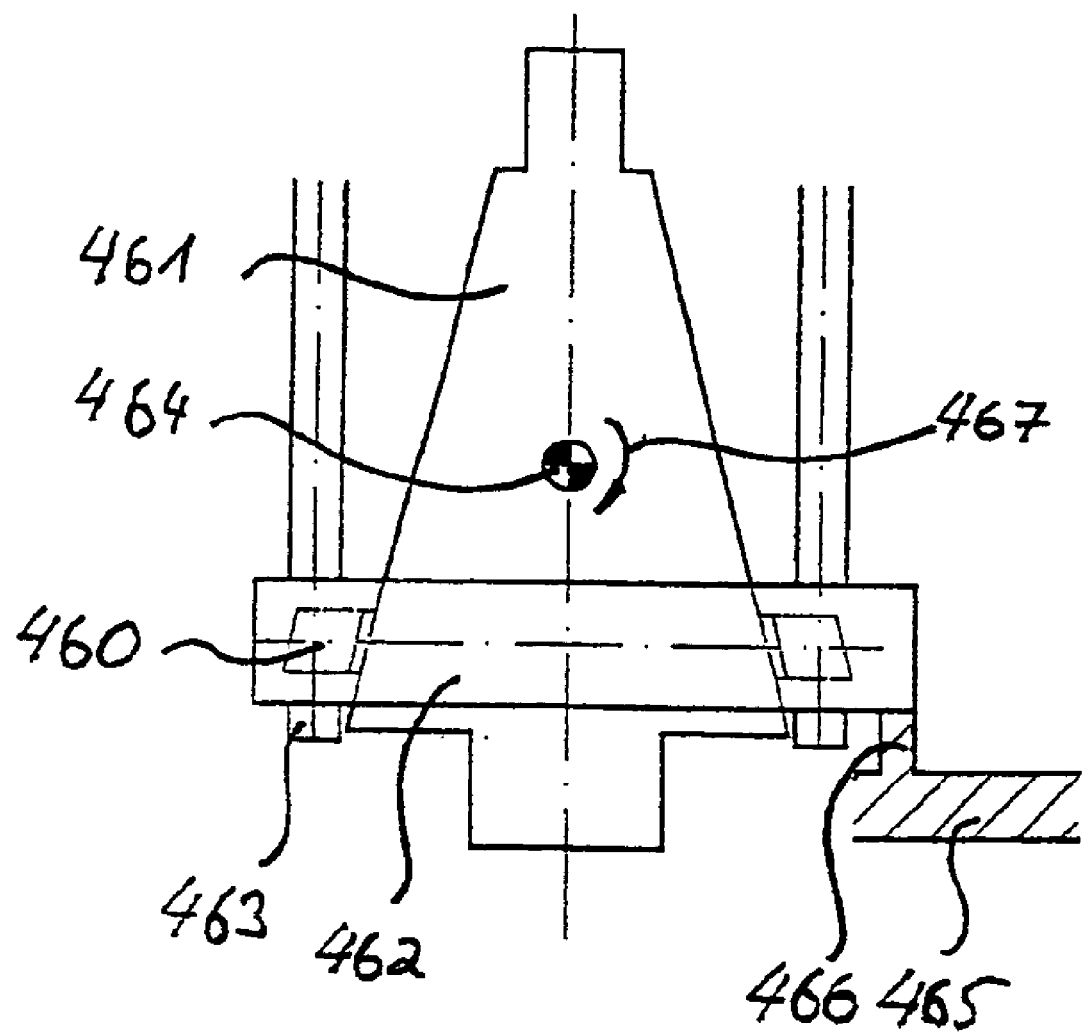
Figure 34:
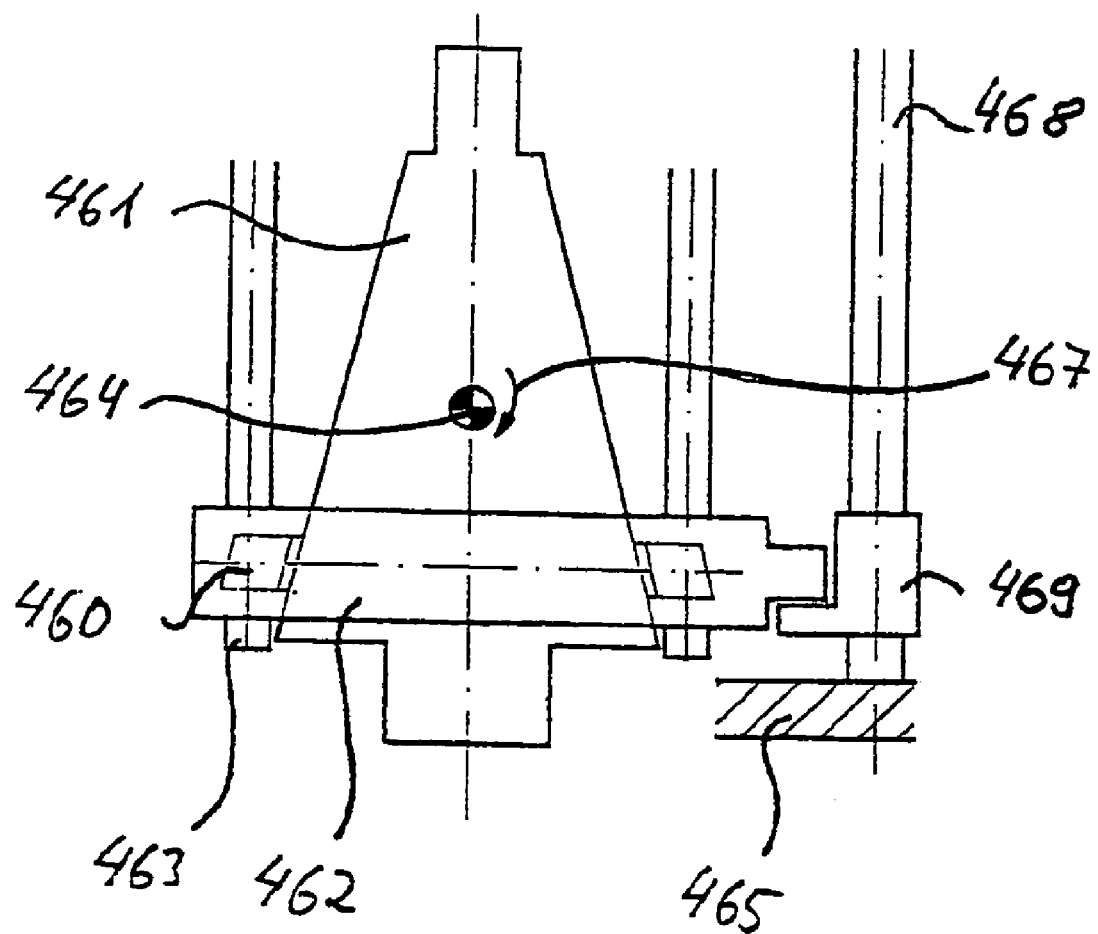
Figure 35:
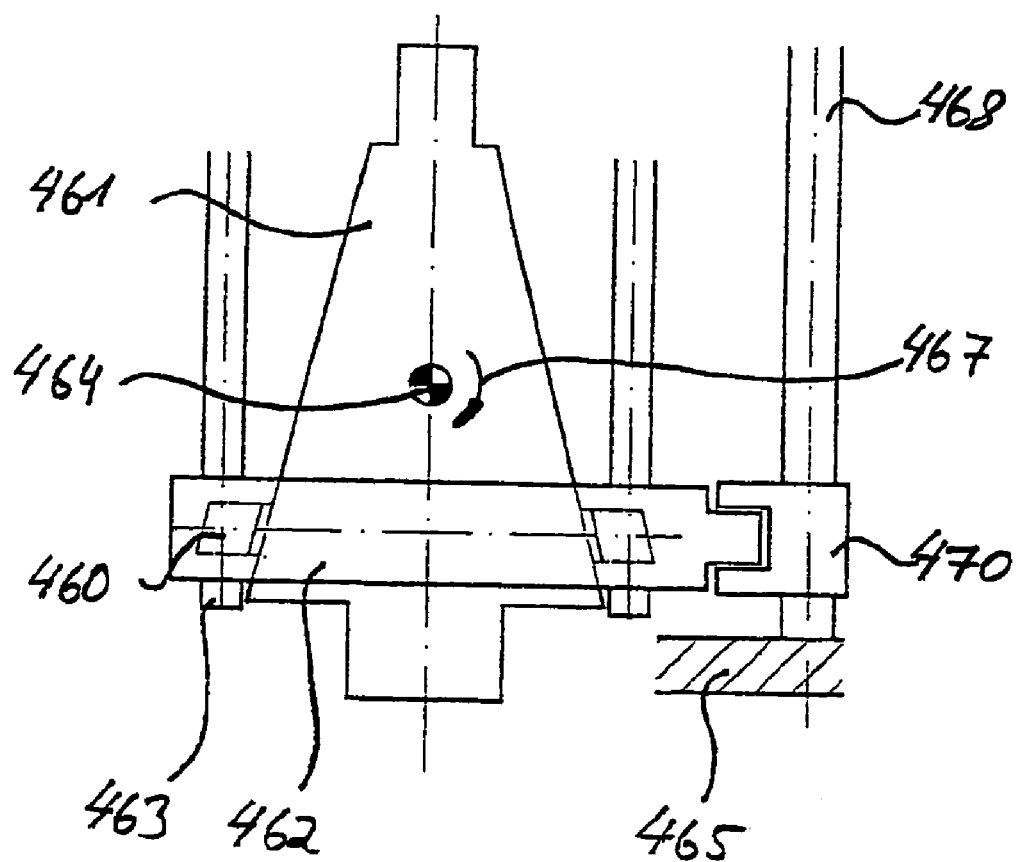

FIG. 32 shows an implementation of the embodiment of FIG. 31;

FIG. 33 shows an alternative embodiment with a rigid stop;

FIG. 34 shows an embodiment with a moveable stop;

FIG. 35 shows an embodiment with a moveable holder; and

Figure 36:
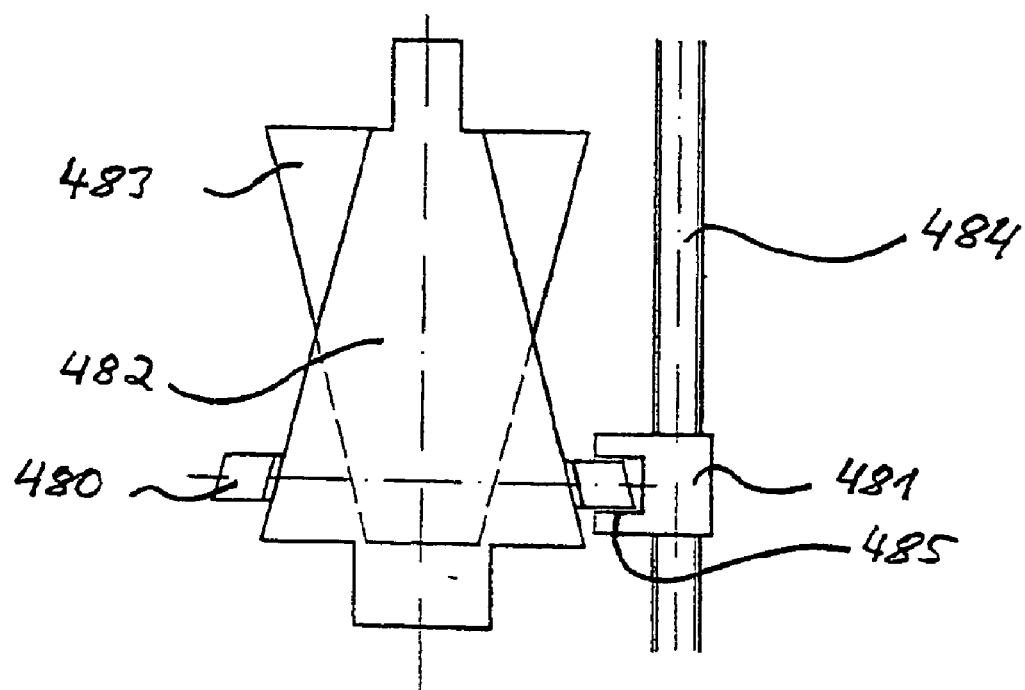

FIG. 36 shows an embodiment with a moveable holder just for the ring.

Figure 2:
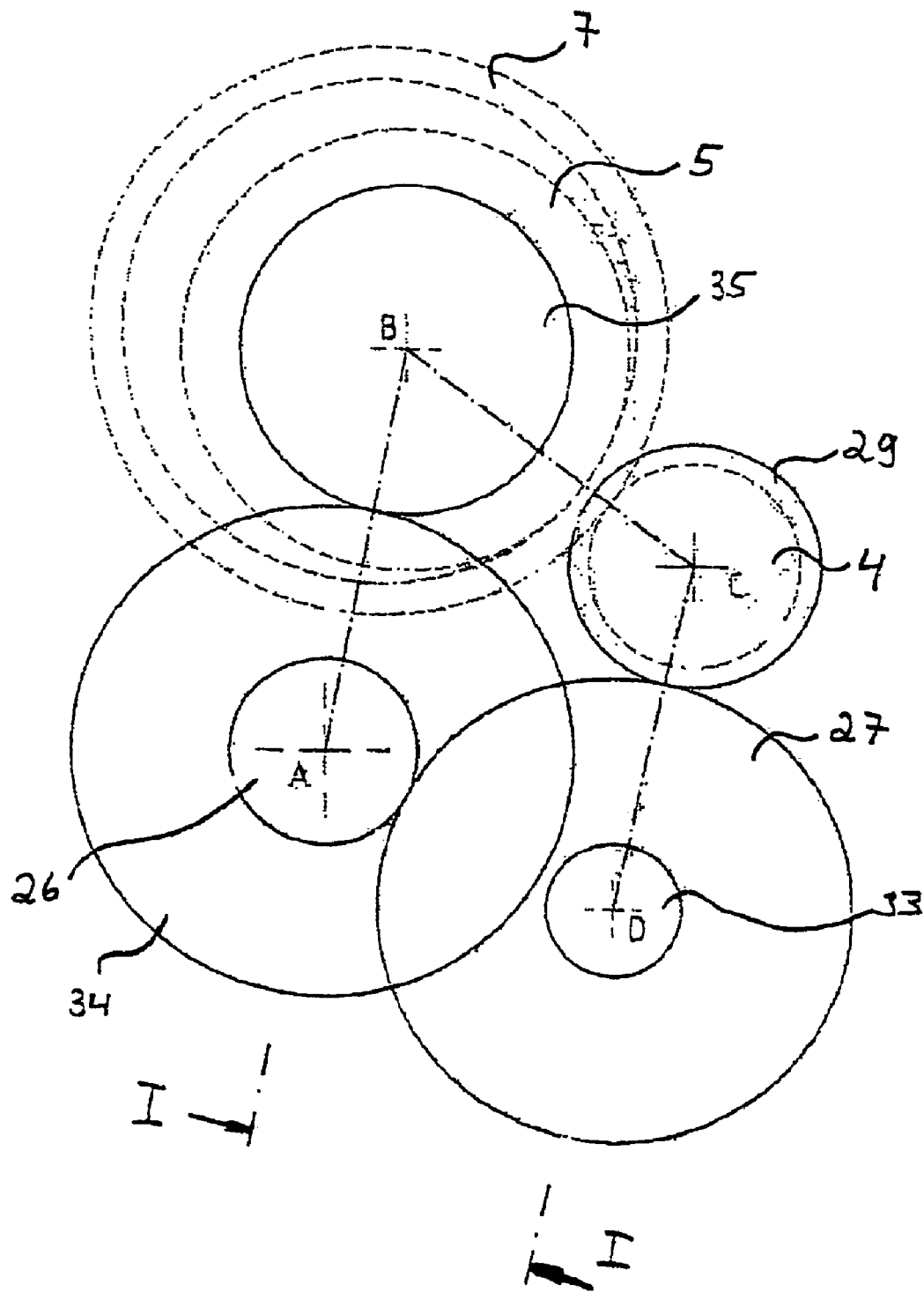
FIG. 2 shows the transmission in FIG. 1 in a schematic side view.
Figure 3:
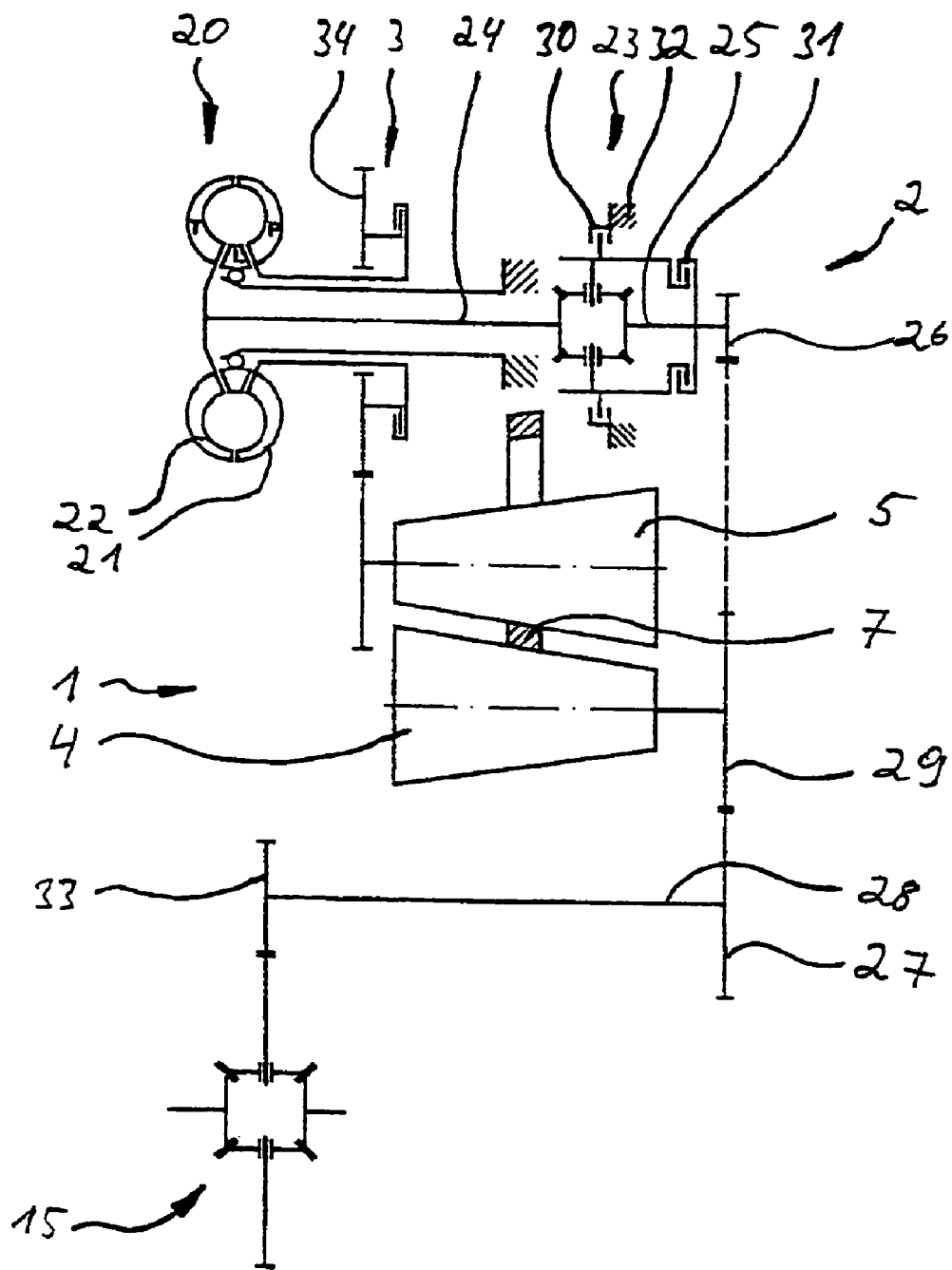
FIG. 3 shows a schematic illustration of the transmission in FIG. 1.

The transmission illustrated in FIGS. 1 through 3 to essentially comprises two transmission stages 1, 2, which may be switched alternately into a drivetrain via a synchronized switching gear 3.

In this case, the first transmission stage 1 has a conical friction ring transmission having two cones 4, 5, situated opposing in such a way that a gap 6 remains between the cones 4, 5, in which a friction ring 7 runs while enclosing the cone 5. So that this conical friction ring transmission may transmit torques, the cone 4 includes a pressure device 8, which braces the two cones 4 and 5 between bracing bearings 9, 10 while applying a variable pressure.

Figure 4:
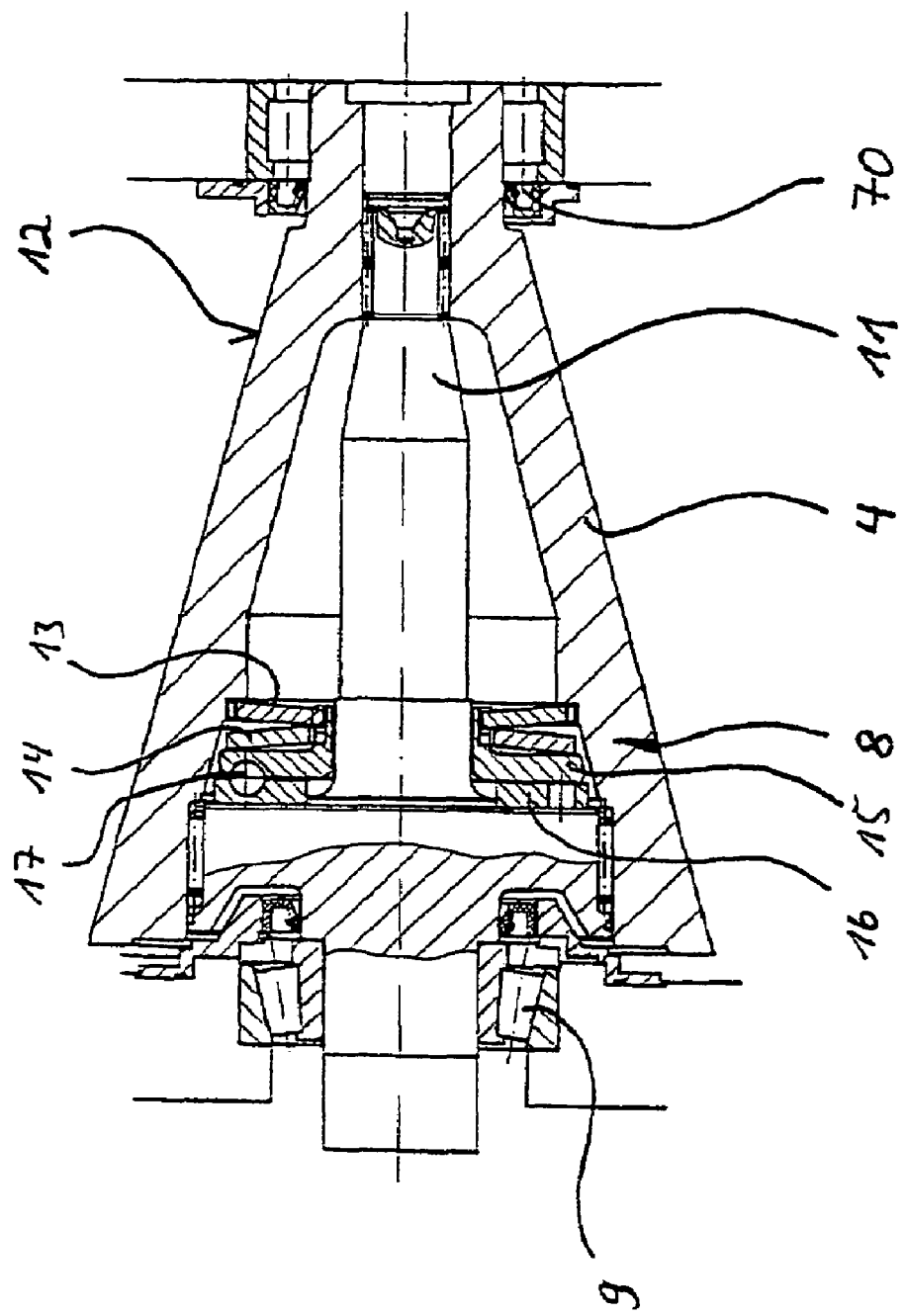
FIG. 4 shows an enlarged illustration of an output cone.
Figure 5:
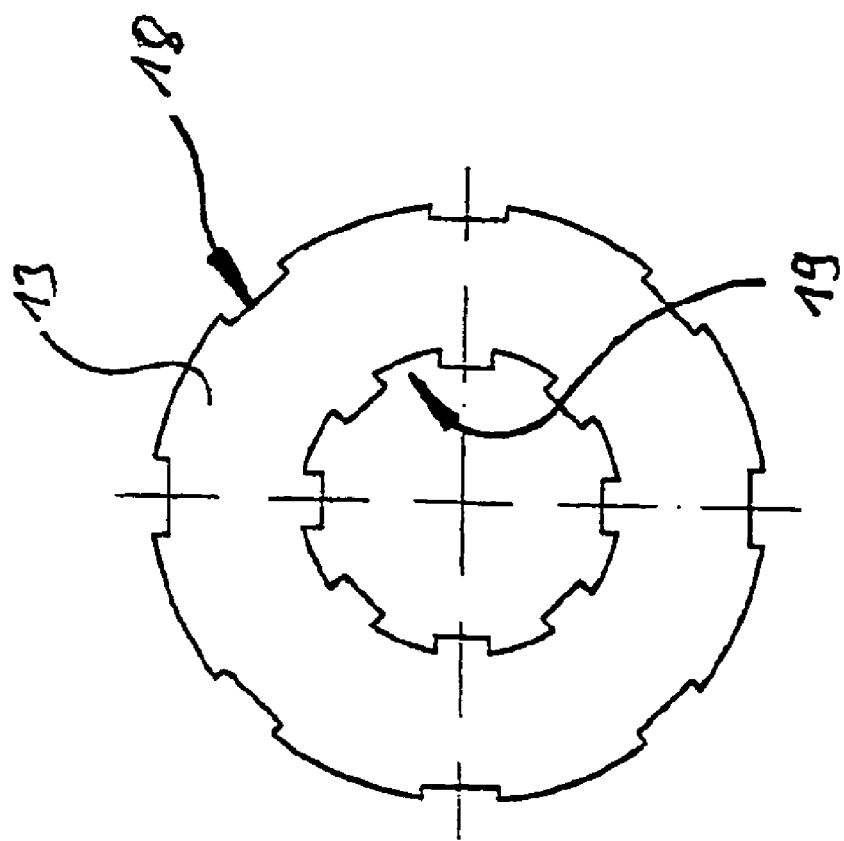
FIG. 5 shows a top view of the spring element of a pressure device of the transmission in FIGS. 1 through 4.

As is particularly obvious from FIGS. 1 and 4, the cone 4 has a running surface 12 and, in addition, a bracing element 11, between which the pressure device 8 is active, the pressure device 8 able to displace the bracing element 11 axially in relation to the running surface 12, so that the bracing element 11 is supported on the bracing bearing 9 and, in addition, presses the running surface 12 against the friction ring 7, this pressure being countered by the second cone 4 and the complementary bracing bearing 10.

In detail, the pressure device 8 includes two disk springs 13, 14, as well as two pressure elements 15, 16 and two roller elements 17 positioned between the pressure elements. As is immediately obvious from FIG. 2, the disk springs 13, 14 and the pressure elements 15, 16 are positioned in series in regard to the pressure, so that a significantly larger movement play than that in the related art remains to the pressure elements 15 in the event of a torque change, which leads to more precise and reproducible setting of the pressure. In addition, the disk spring 13 has radial recesses 18, 19, which engage in corresponding projections of the assembly having the running surface 12 and/or the pressure element 15. In this way, the disk spring 13 transmits torque between the assembly having the running surface 12 and the pressure element 15, through which the pressure element 15 is unloaded from a torque-loaded sliding movement in relation to the assembly comprising the running surface 12, which in turn leads to higher reproducibility of the resulting torque-dependent pressure. The rolling bodies 17 run in paths of the particular pressure element 15, 16, which have a changeable depth, in this exemplary embodiment. In this way, a torque-dependent distance between the pressure elements may be implemented, the rolling bodies 17 ensuring high reproducibility of the resulting pressure when the pressure elements 15, 16 are displaced around the circumference by the occurrence of torque. It is obvious that the above-mentioned features may advantageously ensure reproducibility of the resulting pressure independently of one another.

In addition, it is obvious that instead of the balls 17, other rolling bodies, such as rollers and/or rolling bodies fixed stationary on the pressure element, may be used. Furthermore, it is also conceivable to provide a pressure device of this type in the driving cone 5.

Instead of the mechanical arrangement, however, in an alternative embodiment a motorized actuator may also be provided for the pressure device, which, like hydrodynamic or hydrostatic axial bearings, is driven on the basis of measured torque in order to implement a torque-dependent pressure.

In addition, it is obvious that only displacement of the pressure elements 15, 16, and/or displacement around the circumference of the component comprising the running surface 12 and the bracing element 11 or, for example, an axial force on the bracing bearings 9, 10, may be used to determine the torque occurring.

The exemplary embodiment shown in FIGS. 1 through 5 additionally includes a startup clutch, which is implemented as a Trilok converter, on the drive side in relation to the continuously variable conical friction ring transmission 2. For this purpose, the transmission stage comprising the conical friction ring transmission 1 is connectable via the switching gear 3, and/or a drive gearwheel 35 and a synchronized gearwheel 34, directly to the pump wheel 21 of the Trilok converter 20, startup able to be performed via the turbine wheel 22 of the Trilok converter and via a differential gear part 23. A differential side 24 of the latter differential gear part 23 is rigidly connected to the turbine wheel 22, while the second differential side 25 is used from output of this transmission stage and is connected via a gearwheel 26 and to the gearwheel 27 of a main output shaft 28, comprising an output pinion 33, of the overall transmission, the gearwheel 27 also engaging with the output 29 of the conical friction ring partial transmission 1. The output pinion 33 may, for example, engage with the main differential of a motor vehicle. The differential gear part 23 comprises two friction clutches 30, 31, which may alternately fix the main input of the differential gear part 23 on the housing 32 or on the output 25. In this way, as is immediately obvious, the rotational direction of the output may be changed, through which a forward and a reverse gear may be implemented without anything further. When clutches 30, 31 are open, the differential and the turbine wheel 22 freewheel with it, so that the conical friction ring transmission may be used in spite of the coupling of the outputs.

This arrangement has the advantage that for startup and/or in the reverse gear, the advantages of the Trilok converter 20 may be used. In addition, forward and reverse gears are implemented in an extremely compact way by the differential 23. In addition, through the switch 3, the disadvantage of the Trilok converter 20, causing large output losses and an excess torque increase through slip in normal operation, may be avoided, since the turbine wheel 22 may be short-circuited by the switch 3 and the conical friction ring partial transmission 1 is driven directly via the pump wheel 21. The output-side coupling of the two transmission stages 1 and 2 additionally allows the conical friction ring partial transmission 1 to be set in regard to its transmission ratio before a switching procedure between these two transmission stages 1 and 2 in such a way that the two transmission stages 1 and 2 are also nearly synchronized on the input side. The remaining synchronization may be performed by the switching gear 3 itself, the Trilok converter 20 also able to act as a support.

Figure 6:
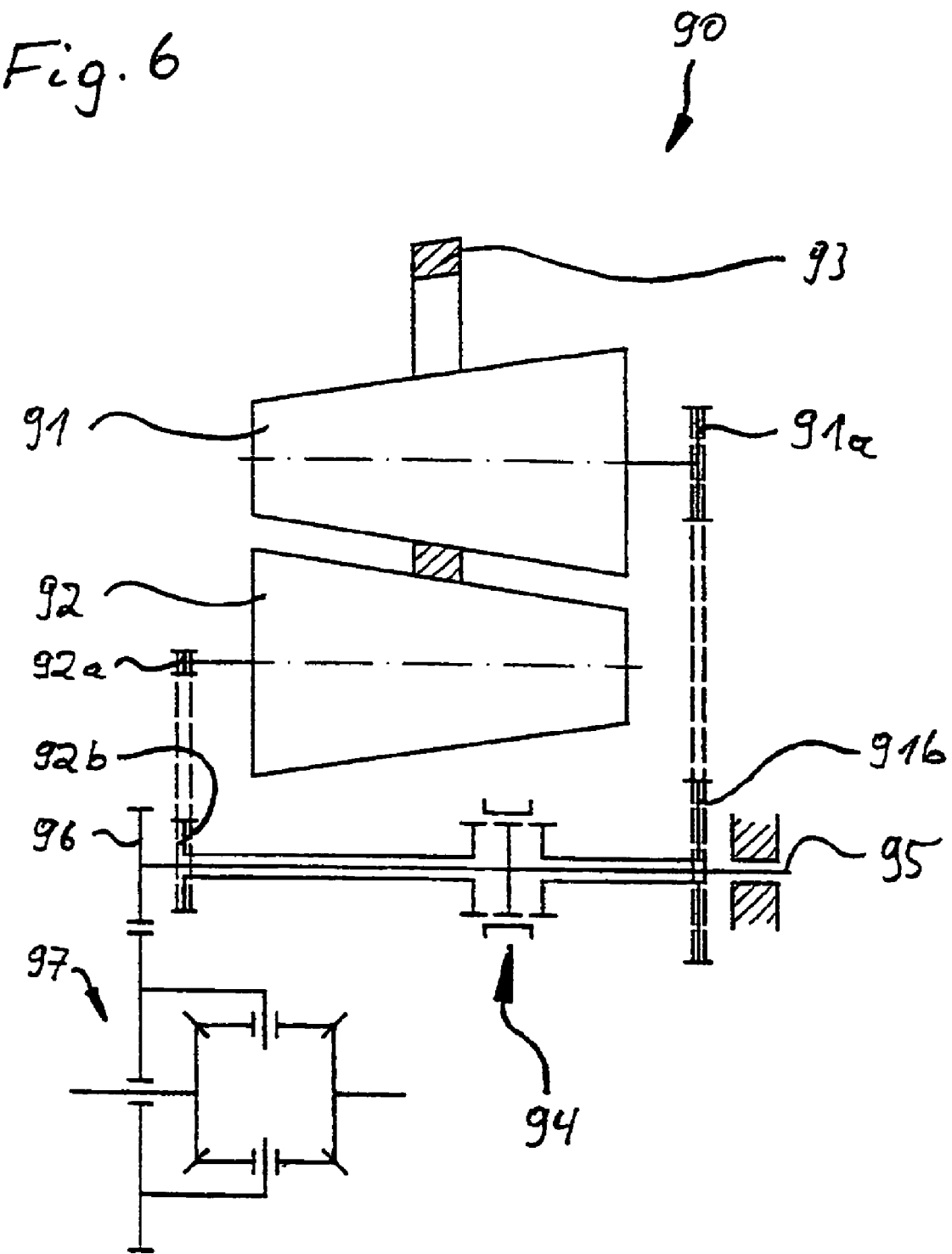
FIG. 6 shows a schematic illustration of a further transmission.

In the transmission arrangement shown in FIG. 6, two revolving, cones 91, 92 positioned coaxially opposing are also mechanically connected to one another via a friction ring 93, which may be displaced along a gap remaining between the mantel surfaces of the cones 91, 92, so that different transmission ratios may be implemented. In this arrangement, both the drive cone 91 and the output cone 92 are switchable via a synchronization 94 onto a main output shaft 95, which in turn engages via a pinion 96 with the main differential 97 of a motor vehicle. In this arrangement, the drive cone 91 and the output cone 92 are connected to the main output shaft 95 with an identical number of rotational direction reversals, so that a rotational direction reversal may be ensured immediately by the synchronization 94. This arrangement allows a forward and reverse gear to be implemented with the most minimal number of assemblies, and therefore in an extremely cost-effective way. A rotational direction reversal may alternately be caused in this case between only one of the cones 91, 92 and the synchronization 94 by engaging gearwheels or revolving belts, so that a first gear or an overdrive may also be produced cost-effectively through this arrangement if necessary. Depending on the rotational direction of the drive, the pinions 91a and/or 92a and the wheels 91b and 92b may be connected via a belt arrangement or may engage directly. In addition, it is conceivable to provide a gearwheel which reverses rotational direction between the pinion 96 and the main differential 97.

The synchronization is preferably provided with a rest setting and/or a middle position, so that the cones 91, 92 may freewheel. In this way, the friction ring 93 and/or another coupling element may be adjusted even when the vehicle is stopped.

The arrangement shown in FIG. 6 particularly uses the rotational direction reversal of the conical friction ring transmission in order to provide a forward and reverse gear in a cost-effective way. It is thus also suitable for all other continuously variable transmissions which reverse the rotational direction.

In addition, the arrangement shown in FIG. 6, like the arrangement in FIGS. 1 through 5, has a transmission element on both the output and the drive sides, using which the torque may be conducted around the conical friction ring transmission 91, 92, 93.

Figure 7:
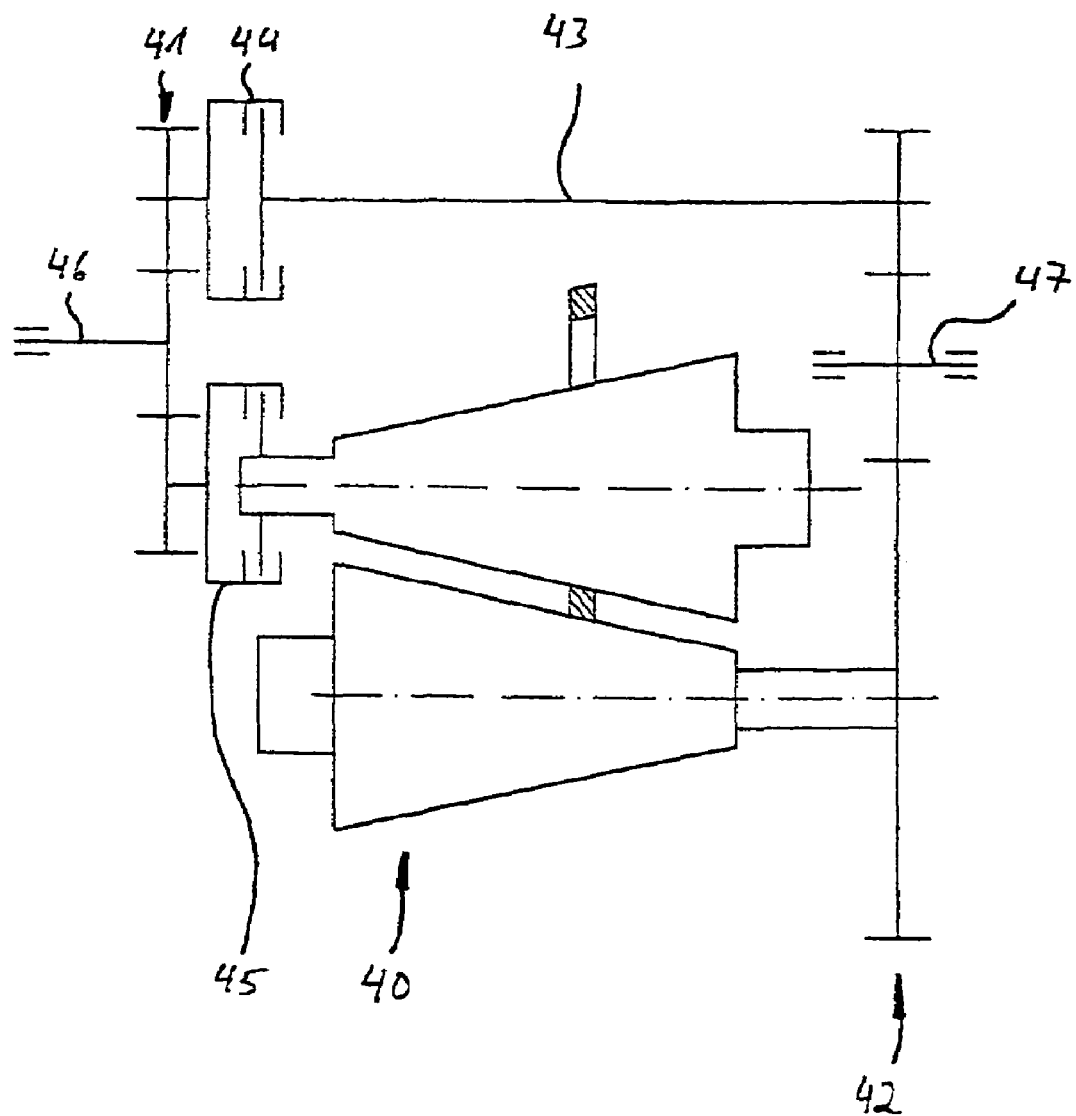
FIG. 7 shows a schematic illustration of a further transmission.

The drivetrain shown in FIG. 7 also comprises a conical friction ring transmission 40 as a continuously variable partial transmission, which, as in the exemplary embodiment shown in FIGS. 1 through 5, is assigned a power divider 41 on the drive side and a power divider 42 on the output side. In this case, a first gear 43 is connected in parallel to the conical friction ring transmission 40 via the power dividers 41 and 42, these being synchronized on the drive side, as already described, and able to be switched alternately into the drivetrain between drive 46 and output 47 via friction clutches 44, 45.

Figure 8:
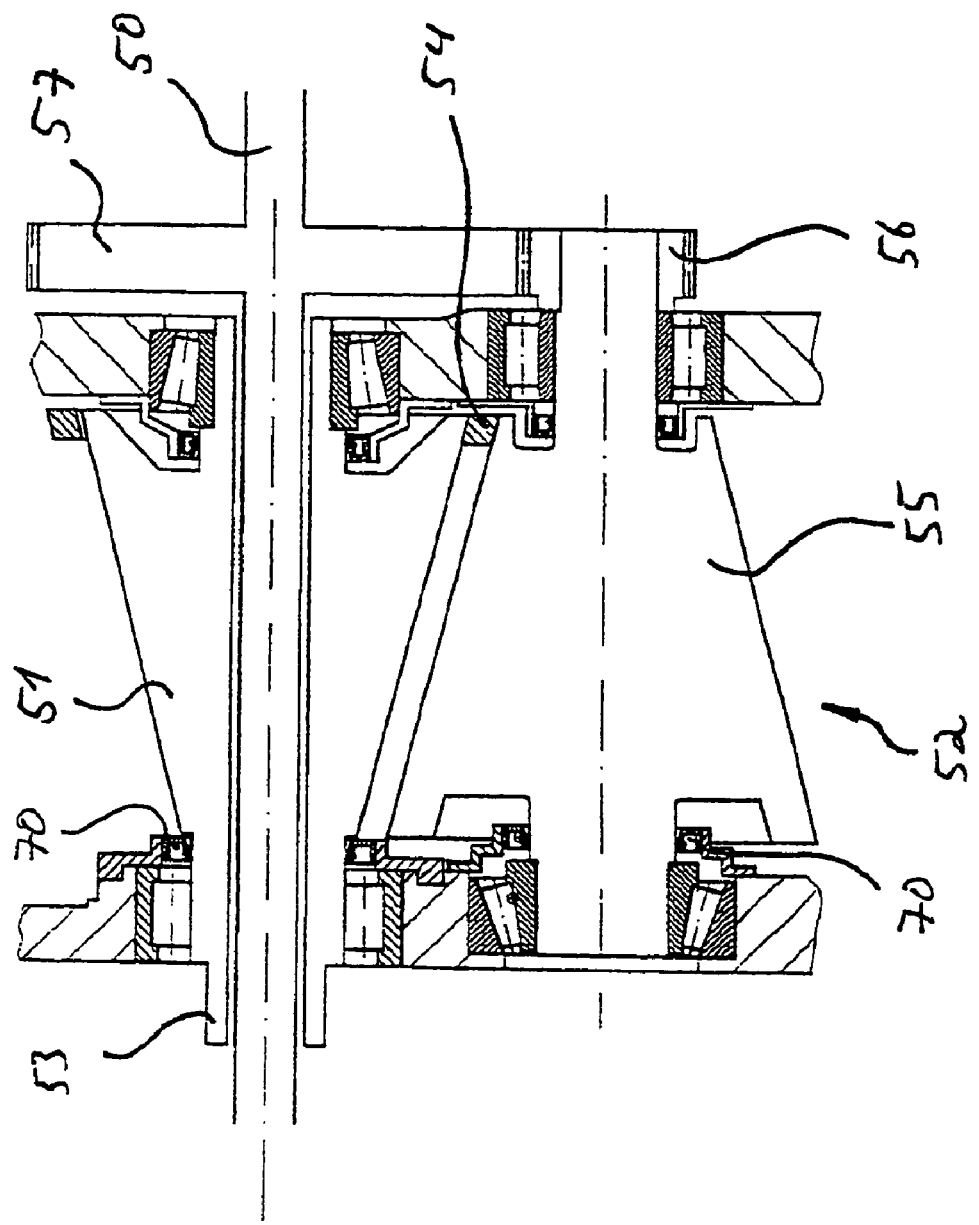
FIG. 8 shows a schematic illustration of a further possible transmission having coaxial drive and output.

The exemplary embodiment shown in FIG. 8 shows a coaxial arrangement of drive and output, which advantageously implements a coaxial output on both sides in a continuous transmission, particularly in a conical friction ring transmission. This leads to relatively low housing loads and, in addition, is built extremely compactly, an output shaft 50 preferably penetrating—particularly in this exemplary embodiment—the drive cone 51 of a conical friction ring transmission 52. This arrangement is also advantageous in other types of continuous transmissions, particularly in combination with electric motors, the output shaft also able to penetrate through the armature shaft of the electric motor in the latter case.

In this exemplary embodiment, a motor (not shown) thus drives, via a drive 53, the driving cone 51, which in turn acts on an output cone 55 via a friction ring 54. This cone is mechanically connected via a pinion 56 to an output wheel 57, which is seated on the output shaft 50.

Figure 9:
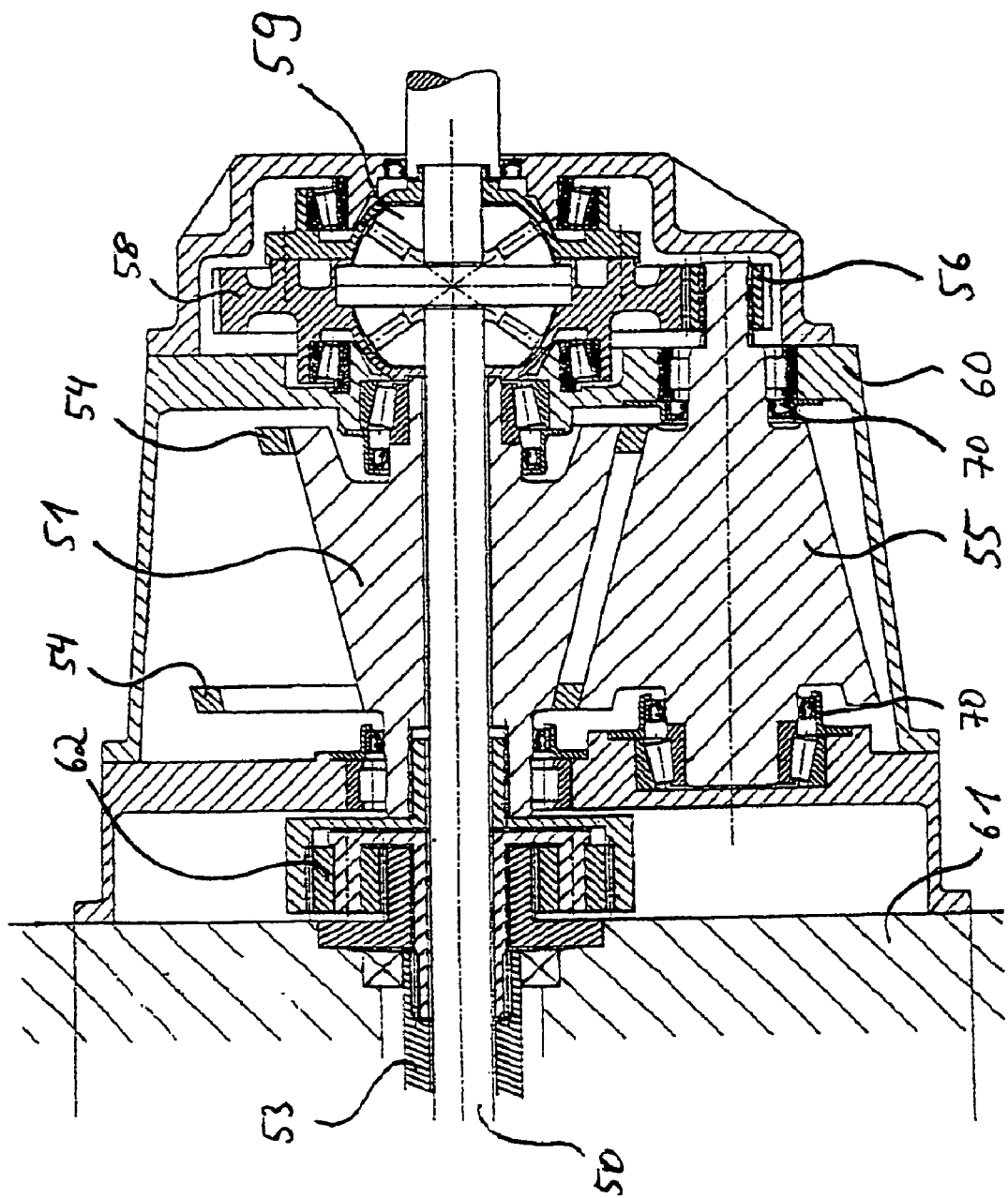
FIG. 9 shows a schematic illustration of an alternative further transmission having coaxial drive and output, a friction ring being shown in two operating positions.

The transmission shown in FIG. 9, whose housing 60 is placed on a housing 61 of an electric motor, has a similar construction. In this exemplary embodiment as well, the armature shaft 53 is implemented as hollow and is penetrated by the output shaft 50. The output pinion 56, however, engages with a drive wheel 58 of a differential 59, which is in turn connected to the two-part drive shaft 50. Since a gearwheel must be provided at this point anyway, this arrangement is built extremely compactly.

In addition, this arrangement has a planetary gear 62 for torque reduction as a supplement between motor and continuous transmission, so that the continuously variable transmission is not overloaded.

Figure 10:
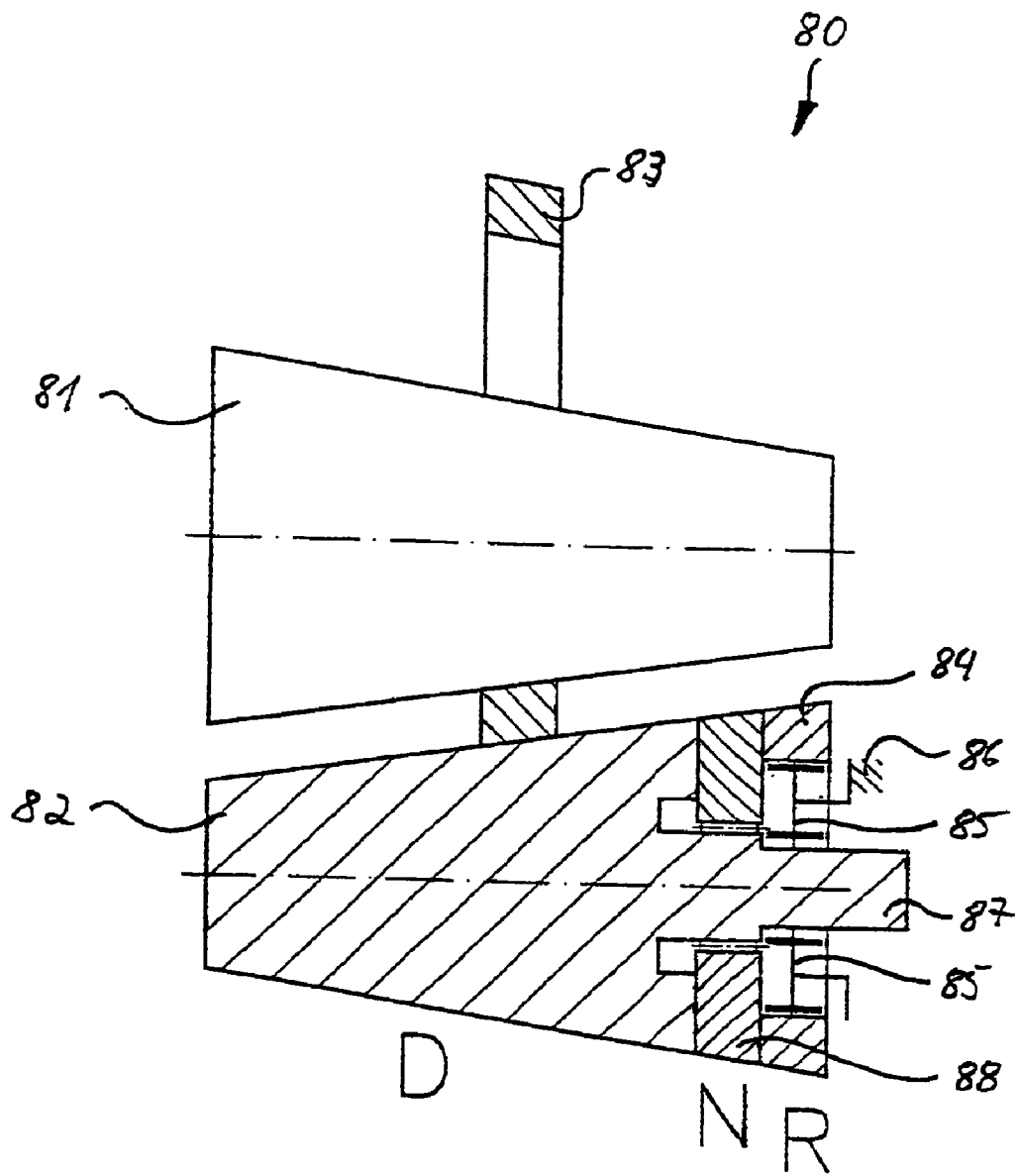
FIG. 10 shows a possible reverse gear in a transmission according to the present invention.

The conical friction ring arrangement 80 shown in FIG. 10 may particularly be applied in combination with the arrangements in FIGS. 7, 8, and 9 and implement a reverse gear extremely compactly, this transmission 80 including two cones 81 and 82, which interact with one another via a ring 83. The cone 82 has, in addition to a normal cone region (D), a region (R) revolving in the opposite direction, which is implemented in this exemplary embodiment by a conical ring 84 which revolves around planet wheels 85, which are in turn mounted fixed in the transmission housing 86 and whose insides roll on a conical shaft 87 of the cone 82. In this way, the conical ring 84 rotates opposite to the remaining part of the cone 82. In addition, the cone 82 has a neutral region (N), which includes a ring 88, which is in turn mounted on the cone shaft 87 so it rotates freely.

In this arrangement, the friction ring 83 may first be displaced from the main region (D) of the cone 82 into the neutral region (N), the conical ring 88 adapting itself to the rotation preset by the main cone 82 and the friction ring 83. If the friction ring 83 is displaced further in the direction toward the reverse region (R), it leaves the main region (D), so that the rotational direction of the neutral region (N) may adapt to the rotational direction of the reverse ring 84. In this way, a reverse gear is implemented extremely compactly.

A reverse gear 80 of this type, and/or even an arrangement for rotational direction reversal implemented in a way known per se, may particularly be advantageous with the exemplary embodiment shown in FIG. 7, since in this way, if the power and/or speed dividers and/or adders 41 or 42 are switched suitably and the transmission ratios are selected suitably, stoppage of the output shaft 47 may be implemented, although the conical friction ring transmission 40 and the shaft 43 rotate. In this way, all driving situations may be implemented in a vehicle, i.e., reverse travel, forward travel, and stoppage, without transitions and without further clutches, clutches or further transmission stages certainly still able to be provided for additional driving situations, such as full load or continuous load operation.

In the arrangement shown in FIGS. 11 through 18, which essentially corresponds to the arrangement in FIGS. 1 through 5, so that repeated explanations will be dispensed with, two transmission paths 101, 102 are provided, which may be switched alternately into a drivetrain via a synchronized switching gear 123 and/or a conical clutch 134. In this case, the first transmission path 101 again has a conical friction ring transmission having two cones 104, 105 positioned opposing in such a way that a gap 6 remains between the cones 104, 105, in which a friction ring 107 runs while enclosing the cone 105. So that this conical friction ring transmission can transmit torques, the cone 104 comprises a pressure device 108, which braces the two cones 104 and 105 in a way known per se and/or described above between bracing bearings 109, 110 while applying a variable pressure. For this purpose, the pressure device has two rolling elements 117 and guide bodies 118 and 119, which are braced via disk springs 120 and via which, as will be explained in the following, a pressure which is a function of the torque is applied in that the pressure device 108 expands as a function of the torque and correspondingly supports itself against the bearings 109, 110.

Figure 11:
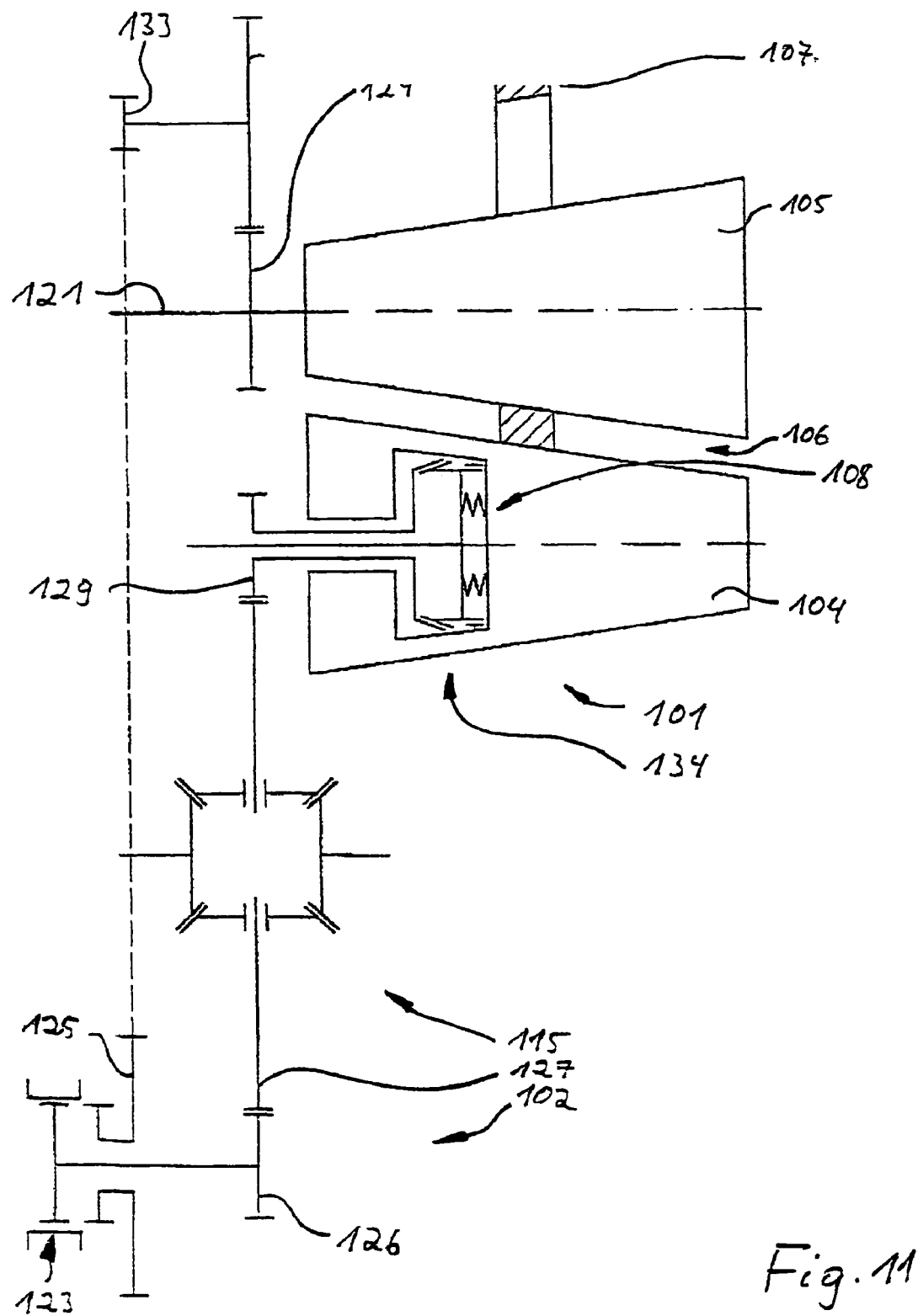
FIG. 11 shows a schematic illustration of a further transmission in a similar type of illustration as in FIG. 3.
Figure 12:
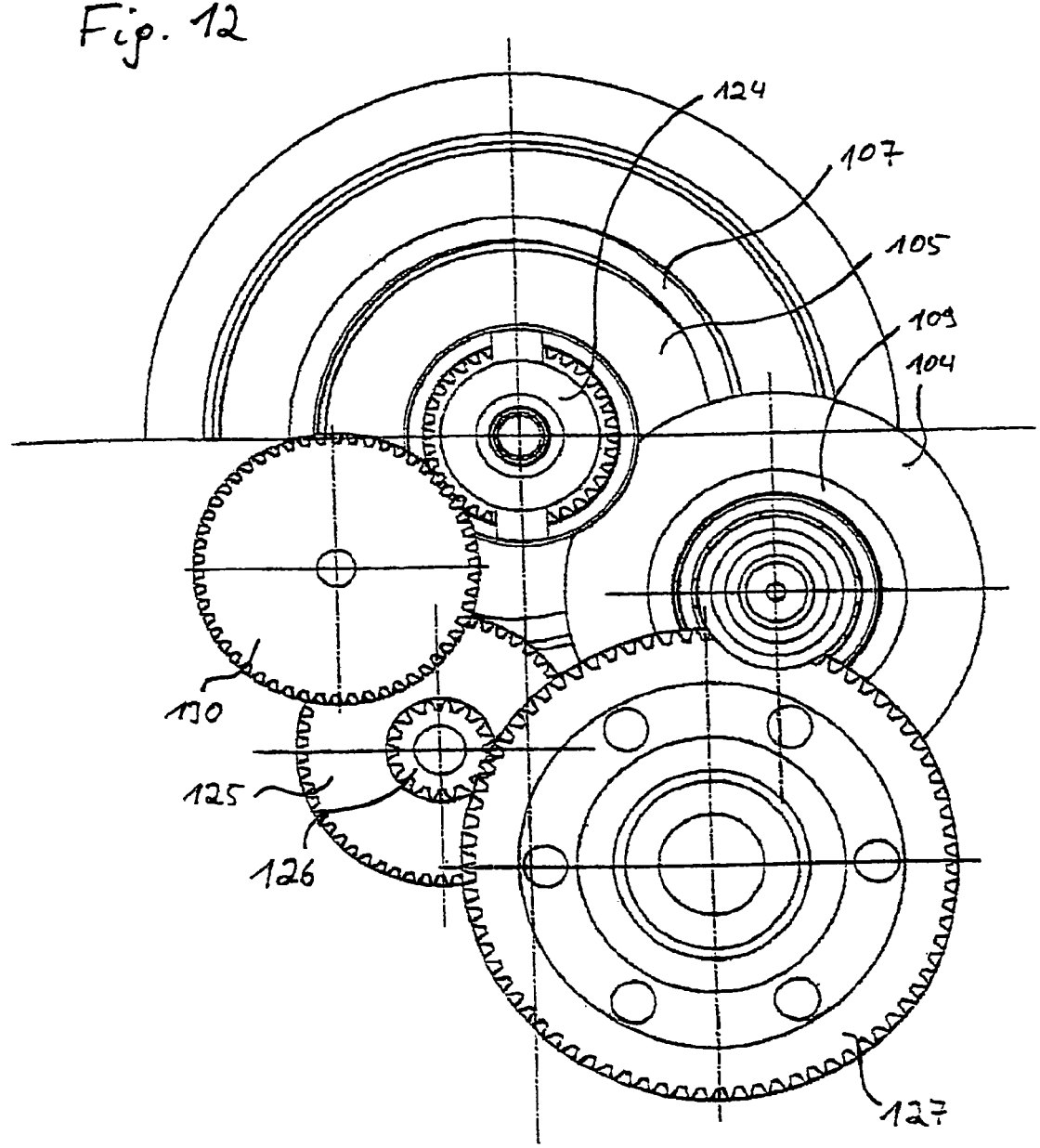
FIG. 12 shows the transmission in FIG. 11 in a section through the differential, the reverse gear, and the mounting of the output cone.
Figure 13:
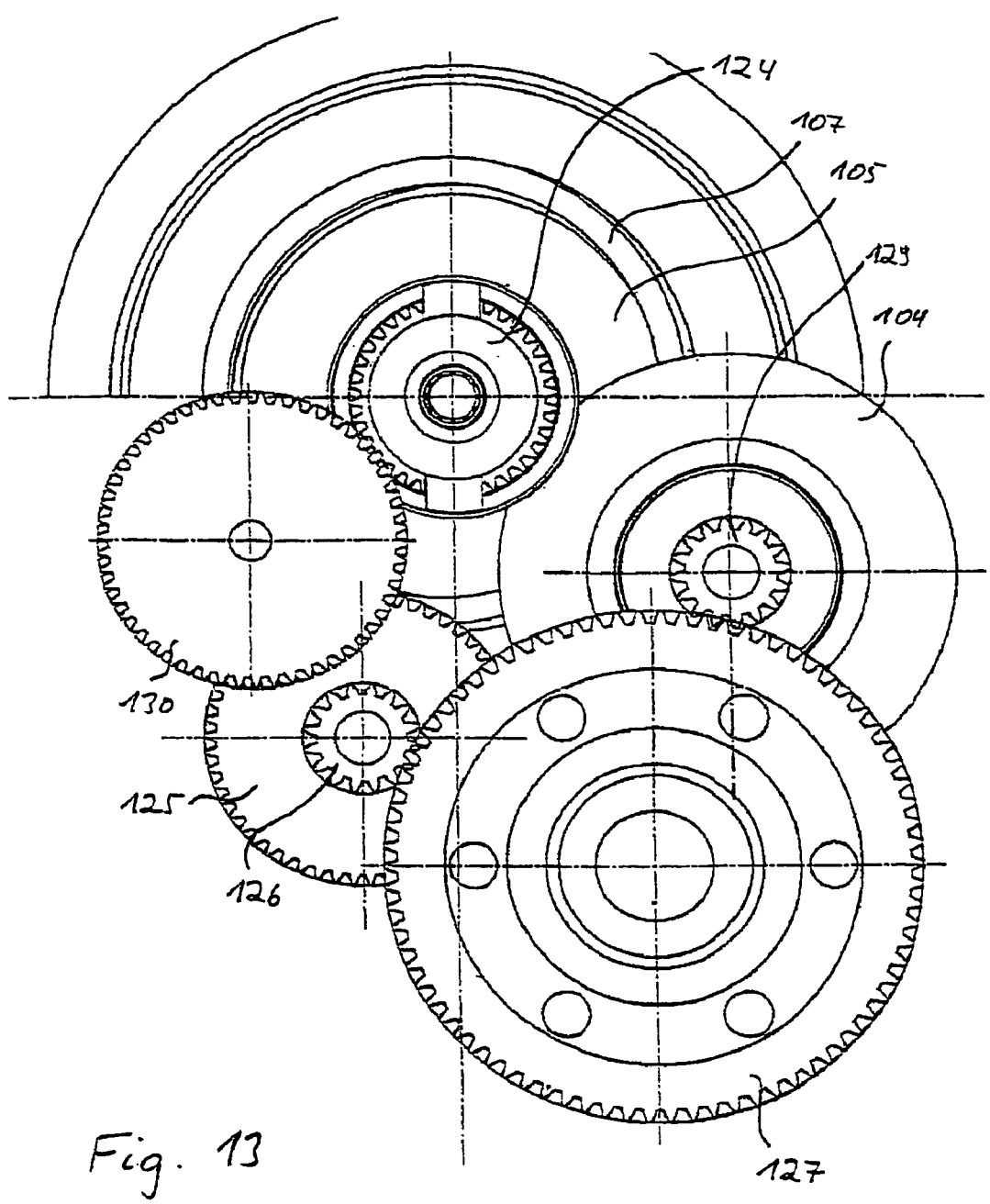
FIG. 13 shows the transmission in FIGS. 11 and 12 in a section through the differential, the reverse gear, and the output of the output cone.
Figure 14:
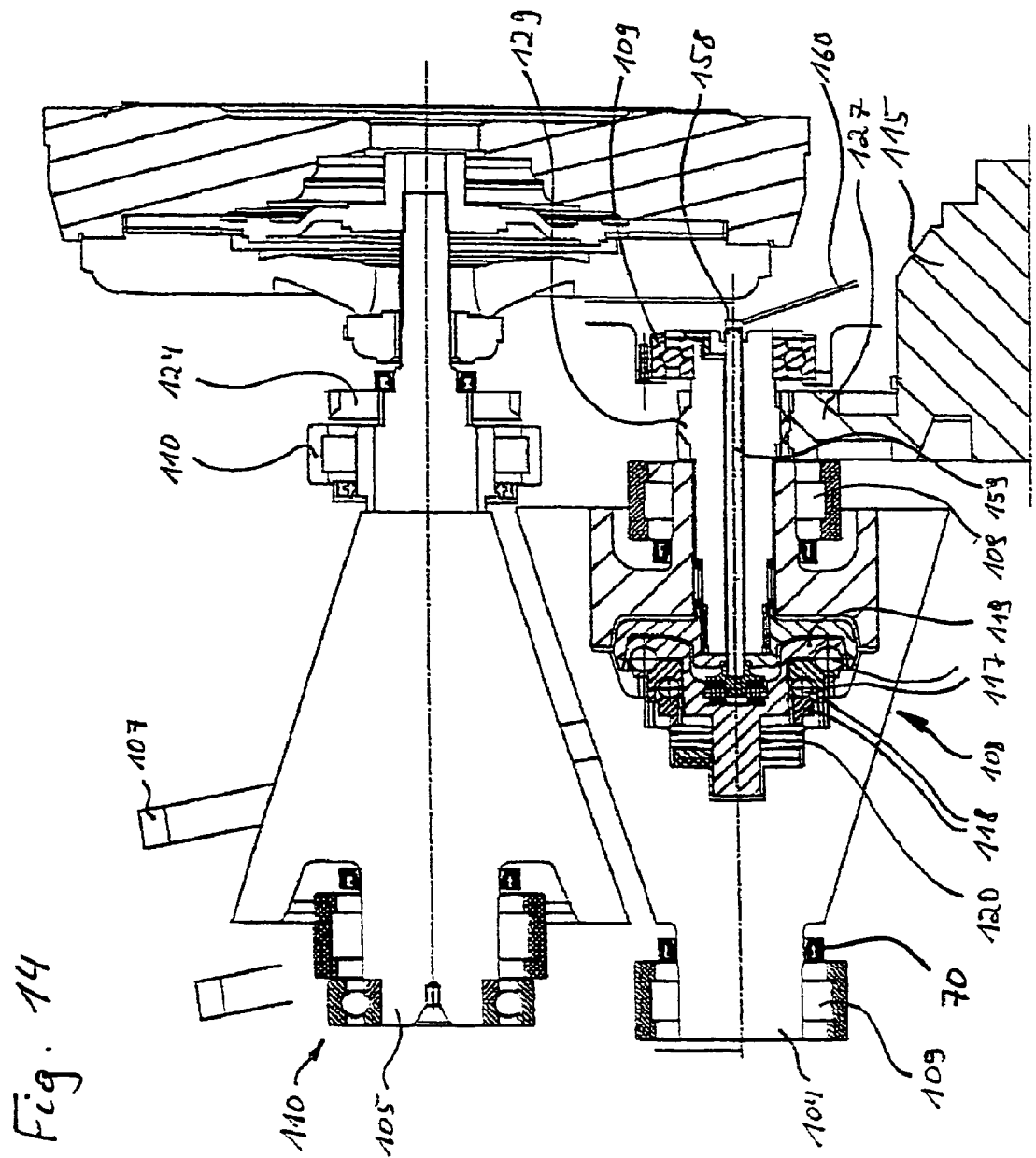
FIG. 14 shows the transmission in FIGS. 11 through 13 in a similar illustration as in FIG. 1.

As is particularly obvious from FIG. 11, the reverse gear includes a drive wheel 124, using which the transmission paths 102 is branched off from the main transmission path. A switching wheel 125 is driven via intermediate wheels 130 and 133, which may be coupled via the synchronized switching gear 123 to the pinion 126, which in turn engages directly with the external wheel 127 of the main differential 115. The overall arrangement is built extremely compactly and may be implemented even more compactly if the drive wheel 124 is connectable to the drive shaft 121 via a synchronized switching gear and engages directly with the external wheel 127.

In addition to this reverse gear 102, the arrangement includes a forward gear, which is implemented by the continuous transmission 101. The forward gear is coupled via the pinion 129 to the external wheel 127 and thus to the reverse gear 102 and may be engaged and disengaged via the clutch 134. As is immediately obvious, the particular transmission elements of the partial transmission paths 101 and 102 also freewheel in the disengaged state.

Figure 15:
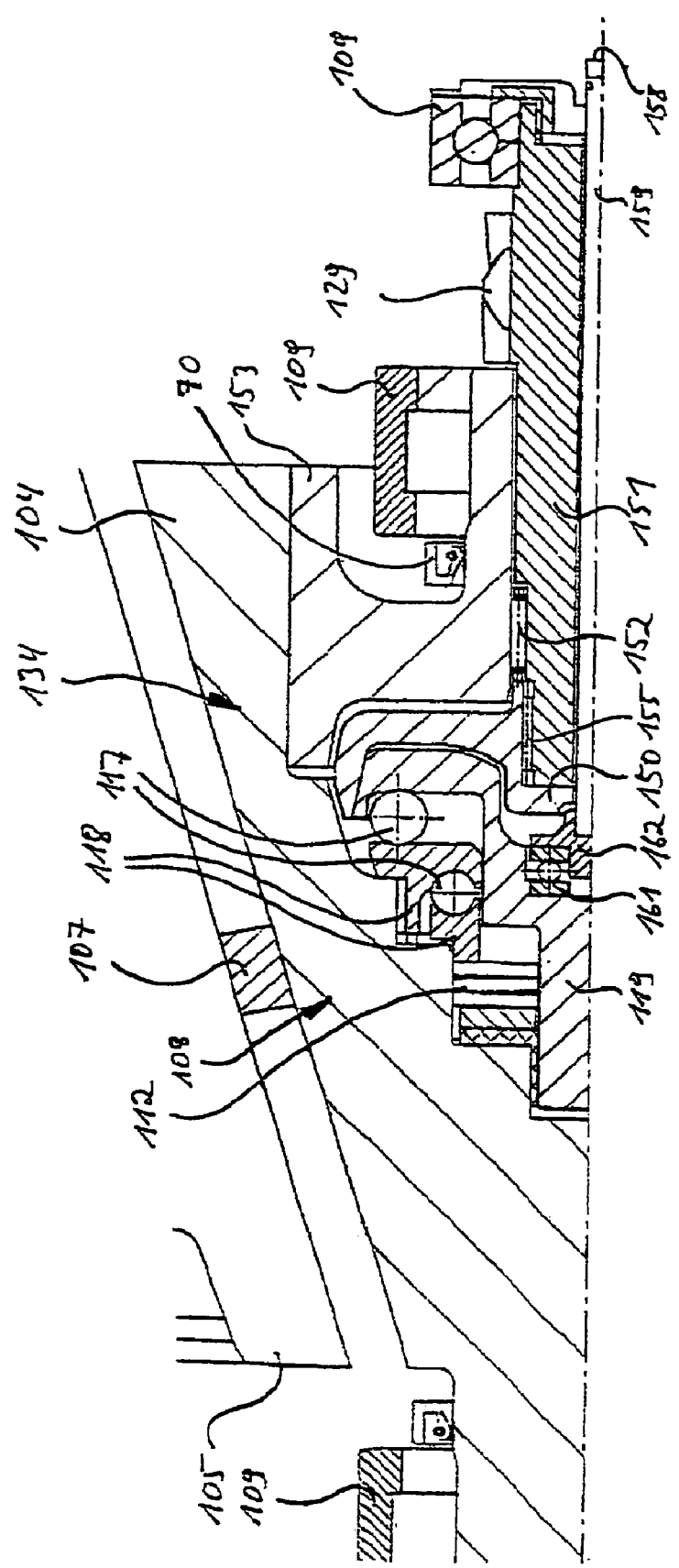
FIG. 15 shows a detail enlargement of the illustration in FIG. 14 with the pressure device expanded.
Figure 16:
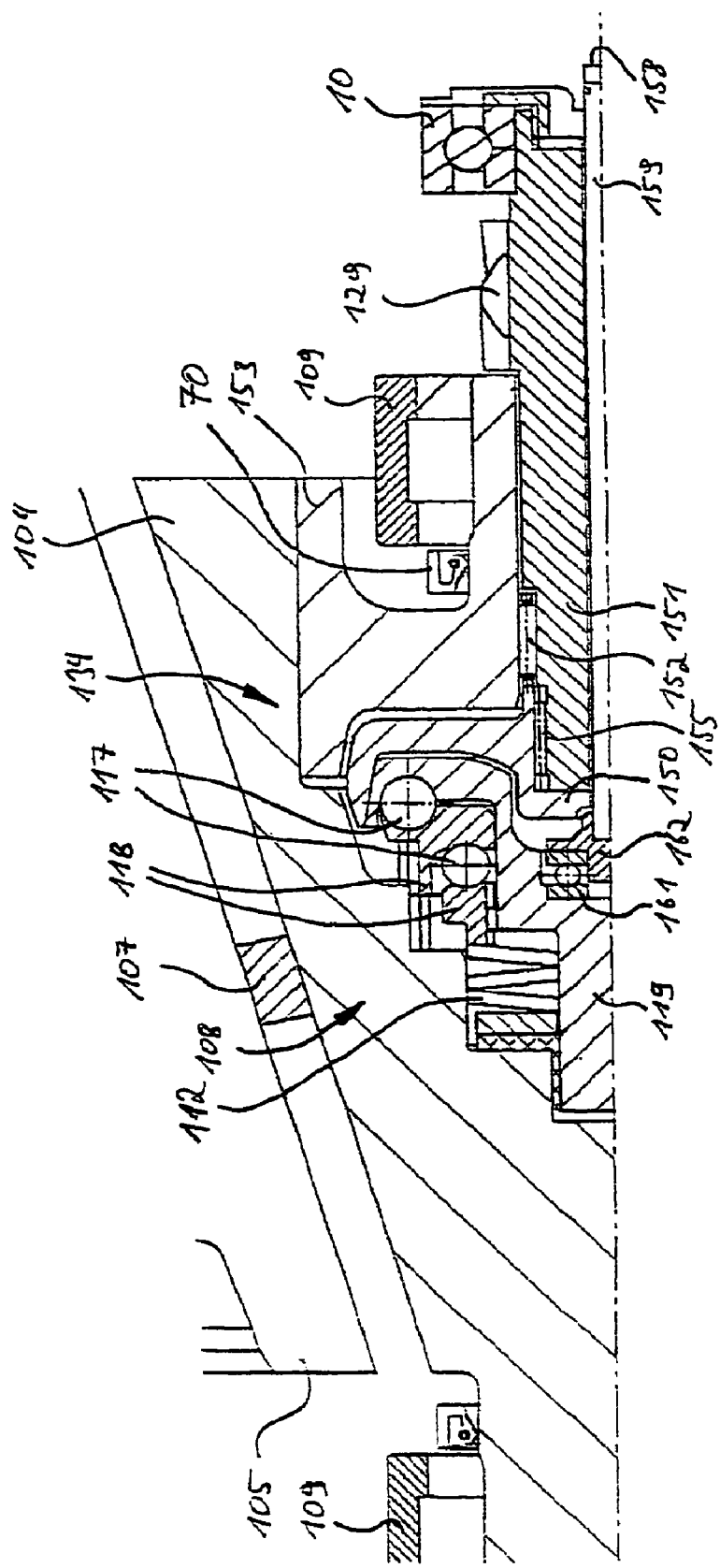
FIG. 16 shows the arrangement in FIG. 15 with the pressure device contracted.

As already indicated above, the pressure device 108 works together with the clutch 134. The mode of operation may be seen most clearly on the basis of FIGS. 15 through 18. As shown in FIGS. 15 and 16, the pressure device 108 may expand as a function of the transmitted torque. In this case, FIG. 15 shows the arrangement at a high torque and therefore high pressures and FIG. 16 shows the arrangement at low pressures. The pressure is essentially generated as a function of the torque in that the support body 119 supports itself on the bracing bearings 109 via a counterpart 150 and via an output shaft 151. The output pinion 129 is also seated on the shaft 151. In addition, the shaft 151 is radially mounted on a centering body 153 via a needle bearing 152. Torque is transmitted to the output pinion 129 from the output cone 104 via teeth 154 (see FIG. 18) and 155.

In the pressure device 108, these torques cause a displacement of the cone 117, so that the pressure may be varied in the way desired, as is obvious in FIGS. 15 and 16. As is immediately obvious from FIGS. 15 through 18, the two bodies 119 and 150 press against one another via conical surfaces 156, 157 (see FIG. 18). Finally, the two conical surfaces 156, 157 form the active clutch 134, which is closed by the pressure device 108. To open the clutch 134, the overall arrangement has a cylinder 158 fixed on the housing, in which a piston 159 runs which may have pressure applied to it via a hydraulic line 160. The piston 159 is mounted on the support body 119 via an axial bearing 161 and a support body 162. If the piston 159 has pressure applied to it, it unloads the body 150 of the clutch 134 from the pressure of the pressure device 108. As the clutch 134 opens, torque is no longer transmitted, so that the pressure device 108 relaxes, and only a very slight pressure must be applied in order to open the clutch 134 or keep it open. When clutch 134 is open, a gap 163 remains between the conical surfaces 156, 157, as may be seen in FIG. 18. It is obvious that instead of the piston 159 and the hydraulic line 160, other measures may also be provided, through which the body 119 may be unloaded and the clutch 134 may be opened. Any measure, using which the body 119 may be supported on the housing of the overall transmission while bypassing the clutch 134, is especially suitable.

The arrangement shown in FIGS. 15 through 18 is distinguished in particular in that the piston 159 does not also rotate, so that it may be sealed relatively cost-effectively.

The arrangement particularly has the advantage that no additional devices are necessary to close the clutch. In addition, the closing forces are a function of the torque transmitted and rise with it, since the pressure device is correspondingly equipped in this regard in any case.

Figure 19:
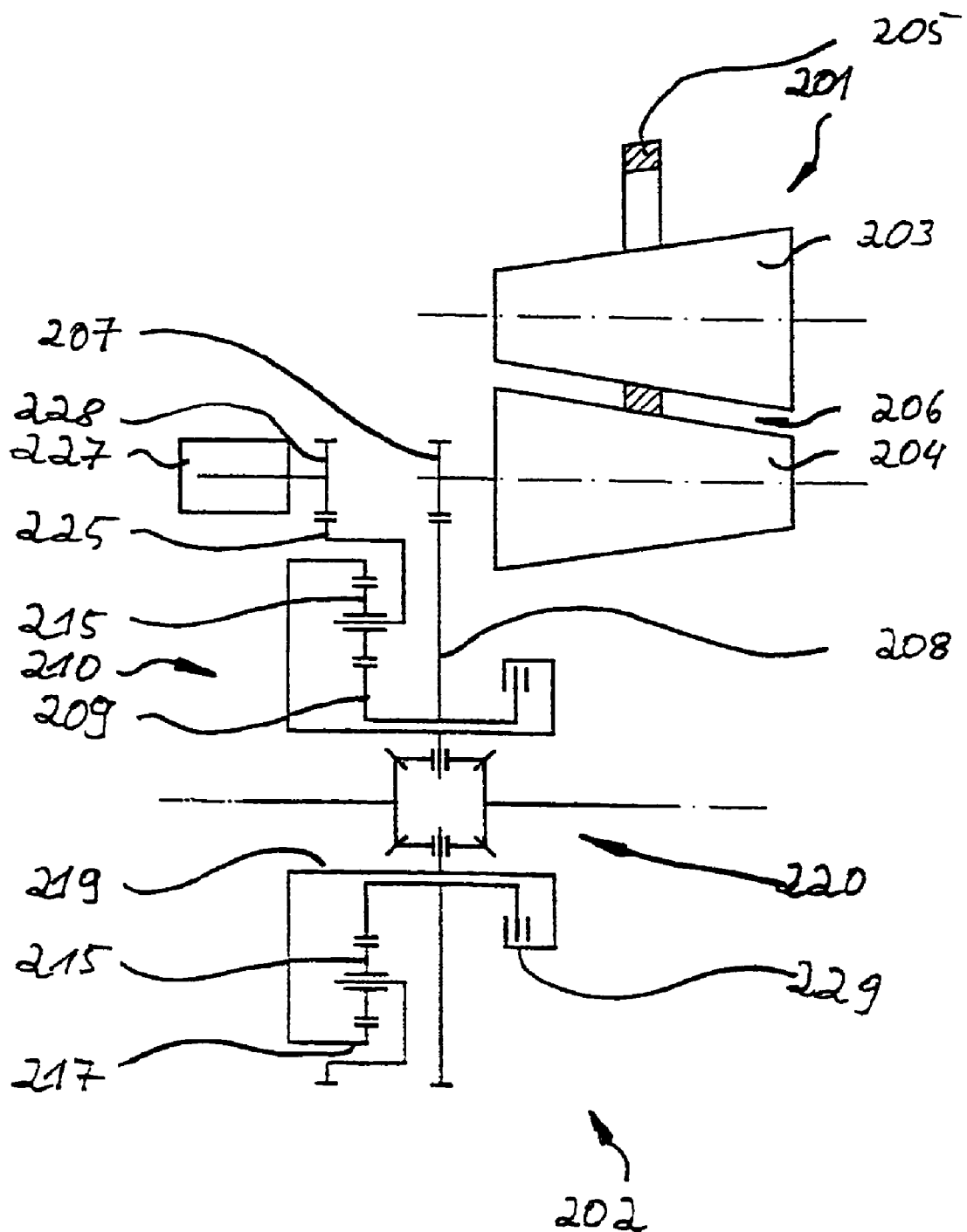
FIG. 19 shows a schematic illustration of a supplementary and/or alternative reverse gear.
Figure 20:
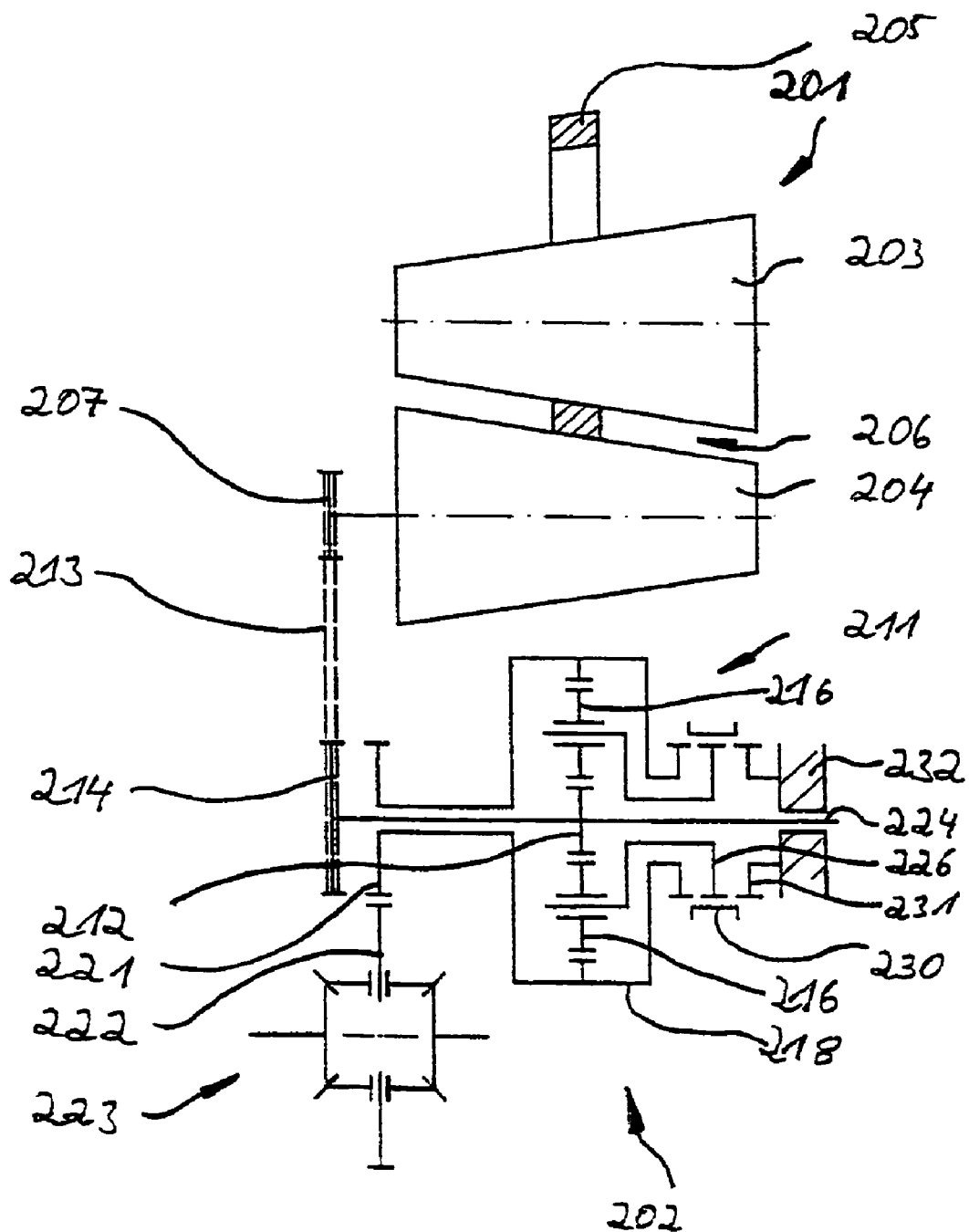
FIG. 20 shows a schematic illustration of a further supplementary and/or alternative reverse gear.

The arrangements shown in FIGS. 19 and 20 each comprise a conical friction ring transmission 201 and a reverse gear 202 connected in series therewith. In these exemplary embodiments, the conical friction ring transmissions 201 are constructed essentially identically and each have an input cone 203 and an output cone 204, which are positioned axially parallel and pointing toward one another and between which a friction ring 205 is displaceable in a gap 206, so that a variable transmission ratio may be set as a function of the position of the friction ring 205. The friction ring 205 encloses the drive cone 203 in these exemplary embodiments, while the output cone 204 carries an output pinion 207. It is obvious that the conical friction ring transmission may also be implemented differently, depending on the concrete embodiment.

In the exemplary embodiment in FIG. 19, the output pinion 207 engages directly with an assembly 208, which carries the sun wheel 209 of a planetary gear 210. The arrangement shown in FIG. 20 also comprises a planetary gear 211 having a sun wheel 212, which is driven by the output pinion 207. This is performed via a belt 213 and a wheel 214 which revolves with the sun wheel 212. All of the known belt and/or chain arrangements through which a sufficiently reliable force transmission may be ensured continuously may be used as the belt 213.

Both planetary gears 210 and 211 have planet wheels 215 and 216, respectively, which engage on one side with the particular sun wheel 209 and 212, respectively, and on the other side with a particular external wheel 217 and 218, respectively.

In the embodiment in FIG. 19, the external wheel 217 is connected directly to the revolving mount 219 of a differential 220. In this arrangement, the planetary gear 210 and therefore the reverse gear 202 thus lie directly on the differential 220. This arrangement has been shown to have an extremely compact construction and extremely high efficiency for this reason, since the number of transmission elements in the drivetrain is minimized. It is obvious that a reverse gear 202 positioned directly on the differential 220 is advantageous even independently of the remaining features of the present invention, because of the compact construction. Otherwise, an arrangement in which the output pinion 207 engages directly with an input wheel of a reverse gear and the output wheel of the reverse gear is connected directly to the revolving mount of the differential is advantageous for current motor vehicle engines because of the direction reversal caused by a conical friction ring transmission, since an arrangement of this type requires only a minimal number of transmission elements and therefore has an extremely high efficiency.

In contrast, in the embodiment in FIG. 20, the external wheel 218 is connected to an output wheel 221 and revolves with it, which in turn engages with the revolving mount 222 of a differential 223. The direction reversal caused by this is compensated for by the belt arrangement 213, the reverse gear being positioned on and/or around an intermediate shaft 224 in the exemplary embodiment in FIG. 20. Arrangement on the intermediate shaft 224 has the advantage over the arrangement directly on the differential 220 suggested in FIG. 19 that the overall arrangement in FIG. 20 may have its spatial arrangement implemented more flexibly. This is particularly advantageous for environments in which the spatial relationships in direct proximity to the differential are limited by third assemblies. It is obvious that the arrangement of the reverse gear on an intermediate shaft 224—particularly also because of the rotational direction change caused by it—is advantageous even independently of the remaining features of the present invention. The latter is particularly true when conical friction ring transmissions are to be used in combination with foreign motors which have a contrary rotational direction. In cases of this type, the belt arrangement 213 may be dispensed with and the pinion 207 may engage with the collar 214. Furthermore, it may be advantageous if the output cone 204 is positioned directly on the shaft 224, so that a separate output pinion 207 and the belt arrangement 213 may be dispensed with entirely.

In addition, it is immediately obvious to one skilled in the art that the drive originating from the conical friction ring transmission 201 may also occur via the external wheels 217 and/or 218 and/or the other transmission elements of the reverse gear instead of via the sun wheels 209 and/or 212. The output of the reverse gear also does not have to occur via the external wheels 217 and/or 218. Rather, the sun wheels and/or other transmission elements may also be used for this purpose.

In order that the exemplary embodiments shown in FIGS. 19 and 20 may reliably maintain their states "forward" and/or "backward", fixing systems are provided in each case, using which a transmission element may be fixed rigidly, in these exemplary embodiments a mount 225 and/or 226, on which the planet wheels 215 and/or 216 are mounted and which revolves with the planet wheels. Furthermore, fixing systems are provided which allow fixing of two transmission elements of the particular planetary gear 210 and/or 211 to one another. In this case, in the exemplary embodiment in FIG. 19, the sun wheel 209 and external wheel 217 are alternately fixed with one another, and in the exemplary embodiment in FIG. 20, the external wheel 218 and the revolving mount 226 of the planet wheels 216 are alternately fixed with one another.

Different fixing systems, such as clutches, slanted brakes, and/or synchronizations may be used to fix the transmission elements to the housing and/or to one another. Three of these are shown as examples in the exemplary embodiments shown, these able to be exchanged without anything further depending on the concrete requirements.

In the exemplary embodiment shown in FIG. 19, the mount 225 of the planet wheels 215 is fixed using an electromagnetic brake 227, which may alternately brake a braking pinion 228, which in turn engages with the mount 225 of the planet wheels 215. Therefore, if the rotational direction is to be changed in this arrangement, the brake is activated so that, in the degree to which the mount 225 is slowed in relation to the sun wheel 209 and the external wheel 217, the travel and/or speed of the output is reduced until it finally comes to a stop and then changes the direction.

External wheel 217 and sun wheel 209 are fixed via a brake 229, the planet wheels 215 also being fixed in relation to external wheel 217 and sun wheel 209 in this way. Since in this state the planetary gear 210 runs with extremely low losses, this state is preferably selected as the forward gear, it being immediately obvious that a brake corresponding to the brake 229 may also be provided, for example, between mount 225 and sun wheel 209 and/or external wheel 217. It may also suffice to merely prevent the planet wheels 215 from rotating in relation to the mount 225, in order to correspondingly stop the planetary gear 210 per se and allow it to revolve as a whole.

In the exemplary embodiment in FIG. 20, the alternate fixing is performed via a synchronization 230, using which the mount 226, which carries the planet wheels 216 and revolves with them, may be synchronized alternately with the external wheel 218 or in relation to a fixed wheel 231, which is fixed on the housing 232 in this exemplary embodiment. The mechanisms arising in this case correspond to the mechanisms as already explained in the exemplary embodiment in FIG. 19, it being obvious that the mount 226 may also be synchronized with the sun wheel 212 instead of with the external wheel 218.

Figure 21:
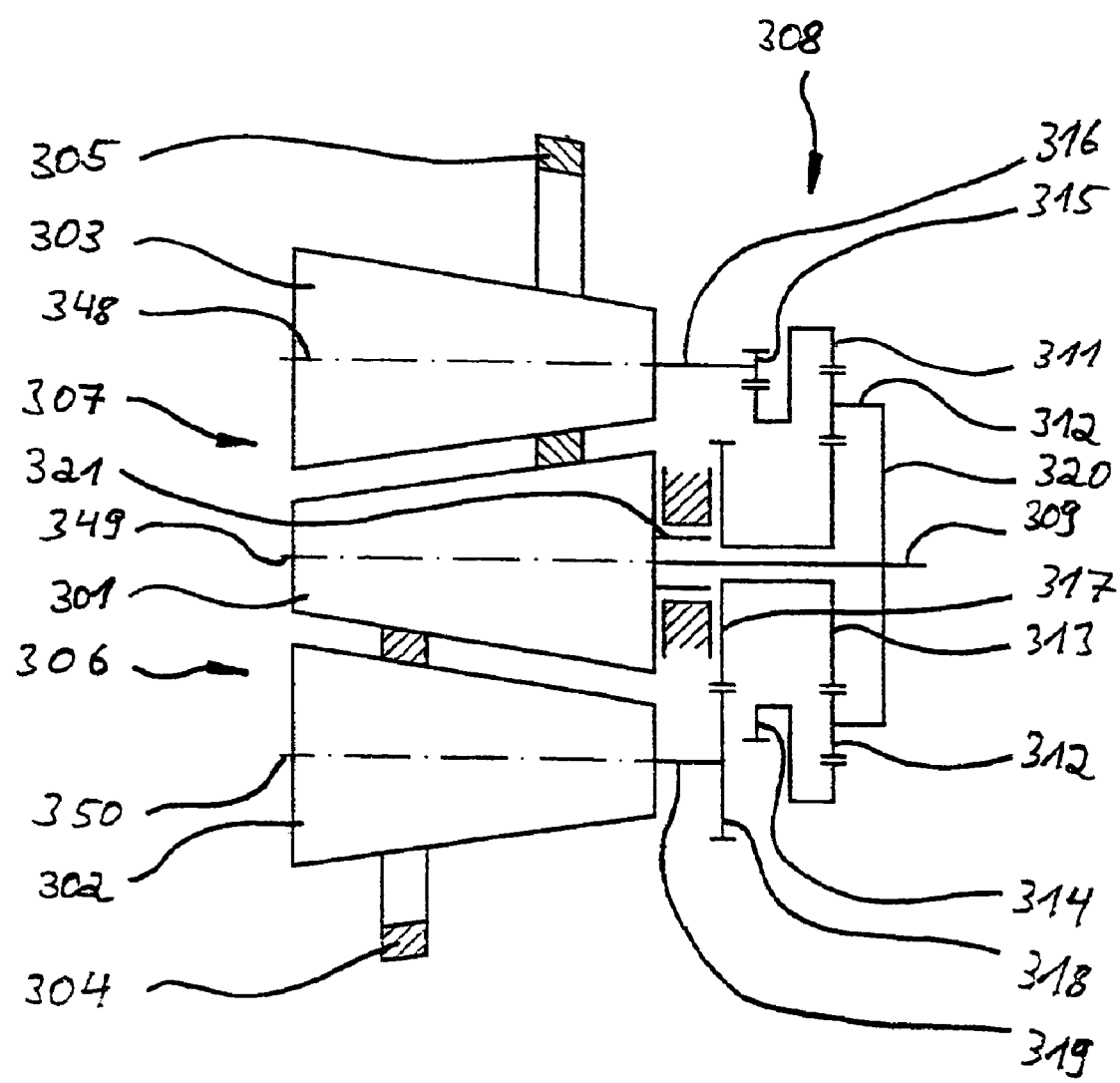
FIG. 21 shows a schematic illustration of a possible disassembly of the continuously variable transmission into two partial transmissions.

The continuously variable transmission shown in FIG. 21 has an input cone 301 and two output cones 302, 303, each of which is coupled via a friction ring 304, 305, which revolves around the particular output cone 302, 303, to the input cone 301. By displacing the friction rings 304, 305 along the gaps remaining between the cones 301, 302, 303, the partial transmissions 306 and 307, respectively, formed by the cones 301 and 302 or 301 and 303, respectively, may be varied continuously.

On the output side, the two partial transmissions 306, 307 and/or the two output cones 302, 303 are switched onto an output shaft 309 via a summation gear 308. In the exemplary embodiment shown in FIG. 21, the summation gear 308 comprises a planetary gear having an external collar 311, planet wheels 312, and a sun wheel 313. The external collar 311 is connected fixed to a further collar 314, which in turn engages with a pinion 315 positioned on the output shaft 316 of the cone 303. The sun wheel 313 is also connected fixed to a wheel 317 and revolves with it, which in turn engages with a pinion 318 which is positioned on the output shaft 319 of the cone 302. Furthermore, the planet wheels 312 are mounted in a mount 320 which is connected to the output shaft 309 and revolves together with the output shaft 309 and the planet wheels 312.

Therefore, a summation gear 308 is provided in which the speeds of the pinions 315, 318 and/or of the output cones 302, 303 are added up to the total speed of the shaft 309 depending on the transmission ratio and the position of the friction rings 304, 305. The transmission ratios are preferably selected in such a way that with an identical position of the friction rings 304, 305, i.e., identical speeds of the two output cones 302, 303, the planet wheels 312 stand still in regard to their intrinsic rotation in the mount 320 and merely revolve together with the external collar 311 and the sun wheel 313. In this way, losses in continuous operation may be minimized. In addition, a clutch 321 is used to minimize loss, using which the output shaft 309 may be connected directly, or via a speed-change gear depending on the concrete embodiment, to the drive cone 301, so that particularly at high and relatively uniform speeds, at which the advantages of a continuously variable transmission may not be used in any case and continuously variable transmissions of this type lead to unnecessary losses, the two partial transmissions 306, 307 may be bypassed.

As is immediately obvious, the summation gear 308 adds together the speeds of the two cones 302, 303 and is also used as a torque balance for the torques applied to these cones 302, 303.

Figure 22:
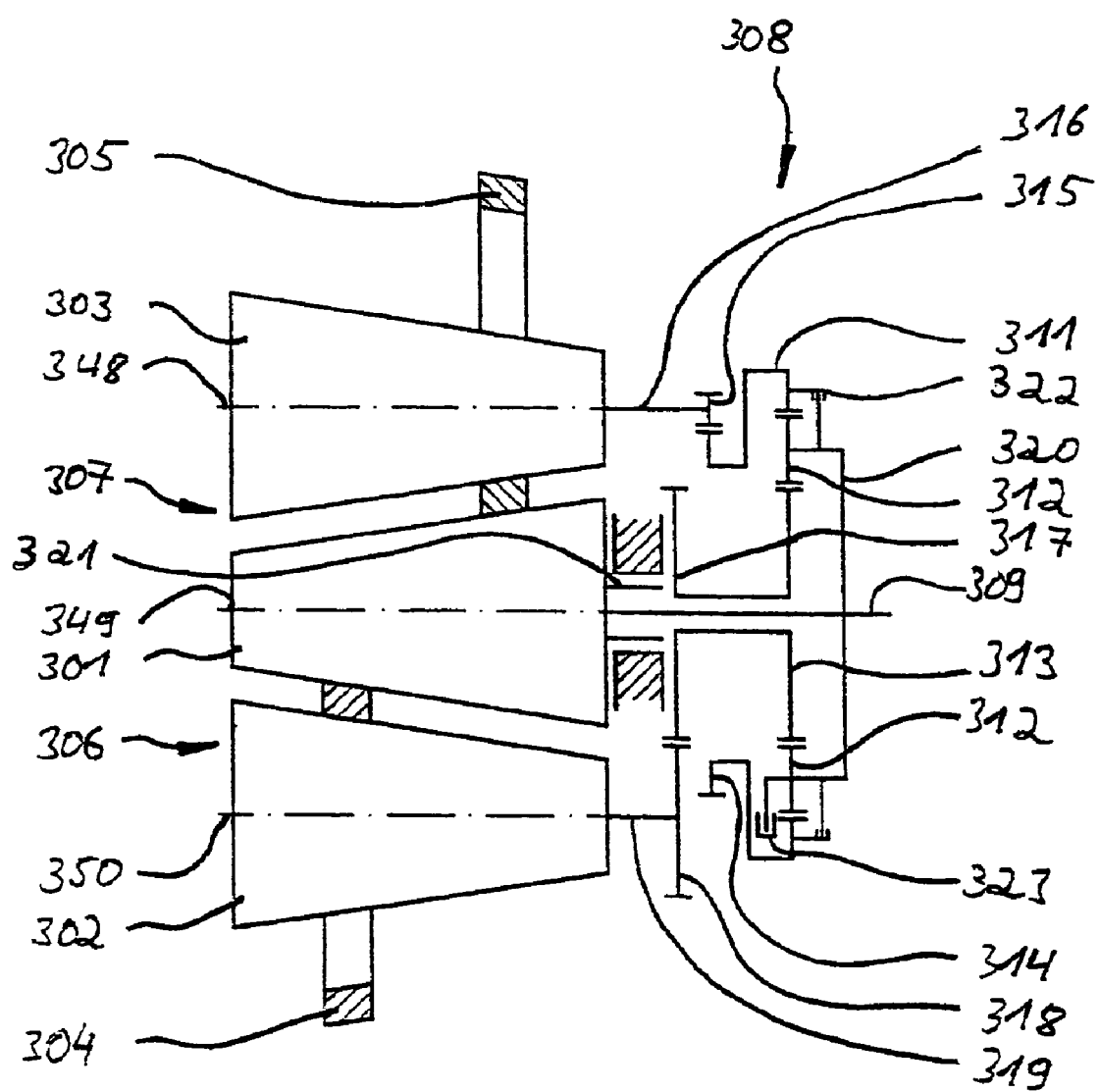
FIG. 22 shows the transmission in FIG. 21 with additional switching possibilities.

The exemplary embodiment shown in FIG. 22 essentially corresponds to the exemplary embodiment in FIG. 21, so that identically acting assemblies also have identical reference numbers and repetition of the identical functionalities will be dispensed with. In addition to the features of the exemplary embodiment in FIG. 21, the exemplary embodiment in FIG. 22 also has a fixing clutch 322, using which the revolving mount 320 of the planet wheels 312 may be fixed to the external collar 311, and, in addition, a clutch 323, using which the mount 320 and the output shaft 309 may be fixed to a fixed clutch housing (not shown in more detail). The first clutch 322 is used for the purpose of causing stoppage of the planet wheels 312 in their intrinsic rotation in certain operating states, so that losses due to the planet wheels 312 are avoided and the housing 320 and the shaft 309 revolve together with the external collar 311 and the sun wheel 313. The second clutch 323 is used for the purpose of keeping the planet wheels 312 fixed in place, but rotatable around their own axes. This arrangement is particularly provided for interaction with a transmission in which the transmission is designed in such a way that the external collar and the sun wheel 313 may and/or do revolve in opposite directions. This may be implemented, for example, through an additional interposed gearwheel or even by a separate reverse gear in the transmission path between at least one of the partial transmissions 306, 307 and the summation gear 308. In an arrangement of this type, the summation gear 308 may be activated via the two partial transmissions 306, 307 in such a way that a speed of 0 results on the shaft 309 even though the drive cone 301 is rotating. In this state, the clutch 323 may be used to fix the transmission. In an arrangement of this type, it is then possible to start up the output shaft 309 merely by adjusting the friction rings 304, 305 and/or by adjusting the partial transmissions 306, 307.

Figure 23:
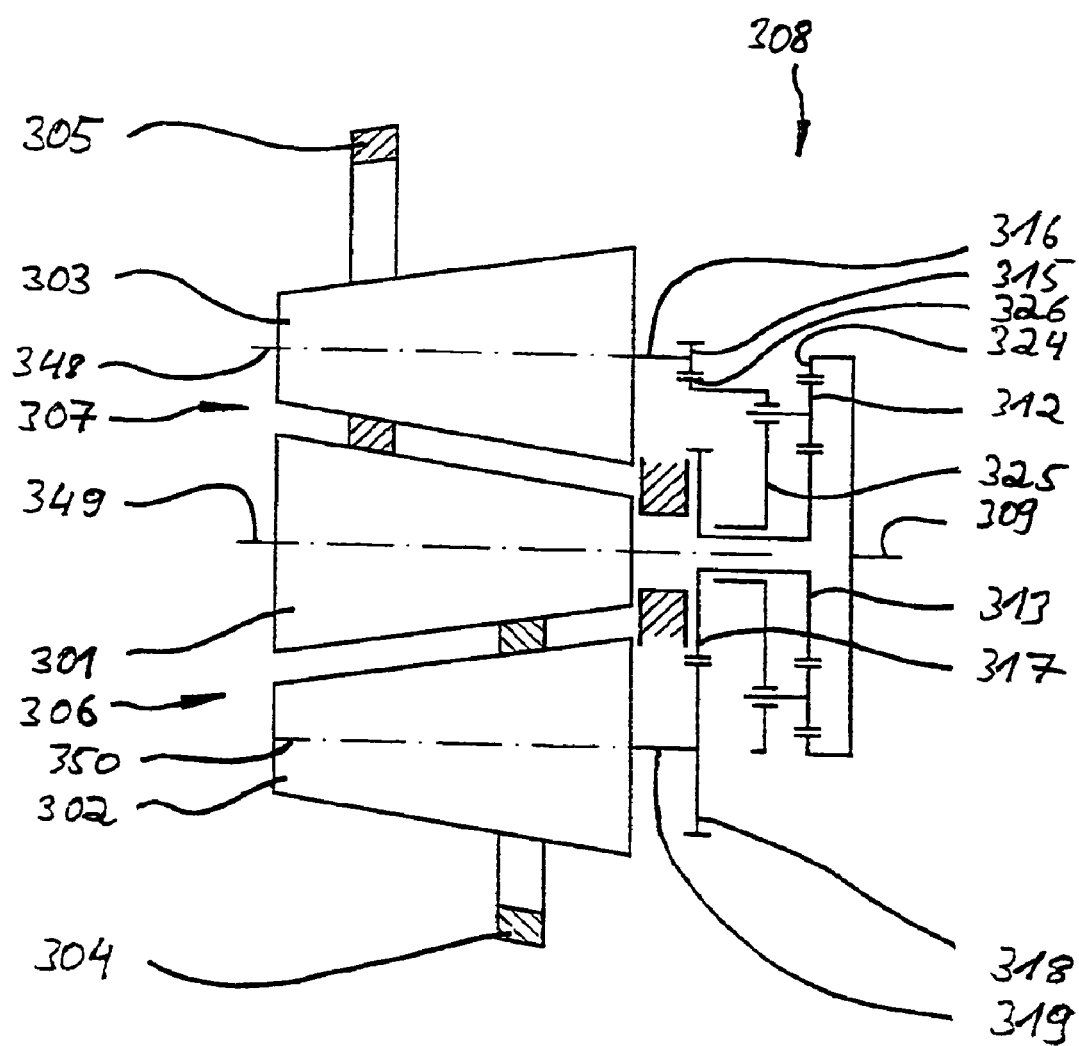
FIG. 23 shows a schematic illustration of a further possible disassembly of the continuously variable transmission into two partial transmissions in a similar illustration as in FIGS. 21 and 22.

The arrangement shown in FIG. 23 also essentially corresponds to the arrangement in FIG. 21. The partial transmissions 306, 307 of the two arrangements are thus identical. Only the summation gear 308 is implemented differently in the arrangement in FIG. 23 than in the arrangement in FIG. 21. For this reason, more detailed explanation of the corresponding components and their mode of operation will also be dispensed with here.

In the continuously variable transmission shown in FIG. 23, the output shaft 309 is connected directly to an external collar 324 of a planetary gear and revolves together with it. In addition, the planet wheels 312 are mounted in a mount 325 which may revolve together with the planet wheels 312 and a wheel 326, the wheel 326 engaging with the pinion 315 on the output shaft 306 of the cone 303. The sun wheel 313, in contrast, as in the exemplary embodiment in FIGS. 21 and 22, is connected to a wheel 317 which engages with the pinions 318 on the output shaft 319 of the cone 2.

The gear 308 shown in FIG. 23 thus also acts as a summation gear and adds and/or subtracts the speeds of the two partial transmissions 306, 307.

Figure 24:
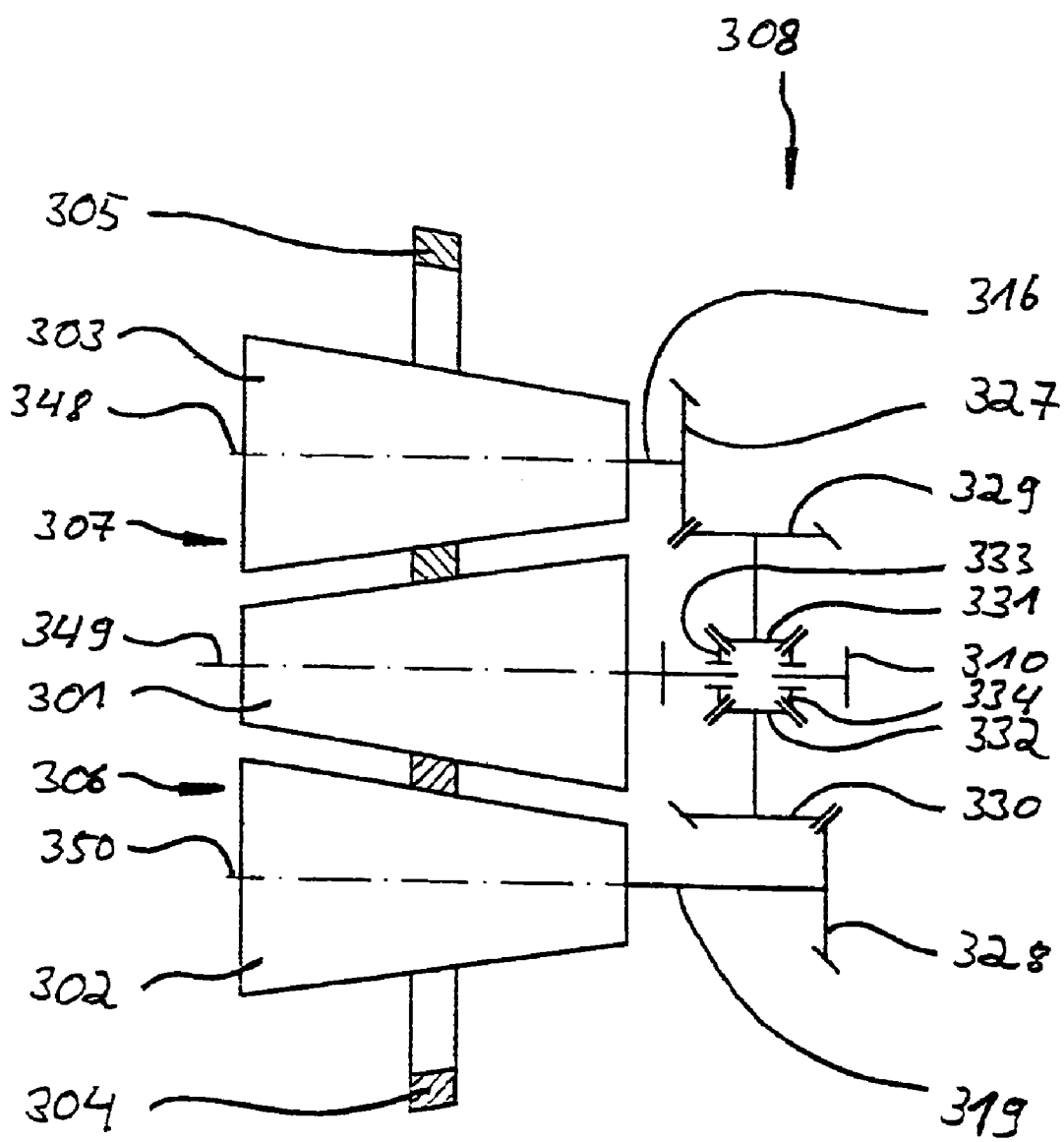
FIG. 24 shows a schematic illustration of a further possible disassembly of the continuously variable transmission into two partial transmissions in a similar illustration as in FIGS. 21 through 23.

The arrangement shown in FIG. 24 also essentially corresponds to the arrangement shown in FIGS. 21 through 23 in regard to its partial transmissions 306, 307. Essentially, only the gear 308 is implemented differently. In this case, the summation gear 308 is driven via bevel wheels 327 and 328, each of which is positioned on the output shaft 316 and 319, respectively, of the cones 303 and 302, respectively. For this purpose, the bevel wheels 327 and 328 engage with bevel wheels 329 and 330, respectively, which are in turn connected to the fixed bevel wheels 331 and 332, respectively, of the differential, which rotate around their own axis. The output of the gear in FIG. 24 occurs via a gearwheel 310 which is connected to the axial bearings of the revolving bevel wheels 333 and 334 of the differential, which in turn engage with the bevel wheels 331 and 332, respectively, of the differential. As is immediately obvious, a summation gear is also provided by this arrangement.

Figure 25:
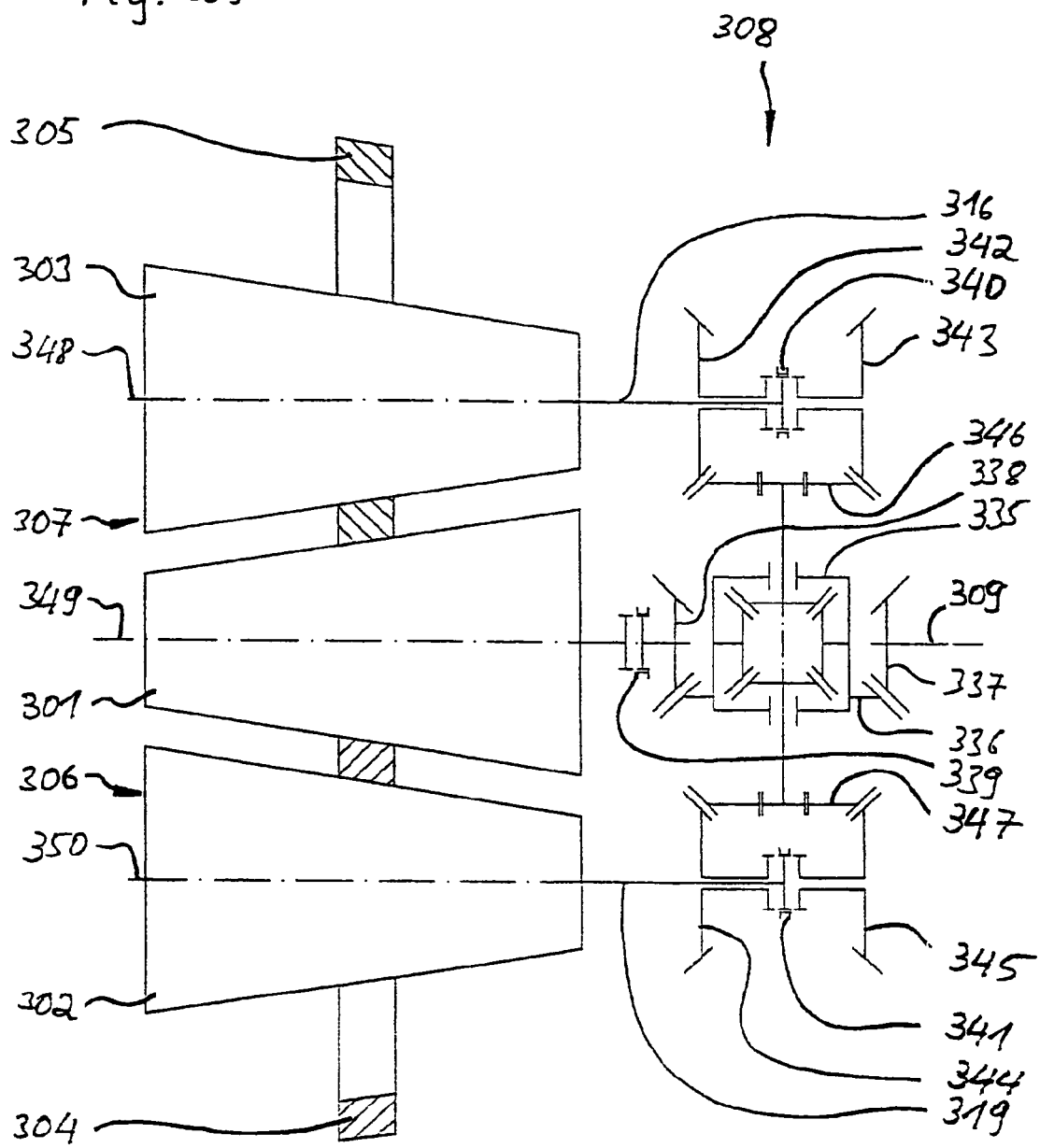
FIG. 25 shows a switching gear as in FIG. 24 with additional switching possibilities.

The basic construction of the exemplary embodiment in FIG. 25 corresponds to the exemplary embodiment in Figure 24, so that here the summation gear 308 is also essentially formed by a differential 335, which drives the output shaft 309 via a bevel wheel 337 using an output wheel 336. In addition, the output wheel 336 engages with a bevel wheel 338, which is in turn connectable via a synchronized clutch 339 to the drive cone 301, so that the two partial transmissions 306, 307 may be bypassed as needed. In addition, in this arrangement the output shafts 316, 319 of the output cones 302, 303 are alternately switchable via synchronized clutches 340 and 341, respectively, to bevel wheels 342, 343 and 344, 345, respectively, which in turn engage with bevel wheels 346 and 347, respectively, each of which is connected to the bevel wheels of the differential, which revolve around a fixed axis. The active rotational direction of the partial transmissions 306, 307 may thus be changed easily by the clutches 340 and/or 341, so that the transmission in FIG. 25 has extremely versatile transmission behavior.

It is obvious that instead of the conical friction ring transmissions 306, 307 shown, other continuously variable transmissions may advantageously be used as partial transmissions for continuously variable transmissions of this type according to the present invention. As is immediately obvious from FIGS. 21 through 25, the partial transmissions 306, 307 have partial transmission planes, defined by the particular cone axes 348, 349, 350, which are each aligned parallel to one another, which all lie in the plane of the drawing.

In this way, these transmissions are built extremely flat and are particularly suitable for use in trucks and/or small trucks, since they may be provided below a loading surface, for example. It is all the more suitable since the transmission according to the present invention operates with good efficiency by using two partial transmissions even at higher torques, as are applied by modern diesel engines, because extremely high pressures may be avoided by using two partial transmissions.

As already indicated on the basis of the description and the exemplary embodiment in FIGS. 21 through 24 and explained for exemplary purposes on the basis of the exemplary monument in FIG. 25, the characteristic of the overall transmission may be significantly influenced through the selection of the rotational directions with which the partial transmissions 306, 307 act on the summation gear 308. In particular, reverse gears of this type and/or partial transmissions which change the rotational direction are advantageous. An alternative in this regard was explained in FIG. 10 as an example for the above-mentioned partial transmission 80.

It is obvious that in the transmissions shown in FIGS. 21 through 25, the force flow may also be selected as reversed, so that the output elements 309, 310 are used as input elements and the input cone 301 is used as the output cones.

As may be inferred from FIGS. 1, 4, 8, and 9 as well as 14 through 17, the continuously variable transmissions shown therein are each sealed in the direction of their bearings by seals 70 (only identified as examples). In this way, as is known from the related art, a separate fluid chamber arises, in which the cones and the coupling element are positioned. In the present exemplary embodiment, a "silicone oil" is preferably used as the fluid, in which approximately 10 to 30 mole-percent of the methyl groups in polydimethyl siloxane are preferably replaced by phenyl groups and whose viscosity at 25° C. is preferably approximately 200 mm$^2$/sec. However, any other fluid whose temperature dependence of its physical and chemical parameters is stabilized in relation to the temperature dependence of mineral oils and/or is located between the gradients of mineral oils and the gradients of silicone oil in regard to the temperature-dependent compression gradients and/or the temperature-dependent viscosity gradients, may be used.

Figure 26:
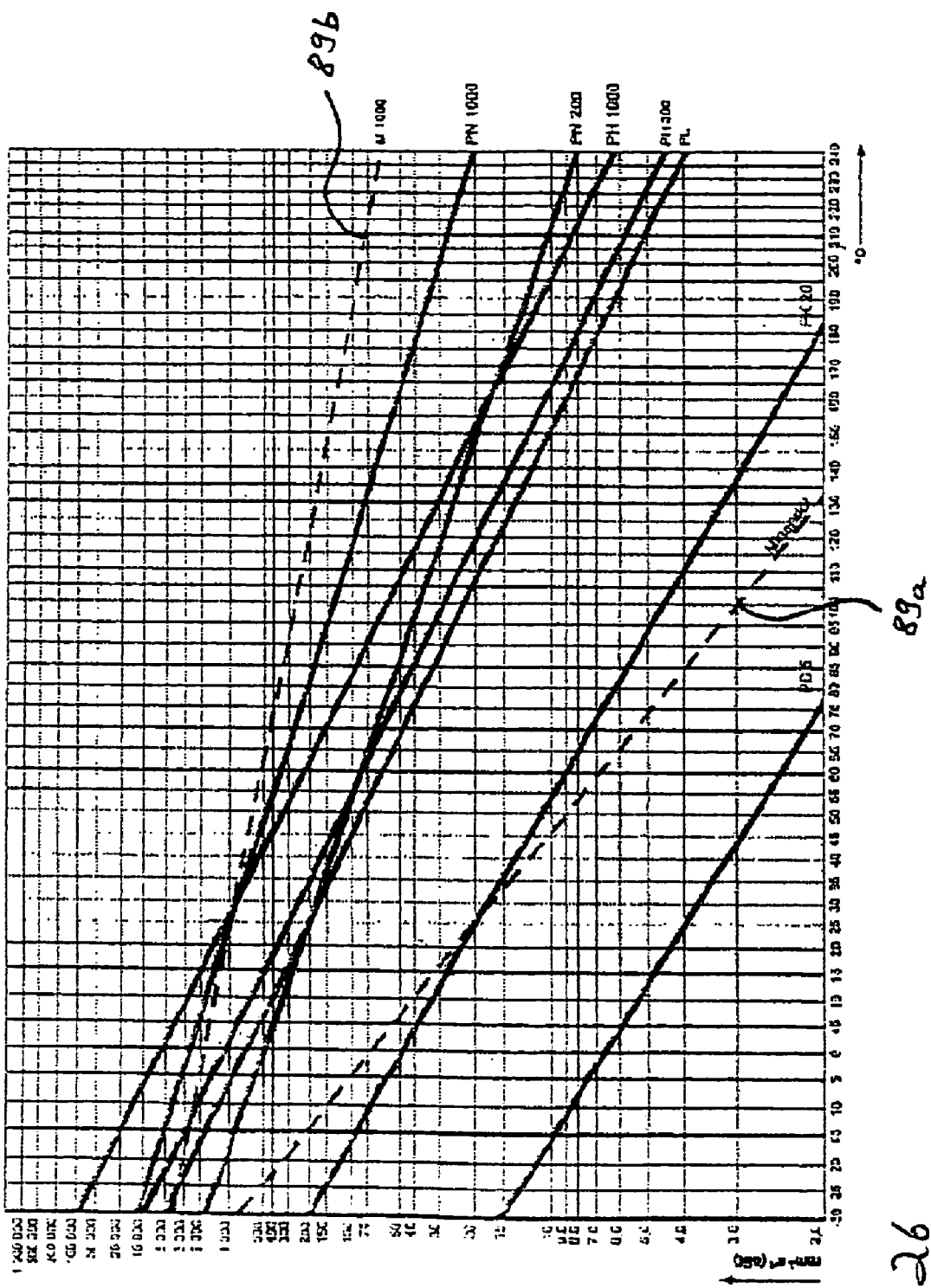
FIG. 26 shows the viscosity as a function of the temperature for exemplary silicon oils.

The temperature dependence of exemplary fluids and/or liquids described above is shown as an example in FIG. 26 in logarithmic form, the white line 89a representing mineral oils and the white line 89b representing silicone oil. These fluids ensure under operating conditions that a gap which is bridged by the fluid may form between the cones 4, 5; 51, 55, 81, 82, 91, 92, 104, 105, 203, 204, 301, 302, 303 and the coupling elements 7; 54, 83, 93, 107, 205, 304, 305. The existence of this gap may be detected in metallic components through electrical voltage measurements, for example, it having been experimentally determined that this gap is only formed after several rotations, i.e., when the fluid is distributed, so that the compressibility and the viscosity are to be selected suitably in regard to the gap dimension. In this case, the bracing and/or pressure devices are dimensioned in such a way that a corresponding gap is maintained in operating conditions.

In order to ensure uniform surface pressure for different running paths and therefore for different radii of the cones 4, 5; 51, 55, 81, 82, 91, 92, 104, 105, 203, 204, 301, 302, 303, the running surface 12 of each cone is preferably implemented as axially different. In the present exemplary embodiments, this is implemented through grooves of different widths (not shown). Alternatively, an axially varying surface roughness or something similar may be provided.

Figure 27:
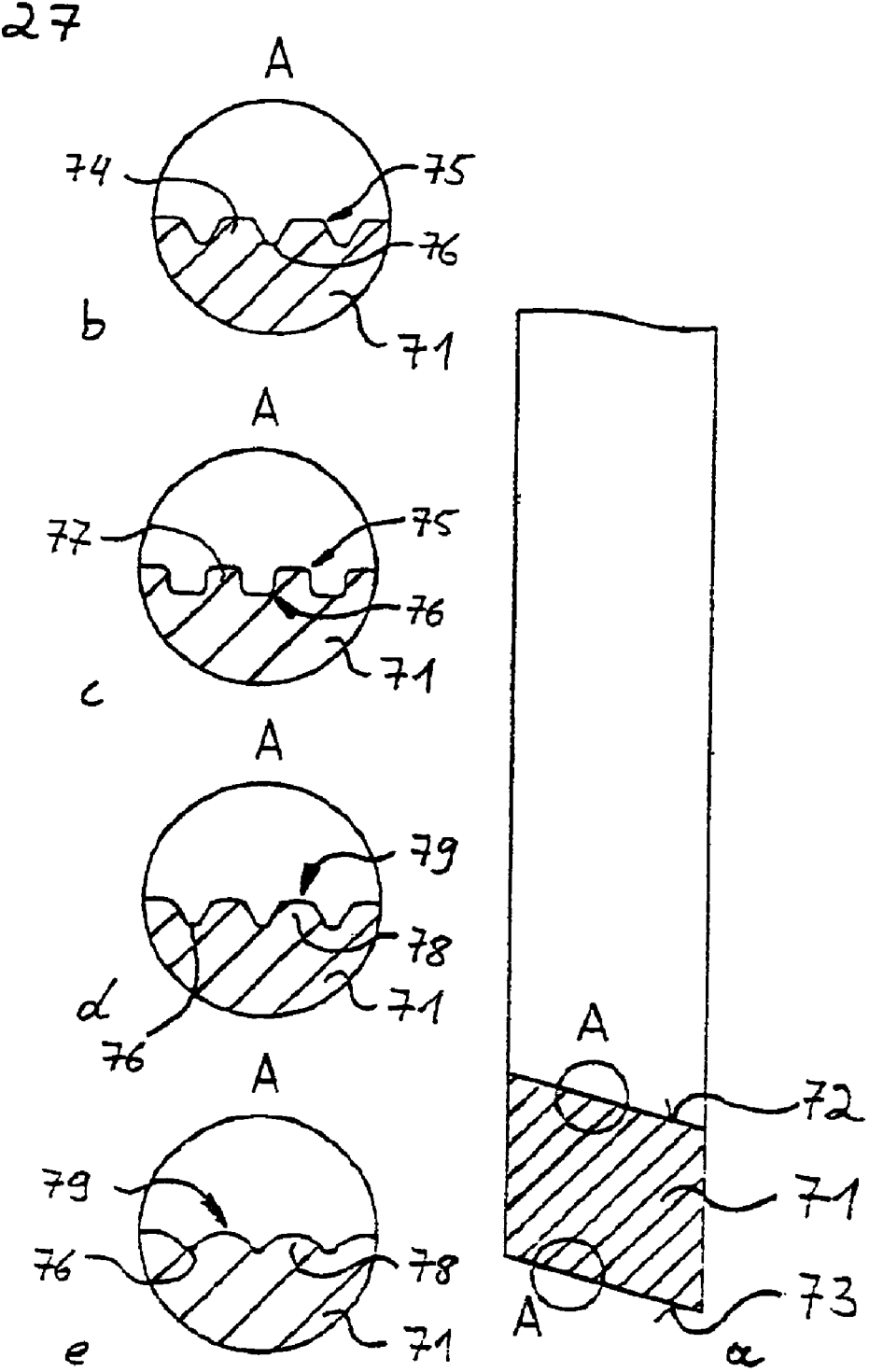

The surface of the friction ring 7; 54, 83, 93, 107, 205, 304, 305 is also preferably provided with grooves in order to influence the shear force of the liquid in the gaps remaining between the cones 4, 5; 51, 55, 81, 82, 91, 92, 104, 105, 203, 204, 301, 302, 303 and the friction ring 7; 54, 83, 93, 107, 205, 304, 305, as is shown for exemplary purposes in FIG. 27 on the basis of the friction ring 71. The friction ring 71 has two revolving surfaces 72, 73, each of which, as explained on the basis of the friction rings 7; 54, interacts with the surfaces of cones 4, 5; 51, 55, 81, 82, 91, 92, 104, 105, 203, 204, 301, 302, 303. In this case, the surfaces 72, 73 may have different surface designs. For example, trapezoidal webs 74 (cf. FIG. 27b) are especially advantageous, since they may support themselves especially well on the remaining-material of the ring 71. Cumulatively and/or alternatively, rounded groove inlets (cf. FIGS. 27b and 27c) may be provided, through which inward flanges in a diametrically opposing surface may be avoided. Rounded groove inlets 75 also appear advantageous for the distribution of the oil film and/or the surface pressure. Rounded groove bases (76, cf. FIGS. 27b, 27c, and 27d), in contrast, may avoid notch effects in the groove bases under load. Essentially cuboid webs 77 (cf. FIG. 27c) may also be provided. The webs 78 having round external cross-sectional shapes 79 may also be used, as shown in FIGS. 27d and 27e.

Grooves of this type may be provided identically and/or differently both on the cones and, depending on the concrete embodiment, on the friction ring surfaces. In particular, the distribution of the grooves and/or webs may vary over a surface, particularly in the axial direction. The surface pressure and/or surface pressure distribution, for example, may thus be varied and/or set suitably even along a cone and/or the oil film thickness may be adapted. The groove cross-section in particular largely determines the drain quantity of the oil from the contact zone of the particular transmission element in this case.

In addition, the friction ring preferably has a crowned cross-section, so that in spite of the existence of a gap, the largest possible contact area may be implemented via a Hertzian stress.

The conical friction ring transmission shown in FIGS. 28 and 29 includes two bevel friction wheels 403, 404, positioned on parallel axes 401, 402 at a radial distance which are positioned opposing to one another and have the same conical angle. Between the bevel friction wheels 403, 404, a friction ring 405 is positioned, which fills up their gap, encloses the bevel friction wheel 403, and is held in a cage 406.

The cage 406 comprises a frame, which is formed by two crossheads 407, 408 and two parallel axles 409, 410 received therein. These axles 409, 410 are positioned parallel to the axles 401, 402 and simultaneously to the generatrixes of the bevel friction wheels 403, 404 slanted at the conical angle and carry an actuating bridge 411 having two pins 412 pointing toward one another, on each of which a guide roll 413 is seated. The guide rolls 413 engage the friction ring 405 on both sides and provide it with the necessary axial guiding.

The middle of the crosshead 407 has a vertical axis of rotation 14, around which the entire cage 406 is pivotable. For this purpose, the lower crosshead 408 is connected to a transverse drive 415 engaging therein (not shown in greater detail) and an actuating motor 416.

The axis of rotation 414 lies—in this exemplary embodiment and in the exemplary embodiments explained below—in the plane defined by the axes of rotation of the bevel friction wheels 403, 404. It may also lie in a plane parallel thereto or intersect the former plane at an acute angle.

If the cage 406 is pivoted around small angles, the friction drive causes an axial adjustment of the actuating bridge 411 and therefore a change of the transmission ratio of the conical friction rings. A very low expenditure of energy suffices for this purpose.

To implement a pre-tension, a spring 417 is positioned on the transverse drive 415, which applies a pre-tension to the cage 406. Through this pre-tension, it is ensured that in the event of breakdown of the actuating motor 416 and/or breakdown of the electronics which drive this actuating motor 416, the cage 406 is pivoted around a defined adjustment angle in relation to the plane defined by the axes of rotation of the bevel friction wheels 403, 404. This causes, as is already known, the friction ring to travel along the conical mantel surfaces because of the rotation of the two bevel friction wheels 403, 404.

In this case, the spring 417 is set in such a way that a preset angle and therefore a preset travel speed and/or adjustment speed is ensured, so that the driving motor is not overloaded in regard to the actuating motor 416 even in case of a system breakdown.

In addition, a slanted ramp 418 is provided on the actuating bridge 411 in this exemplary embodiment, which corresponds to a wedge 419 which is attached to the transmission housing via a spring 420. Via the spring 420, a counterforce is applied against the force of the spring 417, so that the friction ring is held in a defined safety running path if the actuating motor 416 and/or another element of the actuator has an operational breakdown. In another embodiment, this arrangement and/or the spring 417 may be dispensed with.

The springs 417, 420 are selected in this exemplary embodiment in such a way that the actuating motor 416 and/or the frictional forces of the bevel friction wheels 403, 404 may overcome them without anything further.

The transmission shown in FIG. 30 essentially corresponds to the transmissions in FIGS. 28 and 29, so that a more detailed explanation may be dispensed with. This transmission also includes two bevel friction wheels, only one of which is shown dashed as the bevel friction wheel 421. A cage 422 is also provided in this transmission, which holds an actuating bridge (not shown) for a friction ring (not shown) and is pivotable around an axis of rotation 423. In this exemplary embodiment, the axis of rotation 423 is positioned approximately at the height of the middle of the cone of the bevel friction wheel 421.

This arrangement also has actuating means, which comprise an activatable actuator in the form of an actuating motor and/or a hydraulic actuator or a similar drive and a safety device. In this case, the safety device has a spring 424, which is attached to a transmission housing 425 and pre-tensions the cage 422 in such a way that it is adjusted at a slight angle in relation to the axis of the bevel friction wheel 421 when the activatable actuator is not powered—for whatever reason. In this way, the cage 422 is thus kept under a pre-tension in normal operating states.

In a deviation from the exemplary embodiment shown in FIGS. 28 and 29, this arrangement has a stop 427 spring-loaded by a spring 426. The spring 426 builds up a counterforce when the friction ring runs against the stop 427, so that the cage 422 is adjusted against the force of the spring 424 and the friction ring runs in a defined safety running path.

The arrangement in FIG. 31 essentially corresponds to the arrangement in FIG. 30, the stop 427 being dispensed with, however. For this reason, identical reference numbers have also been selected in this exemplary embodiment.

Depending on the concrete embodiment of this exemplary embodiment, the cage 422 may be used as a stop. However, it has been shown that through suitable adaptation of the ring surfaces, the friction rings experience a torque because of the rotational movements of the two bevel friction wheels, which tends to twist the friction ring around an axis which lies in the plane defined by the axes of rotation of the bevel friction wheels and is positioned perpendicular to the gap between the bevel friction wheels. This torque is apparently caused by the different contact areas between the friction ring and the particular bevel friction wheel and by the different radii of these contact areas and its rotational direction is a function of the rotational direction of the bevel friction wheels.

Because of this torque, an unguided friction ring tends to travel in a specific direction along the gap between the two bevel friction wheels. This is also true for a friction ring guided via a cage and/or an actuating bridge, as long as the cage and/or the actuating bridge is mounted so it runs sufficiently smoothly and is otherwise free of forces.

Depending on the concrete embodiment of the surface of the friction ring, the strength of this torque varies along the adjustment path.

In the embodiment shown in FIG. 31, the spring 424 may be selected in such a way that the spring force compensates for the torque at a defined speed on a specific running path, which is then used as the safety running path. Beyond this safety running path, the torque applied by the friction ring predominates, so that the friction ring moves toward the safety running path, while on the other side the spring force of the spring 424 predominates, so that it is also ensured in this regard that the friction ring runs toward the safety running path. An example of a safety running path 428 is shown in FIG. 31.

FIG. 32 shows a concrete implementation of the exemplary embodiment schematically shown in FIG. 31. This is a corresponding transmission as is used for a rear wheel drive of a vehicle. A hydraulic clutch and/or a hydraulic converter 430 is located in front of an actual conical friction ring transmission 429 and a planetary gear 431 is located behind the conical friction ring transmission 429. The output shaft 432 simultaneously forms the shaft of the driving bevel friction wheel 433, which drives, via a friction ring 434, an output bevel friction wheel 435, on whose output shaft 436 a pinion 437 is seated, which engages with a freely rotating gearwheel 440 seated on a transmission output shaft 439. The transmission output shaft 439 is aligned with the shaft 432 and is received therein so it may rotate freely.

A pinion 441, connected in one piece with the gearwheel 440, forms the sun wheel of the planetary gear 431. This engages with planet gearwheels 442 which are held in a planet carrier 443, which runs around the transmission output shaft 439. The planet carrier 453 has a cylindrical projection, which encloses a magnet wheel 444 which engages with the planet gearwheels 442 and is connected fixed to the transmission output shaft 439 via longitudinal teeth 445.

Furthermore, a lamellar clutch 446 is provided in the planetary gear 431, which may connect the transmission output shaft 439 to the internal gearwheel 444. Finally, a brake 446 is assigned to the cylindrical projection of the planet carrier 443. By actuating the lamellar clutch, the forward drive is switched on. If the brake 446 is actuated, the planet carrier 443 is fixed and a change in direction of the transmission output shaft 439 results, i.e., a reverse drive.

As is immediately obvious from FIG. 32, the driving bevel friction wheel 433 is enclosed by the friction ring 434, whose inner mantel surface is frictionally engaged with a running surface 415 of the driving bevel friction wheel 433 and whose outer mantel surface is frictionally engaged with a running surface 451 of the output bevel friction wheel 435.

The two bevel friction wheels 433, 435 may, as shown, have different diameters, through which a transmission stage may be saved in the following output, if necessary. For reasons of weight, the two bevel friction wheels 433, 435 may also be implemented as hollow, i.e., they may merely include their mantel surfaces.

The friction ring 434 is held in a cage 422, which is positioned so it is pivotable around the axes of rotation 423 at the point 452. Two parallel axles 453 are held in the cage 422, whose angle of inclination is equal to the conical angle of the bevel friction wheels 433, 435. An actuating bridge 454, in which the friction ring 434 is mounted so it slides, is guided on these axles 453.

An actuating spindle 455, which is mounted on housing 425 and which is connected to an actuating motor or magnet (not shown) as an activatable actuator and engages on the cage 422, is provided for the adjustment of the cage 422. The spring 424 is provided on the end of the cage 422 facing away from the actuating spindle 455.

It is obvious that the actuating bridge does not absolutely has to be implemented like a bridge. Rather, any assembly which is displaceable parallel to the cone axes and guides the friction ring may be used in this regard. This is also true for the cage, instead of which any other assembly which holds the actuating bridge may be used. Furthermore, this transmission also has seals 70 to separate the fluid chambers. In addition, a gap is provided between the cones 433 and 435 and the friction ring 434 in the operating state in this arrangement as well.

As already indicated above, a spring-loaded stop may be dispensed with. Instead, a rigid stop may be used, for example, as shown on the basis of the exemplary embodiment in FIG. 33. Otherwise, the construction of this exemplary embodiment essentially corresponds to the construction of the transmissions described above, so that a more detailed explanation will be dispensed with in this regard. In this transmission as well, a friction ring 460 encloses a bevel friction wheel 461 and is mounted via an actuating bridge 462 and a cage, having two axles 463, which is pivotable around an axis of rotation 464, as in the above exemplary embodiment. The mode of operation and/or construction of the transmission is otherwise essentially identical to the transmissions shown in FIGS. 1 through 5, 28 and 29 and/or 32. In contrast to the exemplary embodiment shown in FIG. 30, the transmission in FIG. 33 does not include a spring-loaded stop. In this exemplary embodiment, a fixed stop 466 provided on the housing 465 is used to define a safety running path. In this case the safety device has means (not shown) which exert a torque on the cage around the axis of rotation 464 in the direction of the arrow 467. This may be, for example, a spring corresponding to the spring 424 of the exemplary embodiment shown in FIG. 30 or a torque caused by the rotation of the bevel friction wheels and/or the friction ring 460. Upon reaching the stop 466, the torque 467 is counteracted, so that the friction ring 460 is aligned perpendicularly to the plane formed by the cone axes. If the counter torque exceeds the torque 467, the friction ring 460 leaves this safety running path, through which the counter torque is reduced to zero and therefore the torque 467 which brings the friction ring 460 into its safety running path becomes active again.

The arrangement shown in FIG. 34 essentially corresponds to the arrangement in FIG. 33, so that identical reference numbers are also used correspondingly. However, the transmission in FIG. 34 has a stop 469 adjustable via a spindle 468, so that the safety running path may be selected freely. Instead of a stop 469, a holder 470 may be provided, as shown in FIG. 35, which follows the displacement of the friction ring 460 freely in normal operation and is only used as needed for safety to adjust and/or position the friction ring 460. A holder 470 of this type may also be used as an additional holding device for normal operation in order to fix the friction ring 460 in a desired position in specific operating states. In this way, a constant transmission ratio may be set and maintained reliably, which may be advantageous for an overdrive (high speed) and/or for startup procedures, for example.

It is obvious that stops of this type, whether they are fixed on the housing or displaceable, and/or an additional actuator of this type and/or additional holding devices of this type may also be advantageous independently of the remaining features. In addition, the end positions of the coupling element and/or the friction ring may be detected using a sensor, particularly electrically. In this way, special operating states in particular, such as a defect of the transmission, may be registered rapidly and reliably. In particular, stops of this type may interact with the cage or a similar arrangement instead of with the friction ring or an actuating bridge. Stops of this type may particularly also be used to define other running paths. In addition, it is also possible to positively guide the actuating bridge 462 of the exemplary embodiment in FIGS. 34 and 35 via the spindle 468 and the corresponding stops and/or holders 469 and 470. For this purpose, sufficient play is provided in each case between the actuator 469, 470 and the actuating bridge 462, so that a displacement of the actuator 469, 470 first leads to the change of angle of the cage 463, after which the ring 460 correspondingly has its axis of rotation displaced and then the movement of the actuator 469, 470 follows.

Since the angle for adjustment of the ring 460 under its own power is critical, in this exemplary embodiment a pre-tension in regard to the angle of the cage 463 is preferably implemented by a spring between housing and cage, corresponding to the arrangement in FIG. 31, for example, so that the play between actuating bridge 463 and actuator 469, 470 may not lead to unintentional change of the angle of the cage 463.

In addition, end stops may be provided on the housing 465 corresponding to the arrangement in FIG. 33, these end stops being positioned in such a way that the ring 460 is also aligned parallel to the cone axes in regard to its axis of rotation in this exemplary embodiment and therefore no longer travels further. In this way, total destruction of the transmission may be counteracted if the positioning device for the ring breaks down. Sensors may also be provided at this location which display a corresponding position of the actuating bridge 462.

FIG. 36 shows an alternative adjustment possibility, this embodiment variation being built extremely cost-effectively. In this embodiment variation, the ring 480 is guided on only one side by a holding device 481. This is provided on the approach side, so that in the illustration selected, the ring 480, starting from the holding device 481, first passes the gap between the cones 482, 483 and then revolves around the cone 482 before it reaches the holding device 481 again. The holding device 481 is mounted on a spindle 484 and encloses the ring with sufficient play so that it may displace the angle of its axis of rotation out of the plane formed by the cone axes, through which it performs a traveling movement and follows the movement of the holding device 481 under its own power. Alternatively to the play of the holding device 481, it may be provided with a rotational degree of freedom in the plane of FIG. 36 in relation to the actuator 484, implemented as a spindle, and guide the ring essentially without play.

If the ring 480 is implemented in such a way that it has a torque perpendicular to its axis of rotation, a holding device which only guides the ring 480 on a rest 485 on one side may be provided, which counteracts this torque and—depending on the desired displacement—moves away from the ring so that the ring completes a rotational movement of its axis of rotation through the plane formed by the cone axes on its own and begins to travel until it reaches the guide, in which it again aligns appropriately, or the axis of rotation of the ring pivots in that it moves toward it, so that it travels away from the guide until it does not follow it any longer and it pivots back toward its axis of rotation through its own torque until it has reached the guide again.

The latter arrangement leaves the ring 480 and especially large amount of play, so that it may move very independently and in a self-stabilizing way, through which friction losses may be minimized.

The invention claimed is:

1. A transmission having two cones as revolving transmission elements, each of which has at least one running surface for a revolving ring as a revolving coupling element, said at least one running surface having at least two running paths for the coupling element having different running radii, said ring surrounding one of said cones and passing through a constant gap between said transmission elements, said two transmission elements being braced, with the coupling element incorporated, via a bracing device which presses the two transmission elements against the coupling element with a variable pressure, wherein the bracing device comprises a pressure device (8), which presses the running surface (12) of a first of the two transmission elements (4, 5) against the coupling element (7) with a variable pressure and, in addition, is supported on a bracing bearing (9), and a spring element (13, 14) which is positioned to act in series with the pressure device.

2. The transmission according to claim 1, wherein spring element (13, 14) comprises radial recesses (18, 19) or radial projections for transmitting torque.

3. The transmission according to claim 1, wherein a torque sensor is provided on the drive side and/or output side and the pressure of the pressure device (8) is selected as a function of the torque determined.

4. The transmission according to claim 1, wherein a pressure caused by a torque and/or a displacement of components (4, 11, 13, 14, 15, 16) of the pressure device caused by a torque is used to measure the torque.

5. The transmission according to claim 1, wherein a connecting gap is provided between at least one of the revolving transmission elements and said coupling element during operation.

6. The transmission according to claim 5, wherein said connecting gap being filled with a liquid.

7. The transmission according to claim 1, wherein at least one of the revolving transmission elements and/or the coupling element is wetted with a liquid which comprises methyl siloxanes, dimethyl diphenyl siloxanes, and/or methyl phenyl siloxanes having phenyl groups.

8. The transmission according to claim 7, wherein at least one of the revolving transmission elements and/or the coupling element is wetted with a liquid which comprises polydimethyl siloxanes, polydimethyl diphenyl siloxanes, and/or polymethyl phenyl siloxanes having phenyl groups, and/or which are alkyl-substituted γ-trifluoropropyl-substituted.

9. The transmission according to claim 7, wherein the liquid has components with organic substituents.

10. The transmission according to claim 1, wherein least one of the revolving transmission elements and/or the coupling element is wetted with a liquid whose viscosity is stabilized in regard to temperature.

11. The transmission according to claim 1, wherein at least one of the revolving transmission elements and/or the coupling element is wetted with a liquid whose viscosity changes with a temperature-dependent viscosity gradient, which lies between the viscosity gradient (80) of mineral oils and the viscosity gradients (81) of dimethyl siloxanes.

12. The transmission according to claim 1, wherein at least one of the revolving transmission elements and/or the coupling element is wetted with a liquid whose compressibility changes with a temperature-dependent compressibility gradient, which lies between the compressibility gradient of mineral oils and the compressibility gradients of dimethyl siloxanes.

13. The transmission according to claim 1, wherein said spring element (13) transmits both the variable pressure and a torque between the running surface (12) of the first transmission element (4) and the bracing device and/or between the running surface (12) of the first transmission element and the pressure device (8).

14. A transmission having two cones as revolving transmission elements, each of which has at least one running surface for a revolving ring as a revolving coupling element, said at least one running surface having at least two running paths for the coupling element having different running radii, said ring surrounding one of said cones and passing thru a constant gap between said transmission elements, said two transmission elements being braced, with the coupling element incorporated, via a bracing device which presses the two transmission elements against the coupling element with a variable pressure, wherein the bracing device comprises a pressure device (8) having two pressure elements (15, 16) and at least one rolling element (17), which rolls on a rolling element path as a function of torque, which is implemented in such a way that a first pressure element (15) is displaced in relation to the second pressure element (16) in the direction of the pressure when the rolling element (17) changes its position on the rolling element path as a function of torque.

15. The transmission according to claim 14, wherein a torque sensor is provided on the drive side and/or output side and the pressure of the pressure device (8) is selected as a function of the torque determined.

16. The transmission according to claim 14, wherein a pressure caused by a torque and/or a displacement of components (4, 11, 13, 14, 15, 16) of the pressure device caused by a torque is used to measure the torque.

17. The transmission according to claim 14, wherein the bracing device comprises a pressure device (8), which presses the running surface (12) of a first of the two transmission elements (4, 5) against the coupling element (7) with a variable pressure and, in addition, is supported on a bracing bearing (9), and a spring element (13, 14) which is positioned to act in series with the pressure device.

18. The transmission according to claim 17, wherein spring element (13, 14) comprises radial recesses (18, 19) or radial projections for transmitting torque.

19. A transmission having two revolving transmission elements, each of which has at least one running surface (50, 51) for a revolving coupling element, at least one of the running surfaces having at least two running paths for the coupling element having different running radii and actuating means being provided, via which the coupling element may be adjusted from one of the two running paths to the other of the two running paths and which comprises an activatable actuator (415, 416; 455), wherein the actuating means comprise a safety device which adjusts the coupling element into a safety running path if the activatable actuator breaks down.

20. The transmission according to claim 19, wherein the safety device comprises at least one spring.

* * * * *